US012809886B2

(12) United States Patent
Wood

(10) Patent No.: US 12,809,886 B2
(45) Date of Patent: Nov. 24, 2026

(54) SYSTEM AND METHOD FOR ACCURATE RESPONSES FROM CHATBOTS AND LLMs

(71) Applicant: Acurai, Inc., Brooklyn, NY (US)

(72) Inventor: Michael Wood, Wilton Manors, FL (US)

(73) Assignee: Acurai, Inc., Brooklyn, NY (US)

(*) Notice: Subject to any disclaimer, the term of this patent is extended or adjusted under 35 U.S.C. 154(b) by 97 days.

(21) Appl. No.: 19/074,366

(22) Filed: Mar. 8, 2025

(65) Prior Publication Data

US 2025/0291828 A1 Sep. 18, 2025

Related U.S. Application Data

(60) Provisional application No. 63/761,053, filed on Feb. 20, 2025, provisional application No. 63/750,084, filed on Jan. 27, 2025, provisional application No. 63/716,119, filed on Nov. 4, 2024, provisional application No. 63/668,678, filed on Jul. 8, 2024, provisional application No. 63/566,107, filed on Mar. 15, 2024.

(51) Int. Cl.

| | |
|---|---|
| ***G06F 16/28*** | (2019.01) |
| ***G06F 16/334*** | (2025.01) |
| ***G06F 40/284*** | (2020.01) |
| ***G06N 3/08*** | (2023.01) |

(52) U.S. Cl.

CPC ........ *G06F 16/283* (2019.01); *G06F 16/3344* (2019.01); *G06F 16/3347* (2019.01); *G06F 40/284* (2020.01); *G06N 3/08* (2013.01)

(58) Field of Classification Search

USPC ........................................................ 704/1–504

See application file for complete search history.

(56) References Cited

U.S. PATENT DOCUMENTS

| | | | | |
|---|---|---|---|---|
| 2021/0209167 | A1* | 7/2021 | Feng | G06F 40/30 |
| 2023/0259705 | A1* | 8/2023 | Tunstall-Pedoe | G06F 40/279 704/9 |
| 2025/0291815 | A1* | 9/2025 | Wood | G06F 16/283 |
| 2025/0291828 | A1* | 9/2025 | Wood | G06F 16/283 |

(Continued)

FOREIGN PATENT DOCUMENTS

| | | | | |
|---|---|---|---|---|
| WO | WO-2025193561 A1 * | 9/2025 | | G06N 5/022 |
| WO | WO-2025193562 A1 * | 9/2025 | | G06N 5/022 |

*Primary Examiner* — Marcus T Riley

(74) *Attorney, Agent, or Firm* — James David Johnson; Johnson & Martin, P.A.

(57) ABSTRACT

Systems and methods are described for obtaining accurate responses from large language models (LLMs) and chatbots, including for question and answering, exposition, and summarization. These systems and methods accomplish these objectives via use of noun phrase avoiding processes such as a noun phrase collision detection process, a query splitting process, and a topical splitting process as well as by use of formatted facts, formatted fact model correction interfaces (FF MCIs), bounded-scope deterministic (BSD) neural networks, processes and methods, and intelligent storage and retrieval (ISAR) systems and methods. These systems and methods avoid and bypass noun phrase collisions and correct for errors caused by noun phrase collisions so that hallucinations are eliminated from LLM responses.

3 Claims, 19 Drawing Sheets

(56) References Cited

U.S. PATENT DOCUMENTS

| | | | | |
|---|---|---|---|---|
| 2025/0292083 | A1* | 9/2025 | Wood | G06F 16/283 |
| 2025/0335709 | A1* | 10/2025 | Wood | G06F 16/3329 |
| 2026/0203503 | A1* | 7/2026 | Wood | G06F 16/3329 |

* cited by examiner

Example embodiment hardware for BSD NLP server (including neural network server)

BSD NLP Network

Figure 3

Example Training Input/Target Output for creating a BSD NLP Network for Sentence Simplification

| Training Input | Target Output |
|---|---|
| Apollo 11 was a spaceflight conducted from July 16 to July 24, 1969 by the United States and launched by NASA. | Apollo 11 was a spaceflight. The spaceflight was conducted from July 16 to July 24, 1969. The spaceflight was conducted by the United States. The spaceflight was launched by NASA. |
| It marked the first time that humans landed on the Moon. | It marked the first time that humans landed on the Moon. |
| Commander Neil Armstrong and Lunar Module Pilot Buzz Aldrin landed the Apollo Lunar Module Eagle on July 20, 1969, at 20:17 UTC, and Armstrong became the first person to step onto the Moon's surface six hours and 39 minutes later, on July 21 at 02:56 UTC. | Commander Neil Armstrong and Lunar Module Pilot Buzz Aldrin landed the Apollo Lunar Module Eagle. They landed the Apollo Lunar Module Eagle on July 20, 1969. They landed the Apollo Lunar Module Eagle at 20:17 UTC. Armstrong became the first person to step onto the Moon's surface six hours and 39 minutes later. Armstrong became the first person to step onto the Moon's surface on July 21. Armstrong became the first person to step onto the Moon's surface at 02:56 UTC. |
| Aldrin joined him 19 minutes later, and they spent about two and a quarter hours together exploring the site they had named Tranquility Base upon landing. | Aldrin joined him 19 minutes later. They spent about two and a quarter hours together exploring the site. They had named the site Tranquility Base upon landing. |
| Armstrong and Aldrin collected 47.5 pounds (21.5 kg) of lunar material to bring back to Earth as pilot Michael Collins flew the Command Module Columbia in lunar orbit, and were on the Moon's surface for 21 hours, 36 minutes, before lifting off to rejoin Columbia. | Armstrong and Aldrin collected 47.5 pounds (21.5 kg) of lunar material. They collected the lunar material to bring back to Earth. They collected the lunar material as pilot Michael Collins flew the Command Module Columbia in lunar orbit. They were on the Moon's surface for 21 hours, 36 minutes. Then they lifted off to rejoin Columbia. |

Example embodiment for 100% accurate BSD NLP transformation on complex documents.

Example BSD FF Pipeline

Example Relative Date Conversion Process

Document Chunking Process

Payload Ingestion Process

Query Processing

NGram Loop

NGram Search

Figure 14

Example Data from RAGTruth

Query 1400 what are some physical and chemical properties of magnesium and calcium Source Passages 1401 The chemical properties of calcium are reacts with oxygen and reacts with water. There are other chemical properties, but not all of them are true for calcium.These are the two that I know.he chemical properties of calcium are reacts with oxygen and reacts with water. There are other chemical properties, but not all of them are true for calcium.

1402 Chemical and Physical Properties of Magnesium. Magnesium is one of the most important elements that is present in many compounds as well as alloys. It is widely used as a chemical reagent, desulfurization agent, and vital ingredient in fireworks.It finds multiple applications due to its unique chemical and physical properties.s mentioned in the chemical properties, magnesium is also present in many other compounds like dolomite, magnesium carbonate (that is also known as magnesite), and magnesium sulfate (which is also known by the name epsomite).

1403 Calcium: Physical Properties --silver-grey metal. melts at 840°C, boils at 1484°C to produce monatomic gas. density 1540 kg/m^3. Conductor of electricity but a poor one com … pared to most other metals.Diamagnetic. Chemical properties -- tarnishes rapidly in air to produce a powdery, flaky oxide coating.Reacts steadily with water, giving off bubbles of hydrogen and a solution/slurry of alkaline, sparingly soluble calcium hydroxide. Flammable at high temperatures with oxygen, or air.an also burn in nitrogen to form calcium nitride or carbon dioxide to form calcium carbonate. Nearly all compounds are in oxidation state +2, and the water chemistry of calcium is dominated by the hydrated Ca(2+) ion.

Example BSD Natural Language Response Formatting Training Set Generation

Example ISAR Query Response with BSD Natural Language Formatting

Sentence Splitting Performance

Using FFs to Eliminate RAGTruth Hallucinations

Narration Summary Performance

SYSTEM AND METHOD FOR ACCURATE RESPONSES FROM CHATBOTS AND LLMs

CROSS-REFERENCE TO RELATED APPLICATIONS

This application is a nonprovisional application of and claims priority from: U.S. provisional patent application Ser. No. 63/761,053 filed on Feb. 20, 2025; U.S. provisional patent application Ser. No. 63/750,084 filed on Jan. 27, 2025; U.S. provisional patent application Ser. No. 63/716,119 filed on Nov. 4, 2024; U.S. provisional patent application Ser. No. 63/668,678 filed on Jul. 8, 2024; U.S. provisional patent application Ser. No. 63/566,107 filed on Mar. 15, 2024. The foregoing applications are incorporated in their entirety herein by reference.

FIELD OF THE INVENTION

The invention relates to natural language processing and the subfield of artificial intelligence. More particularly, the invention relates to systems and methods of providing accurate responses from language models and chatbots, including for question and answering, exposition, and summarization by avoiding and bypassing noun phrase collisions and correcting for errors caused by noun phrase collisions so that hallucinations are eliminated from LLM responses.

BACKGROUND

Engineers have been attempting to solve the problem of accurate question and answering since the early 1960's. In 1961, a group of researchers at MIT created a program that answered questions about baseball. In 1966, Joseph Weizenbaum created ELIZA-one of the first conversational chatbots. ELIZA simulates conversation using pattern matching and substitution methodology.

Yet, there still remains a long-felt need for solving the technological NLP problem of accurate, automated question and answering (Q/A). Consider two models that OpenAI has released since GPT-4: GPT-4o and o1. In regards to the NLP process of open-ended questions, GPT-4o has an error rate of 82%; and o1 has an error rate of 78%. OpenAI's official o1 system card documents both error rates.

One of OpenAI's latest models, o3-mini, has an exceptionally high error rate of 86.6% when answering the simplest of questions—an 86.6% error rate on the SimpleQA benchmark.

Meanwhile, models that claim to be hallucination free are unusable in production. Consider the paper released with accompanying code for LP-LM as a perfect case in point: "LP-LM: No Hallucinations in Question Answering with Logic Programming" by Katherine Wu and Yanhong A. Liu. LP-LM has a process for inputting a sentence (add_kb), and a process (query_kb) for generating a response based on the sentences individually stored through their respective add_kb calls.

LP-LM was tested using the researcher's code without any modifications. The add_kb was first used to store a simple sentence regarding New York City. The process failed. It tokenized New York City as [new, york, city] and then wrongly classified it as [adjective, UNKNOWN, noun]. This is wrong on all three counts, as New York City is a noun—not just 'city'). Moreover, the parser treats "new" as an adjective, and discards "york" as unknown. The fact that the first sentence tested is stored in an incorrect format betrays the claim of "no hallucinations." Numbers are also not handled properly as well.

Due to the issue with numbers, add kb was tried with the following: "The population of Amsterdam is big." This simple sentence failed to ingest because it did not match any of the exact linguistic structures that the model is looking for. Hence, the model is unusable for production purposes.

One more test was conducted. Each of the following sentences was ingested with a separate kb_add call: "The man ran to the store" and "The man ran as mayor". Both ingested. Then query_kb was called with: "Where did the man run". The response was: as (mayor). Aside from the non-natural language output, the response is wrong. Hence, within a couple minutes, the model hallucinated-on an extremely simple example at that.

The model is too restrictive to use due to the requirement for text to match exact linguistic structures. The researchers acknowledge this limitation. Their proposed potential solution is to use an LLM to summarize text, but this introduces hallucinations all by itself. In fact, this is one of the NLP tasks that this present disclosure solves.

OpenAI's latest model, GPT-4.5, was just released on Feb. 27, 2025. Ars Technica sees this model as proof that hallucinations cannot be soled by LLMs themselves: "For now, it seems that GPT-4.5 may be the last of its kind-a technological dead-end for an unsupervised learning approach that has paved the way for new architectures in AI models, such as o3's inference-time reasoning" The following headline in Futurism sums up the issue: "OpenAI Admits That Its New Model Still Hallucinates More Than a Third of the Time."

It's important to note that the one-third hallucination rate for GPT-4.5 is on SimpleQA—quite literally one of the simplest QA benchmarks. This benchmark is too simple to be used as a measurement for production trustworthiness. In other words, the hallucination rate of GPT-4.5 will be much higher when applied to actual production tasks.

As noted by Ars Technica, the technical dead end of GPT models is currently being replaced with the pursuit of so-called "reasoning" models. However, these models tend to perform worse on QA, not better. As stated above, OpenAI's o1 reasoning model has an error rate of 78% on open-ended QA. Meanwhile, its o3-mini reasoning model has an exceptionally high error rate of 86.6% when answering the simplest of questions—an 86.6% error rate on the SimpleQA benchmark.

The deep double digit hallucination rates by the most popular AI models show that despite sixty years of trying, the industry has yet to find the solution of creating chatbots that accurately answer questions.

Thus, there is a long-felt need for chatbots that return accurate responses.

SUMMARY

The invention relates to systems and methods for obtaining accurate responses from large language models (LLMs) and chatbots, including for question and answering, exposition, and summarization. These systems and methods accomplish these objectives via use of noun phrase avoiding processes such as a noun phrase collision detection process, a query splitting process, and a topical splitting process as well as by use of formatted facts, formatted fact model correction interfaces (FF MCIs), bounded-scope deterministic (BSD) neural networks, processes and methods, and intelligent storage and retrieval (ISAR) systems and methods. These systems and methods avoid and bypass noun phrase collisions and correct for errors caused by noun phrase collisions so that hallucinations are eliminated from LLM responses.

The systems and methods described herein provide advantages over existing systems and methods by providing accurate responses from language models and chatbots, including for question and answering, exposition, and summarization. These advantages include the elimination of hallucinations in responses from chatbots and LLMs. The systems and methods described herein provide accurate responses from chatbots and LLMs by avoiding and bypassing noun phrase collisions and correcting for errors caused by noun phrase collisions so that hallucinations are eliminated from responses.

Accordingly, the invention features a system for detecting noun phrase collisions. The system includes a parts-of-speech tagging process for identifying at least one noun phrase in a text, a vector embedding process for transforming the at least one noun phrase into a vector embedding, and a text similarity measurement process for computing a similarity score between at least one pair of vector embeddings in an electronic knowledge base. The at least one pair of vector embeddings is determined to include a noun phrase collision when the similarity score is greater than a threshold.

Unless otherwise defined, all technical terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents and other references mentioned herein are incorporated by reference in their entirety. In the case of conflict, the present specification, including definitions, will control.

BRIEF DESCRIPTION OF THE DRAWINGS

FIG. 3 is a table providing examples of training inputs and training outputs for creating a BSD Sentence Simplification Neural Network.

FIG. 14 is an example of data, including a query and source passages, from RAGTruth.

DETAILED DESCRIPTION

Figure 1:
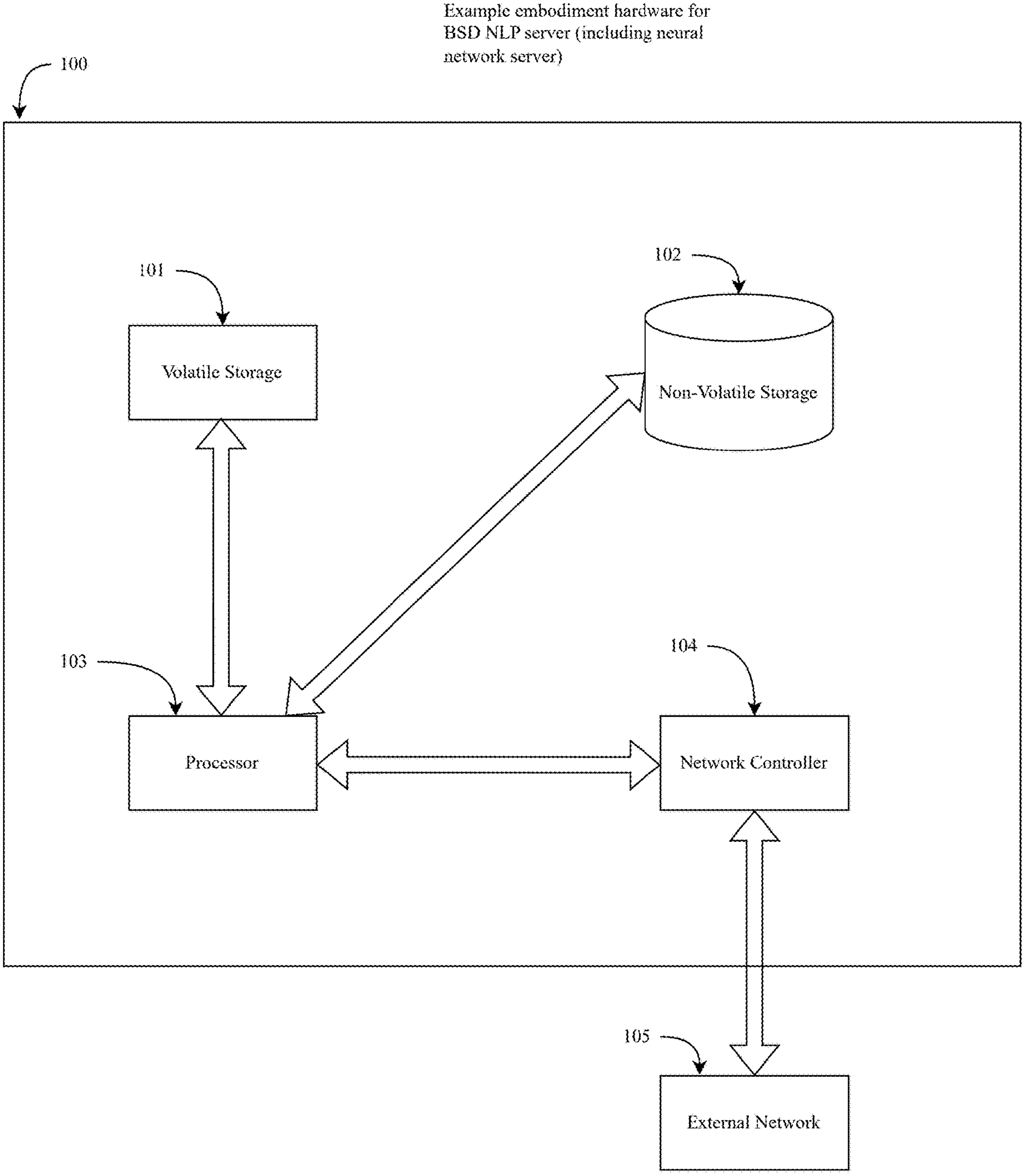
FIG. 1 is a schematic diagram of one embodiment of hardware for an NLP server (including a neural network server).

Embodiments combining some of the inventive steps are discussed below with reference to the drawings; however, those skilled in the art will readily appreciate that the detailed description given herein with respect to these figures is for explanatory purposes as the invention extends beyond these limited embodiments. For example, in light of the teachings of the present invention, those skilled in the art will recognize a multiplicity of alternate and suitable approaches, depending upon the needs of the particular application, to implement the functionality of any given detail described herein beyond the particular implementation choices in the following embodiments described and shown. That is, numerous modifications and variations of the invention may exist that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The present invention should not be limited to the particular methodology, compounds, materials, manufacturing techniques, uses, and applications, described herein, as these may vary. The terminology used herein is used for the purpose of describing particular embodiments only and is not intended to limit the scope of the present invention. As used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" may be a reference to one or more steps or means and may include sub-steps and subservient means.

All conjunctions used herein are to be understood in the most inclusive sense possible. Thus, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise.

Structures described herein are to be understood also to refer to functional equivalents of such structures. Language that may be construed to express approximation should be so understood unless the context clearly dictates otherwise.

Unless otherwise defined, all terms (including technical and scientific terms) are to be given their ordinary and customary meaning to a person of ordinary skill in the art and are not to be limited to a special or customized meaning unless expressly so defined herein.

Terms and phrases used in this application, and variations thereof, especially in the appended claims, unless otherwise expressly stated, should be construed as open ended as opposed to limiting. As examples of the foregoing, the term "including" should be read to mean "including, without limitation," "including but not limited to," or the like; the term "having" should be interpreted as "having at least"; the term "includes" should be interpreted as "includes but is not limited to"; the term "example" is used to provide exemplary instances of the item in discussion, not an exhaustive or limiting list thereof; and use of terms like "preferably," "preferred," "desired," "desirable," or "exemplary" and words of similar meaning should not be understood as implying that certain features are critical, essential, or even important to the structure or function of the invention, but instead as merely intended to highlight alternative or additional features that may or may not be utilized in a particular embodiment of the invention.

Those skilled in the art will also understand that if a specific number of an introduced claim recitation is intended, such an intent will be explicitly recited in the claim, and in the absence of such recitation no such intent is present. For example, as an aid to understanding, the appended claims may contain usage of the introductory phrases "at least one" and "one or more" to introduce claim recitations; however, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C" is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.).

All numbers expressing dimensions, quantities, measurements, parameters, values, and so forth used in the specification are to be understood as being modified in all instances by the term "about" unless expressly stated otherwise. Accordingly, unless indicated to the contrary, the numerical parameters set forth herein are approximations that may vary depending upon the desired properties sought to be obtained.

The invention provides systems and methods of accurate Natural Language Processing (NLP) for high-level NLP processes using novel pipelines of low-level NLP processes, including methods for creating 100% accurate embodiments of the low-level NLP processes, thereby resulting in 100% accurate implementations of the pipelined high-level NLP processes. This novel method for creating 100% accurate low-level NLP embodiments is referred to herein as "Bounded-Scope Determinism." The novel pipelines for producing accurate high-level NLP embodiments are referred to herein as "Model Correction Interfaces" (MCIs). Various aspects of the systems and methods are shown in FIGS. 1-6.

The systems and methods described herein can be installed and performed on one or more computing devices. Each such computing device can include one or more displays for viewing content or other visual displays (e.g., graphical user interfaces, etc.) of the system and one or more user input devices for operating one or more controls or other parts of the system. In some exemplary embodiments, processes of the systems described herein are installed on and operated by one or more servers having a communicative connection to one or more computing devices via which a user or users access and use the system.

The computing device is a computer (e.g., a desktop computer or a lap top computer), a tablet computer, a cellular telephone (e.g., a smart phone), a personal digital assistant, a television (e.g., a smart television), a gaming device, a router, a server, a printer, a camera, or any other computing device having a processor and an associated memory and may also be capable of communicatively connecting to a communications network.

For convenience, in some instances, the communications network is referred to herein as the Internet; however, in some embodiments, the communications network can be a different type of network, e.g., a local area network (LAN), a wide area network (WAN), or a virtual private network (VPN). The communications network can include one or more of the types of networks identified above, including multiple instances of a type of network and combinations of one or more types of networks. The communications network can be wired, wireless, or a combination of wired and wireless networks.

In embodiments containing a display, the display is a computer monitor or display screen. The display is communicatively connected to the computing device and can be an integral part of the computing device or a separate device that includes a wired connection or a wireless connection to the computing device.

In embodiments containing a user input device, the user input device can be a mouse, a trackball, a touch pad, or a touch screen. The system's display can be a touch screen. In other embodiments, the system can include both a display and a separate touch screen device. In some embodiments, the user input device is a microphone communicatively connected to a computing device that includes software for receiving a voice command to select a link shown on the display. In one embodiment, the user input device used to select the link is a brain-computer interface. In other embodiments, the user input device can be a pointing device, keyboard, joystick, gamepad, jog, dial, camera, button, switch, controller, or voice command device. The user input device is communicatively connected to the computing device and can be an integral part of the computing device or a separate device that includes a wired connection or a wireless connection to the computing device.

In embodiments containing a server, the server can be remote from the location of the computing device or in the same location as the computing device. The server may include some or all of the processes described herein installed thereon, which are then accessible to one or more computing devices via a communicative connection provided by the communications network between the server and the one or more computing devices.

The term "content," as used herein, includes documents (e.g., Word, Excel spreadsheet, or PDF documents), videos, audio files and recordings, photographs, images, web pages, emails, text messages (e.g., SMS and MMS messages), chat messages, instant messages, and social media application and website posts and messages.

Disclosure Roadmap

This disclosure introduces BSD NLP-a system and method for training neural networks to perform NLP tasks with 100% accuracy. The disclosure then shows how to use BSD NLP to produce 100% accurate sentence splitting (called BSD Sentence Splitting).

The disclosure then shows how use BSD Sentence Splitting to create BSD Coreference Resolution—a 100% accurate coreference resolution neural network. The disclosure then shows how to pipeline BSD Sentence Splitting and BSD Coreference Resolution to create Formatted Facts (FFs). The disclosure then shows how to wrap NLP models with FF Model Correction Interfaces (FF MCI) to correct for any errors made by an NLP process, including correcting for errors made by chatbots and LLMs.

Up to this point, the disclosure focuses on the internal knowledge of NLP systems. Therefore, it then discloses ISAR an intelligent storage and retrieval system and method for external knowledge storage and retrieval. ISAR is built upon FFs and other NLP processes.

Finally, this disclosure combines BSD, FF, FF MCI, and ISAR to disclose three methods of eliminating hallucinations in chatbots and LLMs. These three methods can be used in isolation or in combination, making this disclosure one unified whole.

100% Accurate NLP

This disclosure presents three systems and methods that can be used to achieve 100% accuracy on both Low-Level NLP Tasks and High-Level NLP Tasks.

Figure 2:
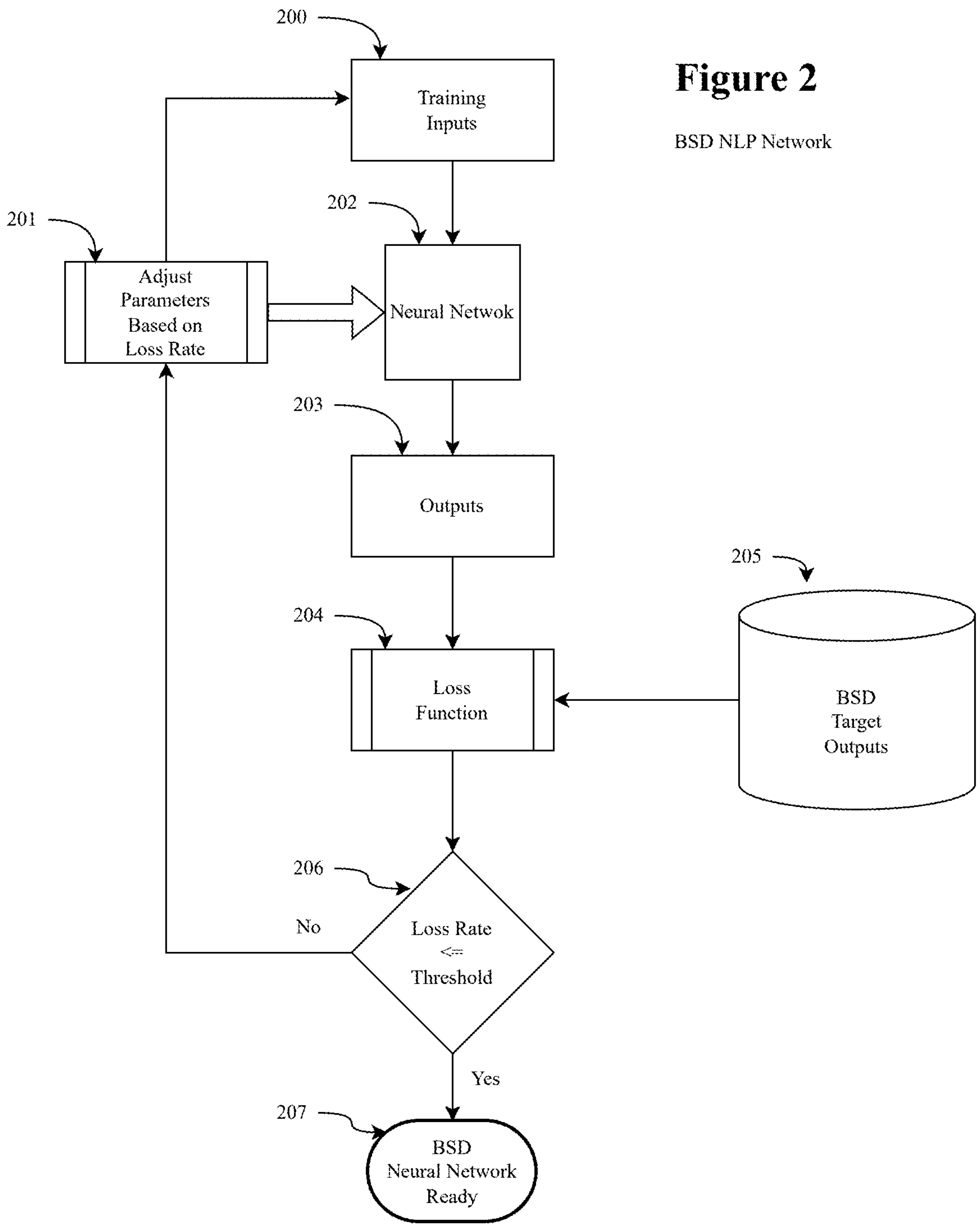
FIG. 2 is a flow diagram of one embodiment of a BSD neural network.
Figure 17:
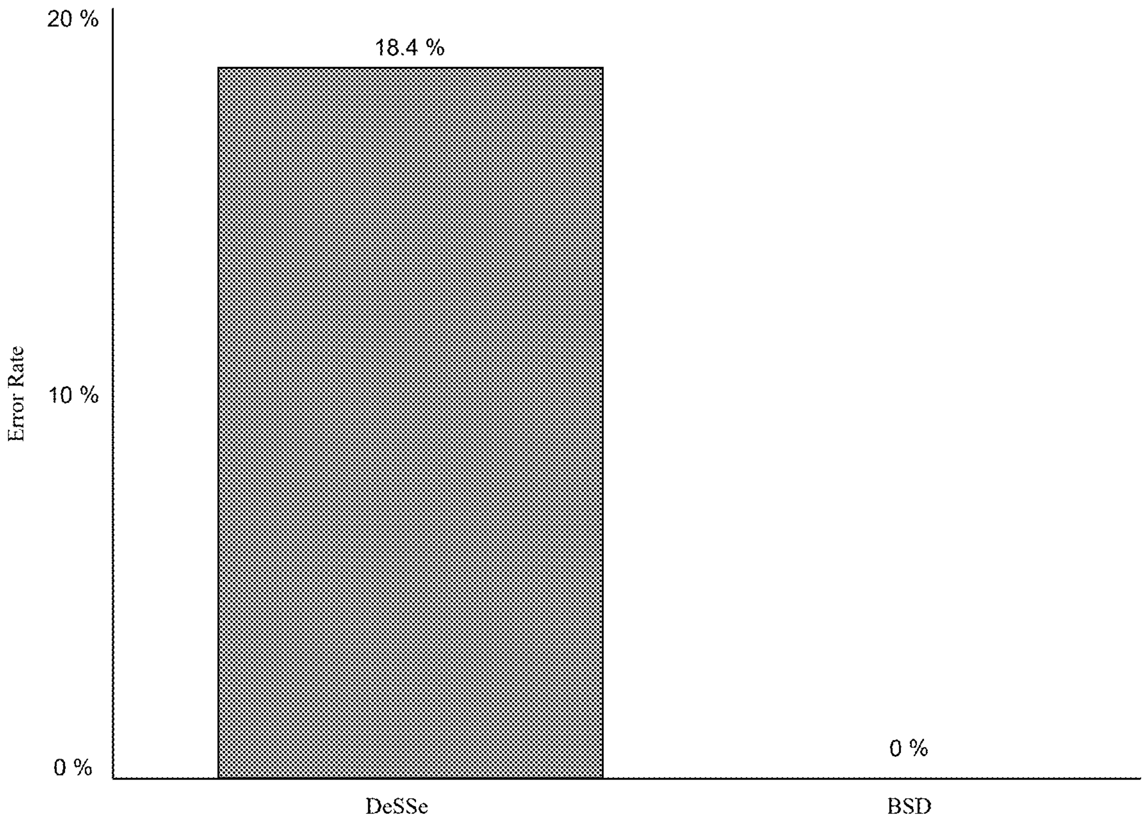
FIG. 17 is a is a chart that compares the 18.4% error rate for the state-of-the-art method of sentence splitting to the 0% error rate for a real-world BSD Sentence Splitting neural network of the present invention.

First, this disclosure presents a system and method for training BSD NLP Networks (see FIGS. 1-2). BSD NLP is a method of training neural networks to perform NLP tasks with 100% accuracy. For example, the state-of-the-art (SOTA) sentence splitting method has an 18.4% error rate. The SOTA neural network was trained on DeSSE—a dataset containing 13,199 entries. In stark contrast, a 5-entry BSD NLP set (see FIG. 3) used in few-shot prompting resulted in a 0% error rate in internal testing (see FIG. 17). The accuracy of the 5-entry set was tested by splitting 2,500 sentences in BBC news articles. In comparison, the developers of the SOTA method tested only 790 sentences. In other words, 5-entry BSD NLP maintained 100% accuracy in more stringent testing.

Second, this disclosure shows how to use BSD NLP Networks to create Formatted Facts (FFs). FFs are simple, self-contained facts derived from the input text. FFs can be used to significantly improve the accuracy of virtually every NLP task. For example, a system built on top of FFs eliminated 100% of the hallucinations in the RAGTruth Corpus for GPT-4 and GPT-3.5 Turbo for both Evident and Subtle Conflicts (see FIG. 18). For additional details, see "100% Hallucination Elimination Using Acurai." (https://arxiv.org/html/2412.05223v1)

Finally, this disclosure presents a system and method called Formatted-Facts Model Correction Interface (FF MCI). The FF MCI can be wrapped around virtually any fact-based NLP task to ensure 100% accurate responses.

Figure 19:
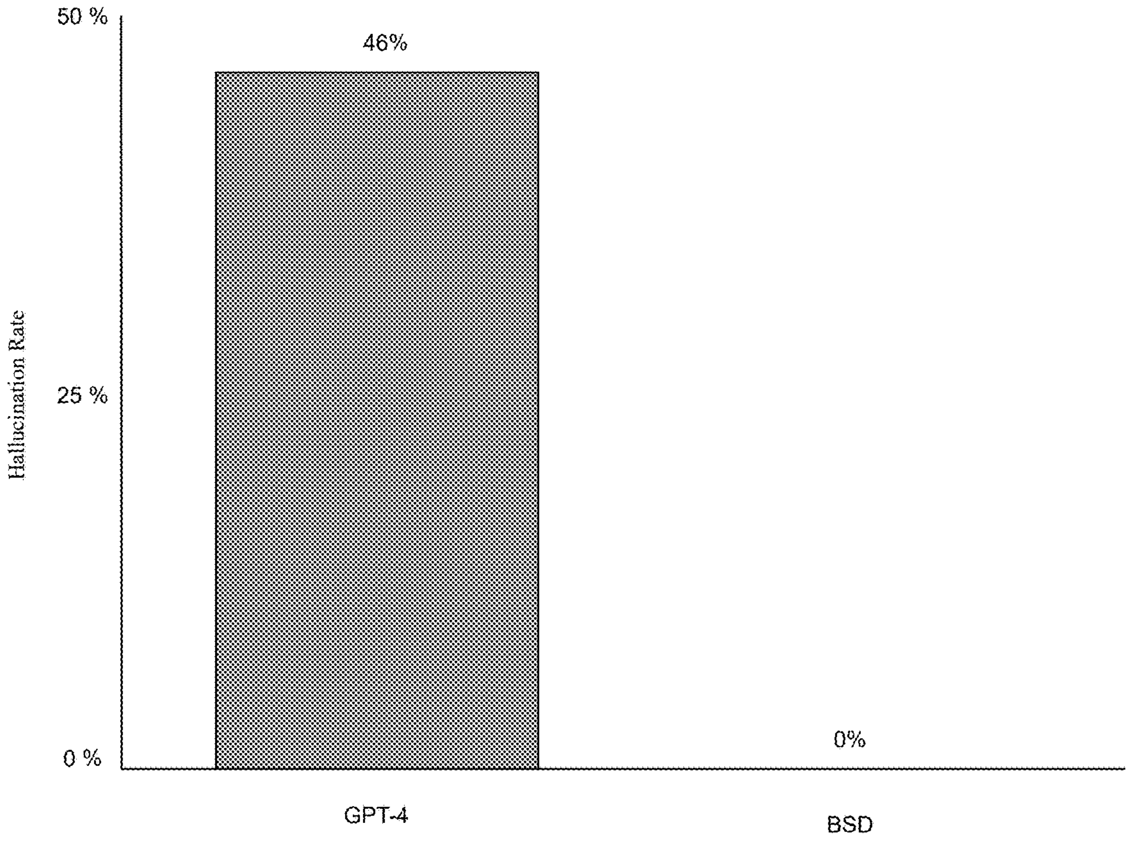
FIG. 19 is a chart that compares the hallucination rate of GPT-4 (46%) versus a real-world BSD Summarization neural network (0%) of the present invention on text of similar length.

FF MCI was internally tested on summarizing BBC news articles. Apple News recently discontinued providing BBC news summaries due to unacceptable hallucinations in Apple's technology. The tested FF MCI embodiment of the systems and methods of the present invention had zero hallucinations when summarizing 500 BBC news articles. BBC News articles are of similar length to documents used by other researchers when assessing GPT-4's summarization capabilities. FIG. 19 compares the hallucination rate of the real-world BSD Summarization neural network (0%) of the present invention to the hallucination rate of GPT-4 (46%) when summarizing narration of similar length.

Thus, the systems and methods disclosed herein achieved 100% accuracy on Low-Level NLP tasks (such as sentence splitting) and High-Level NLP tasks (such as summarization), and they can also be used as the foundational building blocks in larger systems for 100% accuracy in LLMs and chatbots.

Bounded-Scope Deterministic NLP (BSD NLP) Vs. SOTA Training Methods

BSD NLP is a system and method for training a neural network to perform an NLP task with 100% accuracy.

BSD NLP is perhaps best explained by way of contrast. Therefore, this section contrasts BSD NLP Network training of the present invention against the way NLP training is done in the current art. This section discloses the core criteria and steps of BSD NLP by comparing it to SOTA methods for training neural networks to perform sentence splitting.

Sentence splitting is a fundamentally important NLP task. After all, sentence splitting is a fact extraction process. Neural networks trained using BSD NLP achieve 100% accurate sentence splitting (hence 100% accurate fact extraction).

The SOTA datasets used to train neural networks for Sentence Splitting and Rephrasing are: DeSSE, BiSect, WikiSplit, and WebSplit. DeSSE has 13,199 entries. BiSect has 928,440 entries. WebSplit has 1,331,515 entries. The 5-entry BSD set (see FIG. 3) achieved 100% accuracy whereas neural networks trained on over one million entries achieved approximately 80% accuracy or less. Just 5 BSD NLP entries significantly outperformed neural networks trained on over one million other types of entries. That is because each BSD NLP entry is structured in a very specific manner that communicates to the neural network precisely what it needs to learn to do. This has been the missing key to 100% accurate NLP neural networks.

In short, the industry has been training language-based neural networks using stochastic, non-deterministic methods. On one hand, the industry may seem to be pursuing the correct path. After all, there are many grammatically correct ways to split a larger sentence. Therefore, it can even seem incorrect for a neural network's loss function to assign a penalty cost to a grammatically correct split during training.

Yet, as will made clear shortly, BSD NLP intentionally causes the loss function to assign a cost to grammatically correct sentence splits. In fact, counterintuitively, BSD NLP often requires the loss function to assign a cost to the vast majority of grammatically correct splits.

Compare training neural networks on WebSplit versus training neural networks using BSD NLP. The WebSplit dataset provides many grammatically correct outputs for each input. Consider the following sentence: "Auburn is part of Lee County in Alabama which is situated within the state of Alabama in the United States where one of the ethnic groups in the United States are the African Americans." The WebSplit dataset contains 64 alternative splits for this sentence alone. In other words, there are 64 entries in the data set where the input is this same sentence. However, each of the 64 outputs provides one grammatically correct alternative for splitting that sentence. Hence, for this one sentence, there are 64 input=>output pairs, where each output gives an alternative correct split.

In stark contrast, a preferred BSD NLP embodiment requires that there is only one unique output for each unique input. Assuming there are only 64 ways to split the above sentence, this means that 63 out of 64 splits will be deemed an error during training, even though they are grammatically correct. In terms of this sentence, that means 98% of the grammatically correct splits are counted as being errors. If there are more than 64 grammatically correct splits, then more than 98% of the grammatically correct hits will be considered to be an error when training a neural network using preferred embodiments of BSD NLP.

BSD NLP stands for Bounded-Scope Deterministic NLP. The NLP part of the name signifies that the input text must contain at least one human-language sentence. The BSD part is built on two aspects: bounded in scope, and deterministic. Bounded scope refers to the number of required transformations being small enough to be learned (e.g., small enough to achieve a zero cost value from the loss function during training). As for the determinism aspect of BSD, there are seven criteria:

1) There is only one unique output per unique input.
2) The unique output must be deterministically derived from the input text.
3) The selection of transformations that produce the output must be
deterministically derived from the input.
4) The selected transformations must be uniformly applied to all outputs.
5) Where the resulting output has multiple values, such that the order of the values
can be changed without information loss, the order of the values must be sorted in a deterministic manner. Preferred embodiments will use first positional occurrence sorting.
6) Where the deterministic selection of transformations can be null, there must be at least one input=>output pair in which the inputs and corresponding outputs are identical in every respect. The inclusion of additional such pairs will reduce both the size of the neural network required and reduce the training time and cost.
7) Where selection counter examples exist, they must be provided in the input, and the corresponding outputs must be identical to the input.

Training neural networks on WebSplit does not involve any of the above steps. Training neural networks on the rest of the SOTA datasets does not involve implementing criteria 2-6. Yet, as is explained below, steps 2, 3, and 4 are core criteria; and steps 5, 6, and 7 are conditional core criteria. Hence, SOTA training lacks all of the core criteria (at least in terms of SOTA sentence splitting).

The following explains how to train a neural network to accurately split larger sentences into smaller ones. Consider a simple transformation (Transformation X): Remove the word 'and'; if the next word is a noun, then add the same punctuation used at the end and capitalize the next word; if the next word is a verb, add the same punctuation used at the end, add the noun subject of the prior statement, capitalize the added noun subject.

On the surface, splitting a sentence on the word 'and' appears trivial. However, even Transformation X is insufficient to qualify as being deterministic. What if the noun subject is a nested noun phrase? What gets added to the beginning of the new split: the entire nested noun phrase, the complex noun phrase, the noun phrase, or the root noun phrase? Each embodiment must implement a deterministic choice, and apply that choice consistently.

A preferred embodiment would implement the entire noun phrase length (including nesting) to ensure the preservation of meaning. This deterministic criterion means that there is only one correct choice for what gets added to the beginning of the new split. One correct choice, and only one. Everything else is an error when computing the loss function-regardless of whether it is grammatically correct or not. Adding this step to Transformation X results in Deterministic Transformation X.

Even though Deterministic Transformation X is only a very simple example of criteria 2 and 3, notice already that none of the SOTA training methods do either of these. In other words, even before introducing additional transformations, BSD NLP is already different from SOTA sentence splitting.

Consider step #2: deterministically derive the output from the input. WikiSplit annotators had a free hand in choosing where to split. They also freely added words of their own choosing. Thus, step #2 was not performed in the creation of the WikiSplit dataset. The other training datasets also gave the annotators a free hand on where to split, and the annotators also added words of their own choosing. Thus, none of them implemented step #2.

This is literally the opposite of Deterministic Transformation X. Notice how Deterministic Transformation X dictates the precise words that must be added (e.g., the entire noun phrase length of the subject noun phrase (including nesting)). That is the mirror opposite of allowing annotators to choose. In BSD NLP, the D means there are no choices during training. If the deterministic transformation has two or more viable alternatives, then it is not a deterministic transformation in the first place.

Consider step #3: deterministically choose the selected transformation based on the input. Once again, the creation of the SOTA datasets did not include this step. WikiSplit and BiSect always split the input into two sentences. This means that the annotator subjectively chooses whether to split a particular sentence on "and," or "but," or "wherein," etc. There is no deterministic selection of transformation based on the input.

However, Deterministic Transformation X always results in one split for each 'and' that serves as a coordinating conjunction. If there is one such 'and,' then there is one split. If there are two such 'ands,' then there are two splits. And so forth.

The mere fact that WikiSplit and BiSect force the input into two splits further demonstrates that step #3 was not used (in addition to not using step #2). Likewise, the annotators of DeSSE were instructed to pick one to four splits of their own choosing from a list of recommended splits. Hence, DeSSE also did not implement step 2 or step 3.

Just as step #2 is the mirror opposite of SOTA training, so too is step #3 another step that is mirror opposite of SOTA training.

Now consider step #4: The selected transformations must be uniformly applied to all outputs. As stated above, in regards to Deterministic Transformation X, the transformation must be applied every time the word 'and' serves as a coordinating conjunction. Also as stated above, none of the SOTA training sets uniformly applied even one transformation across the entire training set, thereby not implementing this step as well.

SOTA NLP training is based on the idea that neural networks learn intelligence, with the idea being that if the neural network is given a variety of correct ways to split a sentence, then it can learn to choose the best way for any given new sentence.

BSD NLP is based on the exact opposite premise, which is why the steps are literally the mirror opposite of SOTA training methods. BSD NLP is based on the premise that every choice introduced in the outputs adds a degree of error—not a degree of intelligence. The fundamental training premises could not be more different.

Now consider step #6: Where the deterministic selection of transformations can be null, there must be input=>output pairs in which the inputs and corresponding outputs are identical in every respect.

Not all sentences need to be split. For example, where splitting is solely based on Deterministic Transformation X, then sentences that do not have the word 'and' should not be split. Therefore, the training data needs to contain examples of when not to split. That is the meaning of step #6 as it relates to sentence splitting.

Yet, notice that none of the SOTA training sets contain even one instance where the input remains the same. Unlike SOTA, BSD NLP says that the neural networks do not learn intelligence, they learn to perform the path of least resistance instead. Thus, the neural network needs to be told when to do nothing so that doing nothing is included in its learned path of least resistance.

Notice that Deterministic Transformation X makes an evaluation on the word 'and.' It evaluates whether the word is serving as a coordinating conjunction.

Consider the following sentence: "Tom and Mary walked into the house and sat down." Only the second 'and' serves as a coordinating conjunction. The first 'and' does not.

Step #7 means that there should be counter example inputs for every evaluation made by the deterministic selectors.

In terms of transformation X, this simply means there needs to be inputs that include the word 'and' where 'and' is not being used as coordinating conjunction; and therefore, there is no split. Hence, the output equals the input.

Again, since all the datasets solely contain splits, they also do not implement step #7 either.

In short, there are two types of non-splits (i.e. two types of output=input): inputs where no transformation is even selected, and inputs where the selected transformation declines to perform the transformation due to one or more deterministic evaluations. The criteria in steps #6 and #7 define the types of inputs to include to produce a corresponding output that signifies that a transformation did not take place. Hence, an alternative output to accomplish the same thing can be to return a predefined value (such as "[BLANK]") as the target output, as this accomplishes the criteria of signifying when a transformation did not take place.

Once the steps are understood, they can easily be applied to training a neural network on virtually any NLP task, including sentence splitting. And because the training is based on the inverse of SOTA methods, it produces profoundly different results. In fact, where all the steps are followed in producing the input/output pairs, the resulting BSD NLP Network can achieve 100% accuracy-a significant leap in performance over current systems and methods in the technical field of NLP.

Target BSD Output

A preferred BSD NLP embodiment will employ all seven criteria/steps. However, steps 2-4 are core BSD NLP criteria. Steps 5-7 are conditional core BSD NLP criteria (i.e., they are core components in NLP tasks that meet the stated condition of the criteria). Consider an embodiment in which a transformation selection can be null. For such an embodiment, step #6 is a core component because of this condition.

A preferred embodiment will implement all core criteria, and it will implement all conditional core components that match the conditions of the embodiment. Such a preferred embodiment thereby produces Perfect BSD Target Outputs from the corresponding training inputs.

However, an embodiment that implements at least one core criteria and/or implements one conditional core criteria falls within the spirit and scope of this disclosure. While the combination of core criteria ensures 100% accuracy, some NLP tasks may only require implementing some of the core criteria to significantly improve accuracy-even to the point of 100% accuracy. Moreover, BSD criteria are so transformative that even applying them to part of a dataset can significantly improve performance. Therefore, doing so falls within the spirit and scope of this disclosure.

For example, the five entries in FIG. 3 implement core criteria 1 through 6. Yet, in regards to Sentence Splitting, the fulfillment of criteria 1-6 allowed five examples to achieve 100% accuracy on 2,500 sentences in BBC news articles (see FIG. 19).

Herein, BSD Target Output refers to implementing at least one core criteria for transforming inputs containing human-language sentences into deterministically transformed NLP output. Where all core criteria are applied, as well as all conditional core criteria that are applicable to the conditions of the embodiment, the NLP deterministic transformation of such sentence-containing training input shall be referred to as Perfect BSD Target Output.

Step #5: BSD NLP Output Sorting

None of the sentence splitting datasets implement step #5 because it does not apply to splitting a complex sentence into five sentences. The task itself results in ordered output—in order to preserve the meaning of pronouns.

However, some NLP tasks can result in the output containing multiple values whose values can be presented in at least one different order while preserving all information. Such NLP tasks meet the condition of step #5, and therefore, such a preferred embodiment would included step #5 to ensure 100% accuracy.

Moreover, such preferred embodiments will use first positional occurrence sorting. This simply means sorting the order of the values based on the order in which they first appear in the input.

For complex NLP tasks based on multiple steps, a separate first positional occurrence sorting can be applied at each step. This is explained immediately below.

Consider the task of extracting facts about people in a text. Here, the task may involve two levels (i.e., two steps): identify all people, and identify all facts in the input about each person.

When there are multiple levels of an NLP task, a preferred BSD embodiment can use first positional occurrence sorting for each level. Consider a series of self-contained statements. Some statements are about Alice and others are about Bob. Alice is mentioned first. However, some of the statements about Alice occur after Bob is mentioned.

One deterministic method is to use a one-pass first positional occurrence sorting across the dataset. Thus, the Alice and Bob extractions will occur left to right in a single pass.

Thus, some of the Alice statements will indeed be included in the target output after some Bob extracted statements.

However, a multi-level first positional occurrence would allow the target output to be deterministically organized as: {name}: \nFact_1\nFact_2\n . . . . In other words, the facts about each person are grouped together immediately after the person's name.

Since this is a two-level task, a two-pass first positional occurrence sorting can be used. The sort order of the names is determined by the first pass. The order of the extracted facts is determined by the second pass. In this way, all of the statements regarding Alice and Bob are grouped together under their respective names while still preserving the requirement of deterministic first positional occurrence sorting.

As long as each name is selected in the order in which they appear in the text; and as long as the facts regarding each name are listed in the order they appear in the text; and as long as the extraction of the facts is done in a deterministic manner (e.g., preserving the facts verbatim), the BSD neural network can now extract grouped facts about people with 100% accuracy.

BSD Neural Network Training revolutionizes the use of neural networks for NLP and the NLP subfield of AI. It consistently results in 100% accuracy, even on complex language tasks.

At first blush, the preference of first positional occurrence sorting may seem insignificant. However, modern language models are built on token-based transformers. These transformers do not have any inherent awareness of the individual characters in the words they are processing. Hence, using alphabetical sorting would require increasing the size of the model many magnitudes (if such can even overcome the limitation). However, token-based transformers inherently possess positional awareness. By basing the sorting on position, the sorting is based on the inherent capabilities of the architecture, thereby allowing smaller models to achieve 100% accuracy.

Example Embodiment of BSD Neural Network

BSD Target Output refers to a target output that is deterministically derived from a training input in accordance with the above criteria. Any neural network trained on at least one BSD Target Output falls within the spirit and scope of this disclosure.

FIG. 1 and FIG. 2 illustrate an example embodiment of a BSD Neural Network. FIG. 1 depicts example hardware. FIG. 2 depicts an example process flow for training a neural network.

FIG. 1 shows a BSD neural network 100 (e.g., an NLP server) that includes a volatile storage 101 and a non-volatile storage 102 communicatively connected to a processor 103. The processor 103 is communicatively connected to a network controller 104 that communicatively connects the BSD neural network 100 to an external network 105.

The Training Inputs 200 contain at least one human language component. Training inputs are converted into numerical sequences (usually by tokenization) such as converting text to numerical tiktokens (as OpenAI does for its GPT models). Another popular method is to use SentencePiece to convert text into numerical sequences (as the Llama family of LLMs does). Any method for converting text into numerical sequences falls within the spirit and scope of this step. The numerical sequences are the actual input into the electronic Neural Network 202. Example neural networks include RNN, CNN, and transformer-based (such as GPT). Any supervised neural network can be used, provided that it supports training on text inputs and outputs. The training method depicted in FIG. 2 can be applied to both seq2seq and autoregressive models. Those ordinarily skilled in the art know how to set up the supervised training of seq2seq, autoregressive, and other supervised neural networks. They also know how to choose the model architecture for the given NLP task at hand.

In seq2seq, each input 200 would be sent to the Neural Network. In autoregressive training, a sliding window would likely be used where each numerical token from the target output 205 is appended token-by-token to the input 200 to form another input; whereas the next token in the target output is the desired result in the given iteration. Those ordinarily skilled in the art know how to implement both seq2seq and autoregressive networks without further explanation.

For each iteration (i.e., epoch), the Loss Function 204 computes the difference between the output 203 of the Neural Network 202 and the corresponding BSD Target Output 205. It is this step where a Loss Function 204 uses BSD Target Outputs to compute the "loss" (or "cost"). It is this step where over 98% of grammatically correct sentence splits can be assigned a penalty cost during BSD NLP training on sentence splitting.

Embodiments can use Cross-Entropy Loss (Log Loss), KL Divergence, Reinforcement Learning, Contrastive Loss or any other loss methods. Any loss method that computes cost relative to the output of the Neural Network and at least one BSD Target Output is a novel innovation, and therefore, falls within the spirit and scope of this disclosure (where the BSD Target Output is a bounded-scope, deterministic transformation of the correlating Training Input).

Herein, for simplicity, Loss Function shall refer to loss functions known in the art, as well other measurements such as those used in reinforcement learning. While loss functions would typically be used for computing token-by-token differences in NLP neural networks (such as Large Language Models), Reward Signals could be used on a whole sequence basis and are therefore simply referred to as Loss Function herein. Thus, the term Loss Function is not meant to limit the seq2seq or token-by-token loss calculations chosen for any given embodiment. The limitation is that at least one BSD Target Output be used when computing such. This is the step that can transform the current art from 80% accuracy to literally 100% accuracy. This step can be applied to virtually any Low-Level NLP Neural Network to profoundly increase accuracy. Where a zero loss is eventually reached, the accuracy can literally be 100%.

If the loss during the iteration is less than or equal to the chosen threshold 206 then the training is done 207. The current state of the trained parameters allows for the Neural Network to accomplish its task with optimal accuracy. The state of the trained parameters can be stored in RAM, on disk, in the cloud, or via any other method (thereby allowing the model and its optimal parameters to be replicated on various devices). Moreover, the model with the optimized parameters can be saved as a whole to permanent storage.

Once the threshold has been reached, any input can now be sent to the Neural Network, and the output will be accurate (up to 100% accurate where a zero loss has been reached).

If the threshold has not been reached 206, then the trainable parameters are adjusted relative to the loss 201. Methods for adjusting the parameters (such as weights and biases) are well-known in the art (such as using back propagation and gradient descent with optimizers such as Adam and RMSProp). As previously stated, the innovative step of determining loss based on outputs that are bounded-scope, deterministic transformations of the input can profoundly improve the accuracy of a multitude of NLP Neural Networks. Alternatively, where the scope cannot be bounded, determining loss based on deterministic transformation of the input will profoundly improve accuracy (where deterministic transformation meets the novel criteria disclosed herein). Hence, such would still fall within the spirit and scope of this disclosure.

BSD NLP for 100% Accurate Sentence Splitting

BSD revolutionizes the technological field of Natural Language Processing (NLP) by yielding 100% accuracy for low-level NLP tasks. Herein, BSD shall be used as shorthand for BSD NLP. For example, the BSD system and method produces Sentence Splitting embodiments that split sentences with 100% accuracy. See FIG. 2 and FIG. 3 for an example BSD Sentence Splitting embodiment. FIG. 3 provides an example embodiment of Training Input and corresponding BSD Target Output. The training data is typically provided to LLMs in JSONL files stored in volatile storage. However, there are many methods known in the art for providing the electronic training data to the neural network. Provided that the input contains human language, and provided that the target output is a deterministic transformation of the input (according to the criteria disclosed herein) such electronically provided training data falls within the spirit and scope of this disclosure. Electronically storing training data in either volatile memory, non-volatile memory, or both falls within the spirit and scope of this disclosure.

It bears noting that such training data can alternatively be used in few shot prompting in addition to or in lieu of being used for fine tuning. In fact, a 5-shot prompt using the example training data resulted in 0 hallucinations when simplifying 2,500 sentences from BBC articles.

A simple sentence splitting embodiment could include splitting complex sentences based on coordinating clauses that start with the word "and" (or another coordinating conjunction such as "but," "or," "for," "nor," "yet," or "so"). The transformation must also dictate under what deterministic conditions will words be added, and there must be a deterministic method for knowing precisely what words will be added (e.g., the entire subject noun phrase including nesting). In this situation, there is one objective transformation for converting each input into the target output, thereby satisfying the "determinism" aspect of BSD.

Given that the neural network is being used to process language, the network architecture could be a transformer-based model. However, since the bounded scope criteria is based on loss function, it can be a recurrent neural network (RNN), long short-term memory (LSTM), gated recurrent unit (GRU), convolutional neural network (CNN), and even a feed forward network. Moreover, it can include a future architecture, provided that such architecture includes a loss function and such loss function reaches a level below a given threshold; and where such architecture is trained using the aforementioned deterministic criteria.

Any trainable network or model containing learnable parameters that are adjusted at least in part by a loss function or other measurement of deviation between the neural network output and a provided target output, such that the provided target output is deterministically derived from the training input in accordance with the above, falls within the spirit and scope of this disclosure.

In regards to 100% accurate sentence splitting, consider the following input/output pairs:

Training Input: The cat sat on the chair and it was purring.
Target Output: The cat sat on the chair. It was purring.
Training Input: Tom drove home.
Target Output: Tom drove home.

The above is based on a single objective transformation of training input to target output. The sentences are split on the word 'and' where the word is being used as a coordinating clause, and where the word that follows the word 'and' is a noun phrase. Since sentence two does not have the word 'and,' no transformation is selected resulting in the target output being equal to the training input.

This exemplifies an alternative aspect of BSD. In BSD, the training set can include examples where the objective transformations result in the target output being identical to the training input. This greatly diminishes the size of the model needed, and greatly reduces the amount of training time required, to achieve zero or near-zero training loss. Therefore, achieving 100% accuracy with cheaper, smaller models.

Now, consider another simple BSD embodiment with multiple objective transformations. As a reminder, where multiple objective transformations exist, the selection of such transformation(s) must be deterministically derived from the input itself.

With this in mind, another embodiment could include splitting complex sentences using two objective transformations. The first objective transformation (OT) could be to split on coordinating clauses that begin with the word 'and' whenever the following word is not a verb (Deterministic Transformation Y). The second OT could be to split on coordinating clauses that begin with the word 'but' whenever the following word is not a verb (Deterministic Transformation Z). The multiple OTs would result in deterministically producing the following input/output training pairs:

Training Input 1: The cat was sitting on the chair and it was purring.
Target Output 1: The cat was sitting on the chair. It was purring.
Training Input 2: The dog wanted the bone but it was out of reach.
Target Output 2: The dog wanted the bone. It was out of reach.
Training Input 3: The dog was sitting on the chair and it wanted the bone but it was out of reach.
Target Output 3: The dog was sitting on the chair. It wanted the bone. It was out of reach.
Training Input 4: Harry met Sally.
Target Output 4: Harry met Sally.
Training Input 5: Tom and Mary drove home.
Target Output 5: Tom and Mary drove home.
Training Input 6: But, he chose to come over.
Target Output 6: But, he chose to come over.

While such an embodiment would require a larger neural network than the prior example, the number of learnable parameters would still be quite small compared to some of the most popular models in the art.

Notice also that the correct splitting may be one sentence (no splitting), two sentences, or even three sentences. Where objective transformations are applied, the number of output sentences can vary. In fact, splitting complex sentences can result in anywhere from one to a dozen (or even more) simpler sentences in certain embodiments.

Notice how the entries conform to the criteria:

Pair 1: Selecting and Implementing Deterministic Transformation Y
Pair 2: Selecting and Implementing Deterministic Transformation Z
Pair 3: Selecting and Implementing Deterministic Transformation Y & Selecting and Implementing Deterministic Transformation Z Pair 4: Null Selection of Transformations (i.e., no transformations selected).

Pair 5: Selecting and Declining Deterministic Transformation Y

Pair 6: Selecting and Declining Deterministic Transformation Z

Hence, Pair 5 is an example of step #6. Pairs 5 and 6 are examples of step #7. Deterministic Transformation Y makes a deterministic evaluation based on the word 'and.' The determination is whether to implement the transformation or decline to do so. Therefore, the neural network needs a training entry for each of these scenarios (e.g., Pair 1 and Pair 5). Likewise, Deterministic Transformation Z makes a similar deterministic evaluation on the word 'but.' Hence, the neural network needs an example of both scenarios (e.g., Pair 2 and Pair 6). Thus, the seven steps/criteria guide the creation of entries for various deterministic decisions (e.g., Select and Implement Y, Select and Decline Y, Select and Implement Z, Select and Decline Z, null Selection (i.e., no Selection)). It is in this way that the path of least resistance equals performing the desired task with 100% accuracy.

A more sophisticated sentence splitting machine can include a set of objective transformations based on both clauses and prepositions. It can even include rewriting words, provided that the rewriting is deterministic.

For example, when choosing to write noun phrases during sentence splitting, an objective transformation must choose whether to consistently use a noun phrase, a complete compound noun phrase, a complete nested noun phrase, etc. The same objective transformation is applied consistently throughout the training set. In stark contrast to existing systems and methodologies, BSD is founded on deterministic consistency.

Likewise, consistency may be applied in regards to person named entities. For example, the chosen objective transformation may use the full name, or the last name, or an abbreviation, etc., provided that such is applied consistently throughout the training set.

Consider the following complex sentence: "Tom Smith of Dallas and husband of Mary loves to barbecue and he enjoys drinking beer."

If the objective transformation is based on noun phrase, there is only one correct split (and therefore, the correct split is objectively deterministic): Tom Smith of Dallas and husband of Mary loves to barbecue. Tom Smith enjoys drinking beer.

Any other split would be incorrect.

If the objective transformation is based on complex noun phrases, there is only one correct split: Tom Smith of Dallas and husband of Mary loves to barbecue. Tom Smith of Dallas enjoys drinking beer.

Any other split, including the prior example, would be incorrect.

If the objective transformation is based on nested noun phrases, there is only one correct split: Tom Smith of Dallas and husband of Mary loves to barbecue. Tom Smith of Dallas and husband of Mary enjoys drinking beer.

Any other split would be incorrect, including the prior two examples.

The bolded, italic terms illustrate how the objective application of a deterministic transformation provides the consistency that the neural network needs in order to fully master the task. While all three choices (and others) are linguistically correct, 100% accuracy comes from teaching the neural network one consistent objective. The current SOTA wrongly believes that neural networks will try to figure out the best alternative. This present invention is based on the correct understanding that neural networks do the opposite-they consistently look for the path of least resistance instead. Thus, BSD provides the path of least resistance to ensure the task is truly mastered.

This is the missing key over existing systems and methods. There are no 64 correct alternatives for a given input as is the case for neural networks trained on WebSplit. There are no variations of purportedly correct outputs caused by various annotators choosing different ways to split the sentences (e.g., one annotator uses noun phrases, another uses complex noun phrases, another sometimes uses nested noun phrases and other times leaves the pronoun alone, etc.). There is no starting with subjective human summaries. There is no starting with non-deterministic sentence graphs. This present invention is the literal opposite of SOTA NLP models that are based on the faulty premise that neural networks can learn to choose the best alternatives. For 100% accuracy, neural networks need to be trained on only one definitive, deterministic transformation for each potential input type. The rest of neural network training can proceed as usual. Meanwhile, the accuracy jumps double digits.

As stated earlier, the model's hallucination rate is proportional to the degree that the neural networks and other models deviate from BSD. The inverse is that the closer neural networks and models are to BSD, the greater their accuracy. Therefore, adjusting any neural network or model to be closer to an ideal BSD implementation falls within the spirit and scope of this disclosure.

For example, including at least one target output that is deterministically derived from a training input falls within the spirit and scope of this disclosure. After all, the accuracy of the model will increase with each added BSD Target Output.

There may be tasks that cannot be bounded. However, the accuracy of the model can be extremely improved by still adhering to the deterministic requirements of target outputs. Hence, BSD can be used to achieve optimal accuracy for virtually any fact-based NLP task.

In BSD, the neural network learns to select and apply the one correct objective transformation for the given input. Not choose between a variety. For example, in a BSD embodiment that includes five objective transformations, for any given input there is only one correct selection of transformation(s) and only one correct output after applying the correctly chosen transformation(s).

For example, where the objective transformations consistently include splitting on both 'and' and 'but' coordinating clauses, a sentence containing one 'and' coordinating clause and containing one 'but' coordinating clause must be split on both.

To not split on either is an error when computing the loss function. To split on only one of them is an error when computing the loss function. To create a hybrid transformation is an error when computing the loss function. The only way to achieve a zero loss is to consistently split on both throughout the training set. It is this very lack of variety that gives the neural network the guidance it needs to fully master the problem, and thereby produce 100% accurate output every single time.

It is within the realm of possibility that someone working on and with the existing systems and methods has recognized that consistently splitting on an 'and' coordinating clause could be learned by a neural network. Even if such exists, those ordinarily skilled in the art still have not developed a systematic method of applying multiple objective transformations to accurately split complex sentences into many smaller ones (such as splitting an extremely complex sentence into a dozen smaller ones with 100% accuracy) as documented by current SOTA methods and current SOTA error rates, despite decades of searching for an accurate method to do so.

Utility of BSD

The present inventor confirmed the superiority of BSD by implementing BSD in few-shot LLM inputs. For example, LLM input that included just five deterministically generated input/output pairs outperformed full models trained on over one million non-deterministic pairs.

BSD is the AI breakthrough that the world has been searching for. BSD, combined with MCI disclosed below, even provides 100% accuracy for high level tasks such as Question/Answer and Exposition.

Novelty of BSD

BSD is not only novel, it is markedly different from other systems and methods. Consider the contrast of BSD with neural networks trained on the WebSplit, WikiSplit, and/or DeSSE datasets for the NLP task of sentence splitting. Here, BSD NLP is literally the opposite.

SOTA Coreference Resolution Does Not Fulfill BSD Criteria

Coreference Resolution is the NLP task of finding all linguistic expressions in a given text that refer to the same real-world entity. Consider the following example: "Tom walked into the store where he found the bat." The linguistic expression 'he' refers to the same real-world entity 'Tom.' Thus, the resolved sentence would read "Tom walked into the store where Tom found the bat."

On the surface, neural networks trained to perform coreference resolution may appear to be doing so in a deterministic manner. Yet, the current SOTA coreference resolution only has an accuracy of 83.6% (i.e., the Maverick_mes coreference model).

While SOTA coreference models may appear to have been trained in accordance with the above, the reality is that they are neither deterministic (as defined above) nor bounded in scope (as defined above). In other words, they do not meet either criterion—let alone both.

For example, Maverick_mes and other SOTA models (such as lingmess) were trained on a collection of documents known as the OntoNotes corpus. That was largely due to the fact that this document collection contains human annotations for coreference resolution—providing the model known endpoints on which to train. However, rarely discussed is the fact that the human annotators themselves disagreed with each other. The OntoNotes corpus was introduced in a paper entitled "OntoNotes: A Large Training Corpus for Enhanced Processing." Page 5 of that paper states: "All of the coreference annotation is being doubly annotated and adjudicated. Over the first two years, the overall average agreement between individual annotators and the adjudicated result for non-appositive coreference using the MUC coreference scorer was 86%."

Researchers only agreed with the selected annotation 86% of the time in regards to standard coreferences. The reference to non-appositive coreferences is a reference to typical types of coreferences. An example of an atypical type (an appositive) is: "My teacher Mrs. Green is a tough grader." Here, "Mrs. Green" is an appositive coreference to "my teacher." The researchers treat such appositives as a special case of coreference resolution. Hence, in regards to typical, everyday coreferences, the researchers disagreed with the chosen annotation 14% of the time. Given that humans only agreed 86% of the time, then the dataset most certainly contains a large amount of subjective (i.e., non-deterministic) labels.

The rest of the dataset also includes subjectivity. For example, annotators were told to annotate nouns and verbs 50 sentences at a time. As long as there was 90%+agreement among annotators, the annotations remained as is—without revision and clarification.

"A 50-sentence sample of instances is annotated and immediately checked for inter-annotator agreement for all verbs and any noun with frequency over 100. ITA scores below 90% lead to a revision and clarification of the groupings by the linguist." (https://www.cs.cmu.edu/~hovy/papers/09OntoNotes-GALEbook.pdf) That fact that scores can differ at all means that a deterministic process was not being applied (at least in terms of the way "deterministic" is used herein). The fact that up to 10% disagreement remains unrevised further documents that subjective nature of the process (despite the researchers referring to the allowed 10% discrepancy as being an "empirical process"). Thus, OntoNotes does not meet the determinism requirement of BSD.

Nor does it meet the bounded-scope requirement. The reason for the disagreements is due to the nature of some of the documents. OntoNotes not only contains well-written documents such as news articles, but it also includes broadcasts, "typically recordings of entire shows covering various topics."

Naturally, people do not always speak using perfectly grammatical sentences creating occasional confusion as to what they actually mean. (This can even occur in well-thought-out writings as well.)

Thus, the corpus includes a wide range of texts, including those with grammatical errors, and incomplete thoughts, thereby violating the bounded-scope requirement of BSD.

Grammatically correct text can be considered bounded in terms of Sentence Simplification, but it is unbounded in terms of Coreference Resolution.

Even the most complicated sentences must be structured around known grammatical rules. Thus, when splitting sentences, so long as it is done using clauses and prepositions, and provided the sentence is grammatically correct, the sentence can reliably be simplified.

However, coreference resolution is much more complex. Consider an article where "John Smith" is mentioned in the second sentence of paragraph one. The word 'he' is used to refer back to John Smith three paragraphs later. There are a large number of complex sentences that can exist between the reference to "John Smith" and the reference to "he." Moreover, the sentences containing the references may themselves be complex.

So even input/output pairs that finally meet the deterministic requirement, likely will not meet the bounded requirement.

100% Accurate BSD Coreference Resolution

One way to reliably bound the problem is by applying BSD Sentence Splitting to the text (producing SS, or "Simplified Sentences"). The SS is then sent to a BSD Coreference Resolution process—a neural network that has been trained to perform coreference resolution on SS_Input/BSD_Target_Output pairs. By solely using BSD Simplified Sentences in the training, the complexity is profoundly reduced—thereby bounding the size of the problem, such that a relatively small neural network can achieve zero as the output from the loss function during training.

Some embodiments may bound the problem size even further by leaving all references at a certain distance unresolved. Training could include supplying five paragraphs of SS in each input of the training set. For example, if the selected maximum distance is five SS sentences, pronouns and other types of coreferences would only be resolved in the target output if the prior reference exists within the prior five SS sentences. Since this is an objective transformation, the neural network can (and will) learn to do the same.

Other embodiments may choose for the target output to be the same as the training input for all instances of ambiguous coreference resolution.

Moreover, BSD embodiments must choose deterministic rules for all nouns and named entities. For example, the embodiment must choose whether the resolution carries forward noun phrases, compound noun phrases, or nested noun phrases. The selected choice must be applied throughout the training dataset. The same goes for the names of people, companies, and even countries (e.g., full country names and/or abbreviation).

So long as the training input is bounded (which is accomplished by using SS), and provided that the target outputs are deterministically derived from each SS, 100% accurate coreference resolution will be achieved. Here, the metric of 100% accurate means that any linguistic elements that are rewritten will be done correctly. It does not mean that every potential linguistic reference will be replaced (for reasons stated above).

Formatted Facts (FF)

As stated above, BSD Coreference Resolution embodiments can be trained on the output of a BSD Sentence Simplification embodiment. The output of a BSD Sentence Simplification embodiment (SS) can be the training input, and the target output is an objectively transformed derivative of that input (as described above). This can be thought of as the Simple Sentences=>Coreference Resolution pipeline.

Herein, the pipeline of Simple Sentences=>Coreference Resolution shall be referred to as the "FF Pipeline." FF stands for "Formatted Facts." This pipeline produces Formatted Facts (FFs) by first simplifying the text (such as using a BSD Sentence Splitting embodiment). (The output of the sentence simplification is called SS. SS stands for "Simplified Sentences.") The simplified sentences output from the Sentence Simplification process are then used as input to the coreference resolution process (such as a BSD coreference embodiment as described above). Thus, the Sentence Simplification process first produces SS, which is then transformed into Formatted Facts (FF) through the coreference resolution process.

While the preferred embodiment applies Sentence Simplification prior to Coreference Resolution, other embodiments can use the reverse order while remaining within the spirit and scope of this disclosure. The combination of the two processes is a novel method for improving the accuracy of NLP tasks. However, where 100% accuracy is sought, embodiments may first use Sentence Simplification followed by Coreference Resolution.

Moreover, where accuracy is paramount, a BSD Sentence Simplification embodiment is used for the Sentence Simplification process, and a BSD Coreference Resolution embodiment is used for the coreference resolution. In other words, the BSD Sentence Simplification produces the SS, which is then transformed into FF through the BSD Coreference Resolution process.

When BSD processes are used for both, the FF Pipeline can also be referred to as the BSD FF Pipeline to signify the perfect accuracy.

The objective of the BSD FF Pipeline is to transform text into sentences that are both simple and self-contained. The BSD Sentence Splitting=>BSD Coreference Resolution pipeline is often sufficient to transform narrative text into FFs (sentences that are both simple and self-contained). Thus, this represents the simplest FF Pipeline.

Non-Narrative Converters for Medical, Scientific, Financial, Legal, and Other High-Stakes Texts Some types of text may require additional processes to meet the FF criteria. For example, some text may include additional elements that are non-narrative (such as caselaw citations, references, and/or LaTeX formulas). In such cases, a Non-Narrative Converter process can be used to strip the non-narrative components. Such a process can create a map (as is known in the art) for adding the removed content back in after the NLP process has been performed. Additionally, or in lieu of a map, the process may insert narrative placeholders to demarcate where the information was removed. Given that the placeholders are narrative, they will pass through the sentence simplification and coreference resolution. The placeholders may be removed after the FFs are created (before sending the text to the NLP process). The placeholder FF output is thus a map for restoring the removed elements after the NLP process has been performed. Those ordinarily skilled in the art know how to construct processes that both strip and restore non-narrative text, and therefore, can implement this inventive step upon learning of it.

The accuracy of virtually all NLP tasks can be profoundly improved using FFs. Consider the high-level NLP process of Summarization as a perfect case in point. Rather than sending the text directly to the summarization process, the output of the BSD FF Pipeline can be sent instead.

Example

Thus, an example summarization embodiment can include:

electronic text;

an electronic sentence simplification process;

an electronic coreference resolution process;

an electronic summarization process;

in which the text is sent to the sentence simplification process;

the output of the sentence simplification process is sent to the coreference resolution process; and the output of the coreference resolution process is sent to the summarization process.

By first splitting the sentences, and then applying coreference resolution, the output of the summarization process will be profoundly more accurate.

On the surface, the above may appear trite (rather than profound). However, consider a real-world example. The following sentence is from Wikipedia: "Commander Neil Armstrong and Lunar Module Pilot Buzz Aldrin landed the Apollo Lunar Module Eagle on Jul. 20, 1969, at 20:17 UTC, and Armstrong became the first person to step onto the Moon's surface six hours and 39 minutes later, on July 21 at 02:56 UTC."

Now consider this sentence transformed into FFs where the BSD Sentence Simplification process deterministically transforms based on clauses and non-causal prepositions using nested noun phrases; and the BSD Coreference Resolution deterministically uses title, first name, last name. Such a pipeline creates the following FFs from the sentence:

Commander Neil Armstrong and Lunar Module Pilot Buzz Aldrin landed the Apollo Lunar Module Eagle.

Commander Neil Armstrong and Lunar Module Pilot Buzz Aldrin landed the Apollo Lunar Module Eagle on Jul. 20, 1969.

Commander Neil Armstrong and Lunar Module Pilot Buzz Aldrin landed the Apollo Lunar Module Eagle at 20:17 UTC.

Commander Neil Armstrong became the first person to step onto the Moon's surface six hours and 39 minutes later.

Commander Neil Armstrong became the first person to step onto the Moon's surface on July 21.

Commander Neil Armstrong became the first person to step onto the Moon's surface at 02:56 UTC.

These simple, self-contained statements have been automatically generated with 100% accuracy from one single sentence using a BSD FF Pipeline.

Whether the NLP task be Summarization, Named Entity Recognition, Question/Answering (QA), Exposition, and more, the accuracy is profoundly improved by sending such FFs in lieu of, and/or in addition to, the original text. While humans prefer pronouns and other contractive linguistic structures, this present inventor discovered machine learning models perform much better on the opposite.

The preferred embodiment for the sentence simplification process is a BSD Sentence Splitting process. The preferred embodiment for the coreference resolution process is a BSD Coreference Resolution process (i.e., a coreference resolution neural network trained on sentences simplified in the precise same manner as the sentence simplification process in the given embodiment).

For optimal accuracy, it is imperative that the Coreference Resolution process be trained on the output of the same embodiment chosen for the BSD Sentence Splitting. In other words, while there are multiple ways to implement BSD Sentence Splitting, whatever way is chosen should be used for the training of the Coreference Resolution process.

The combinations of simplifying sentences and applying coreference resolution on them is novel in that there is no reference to this combination in existing systems and methods. Given that this novel combination affords tremendous utility via improvements in accuracy demonstrates that it is non-obvious (as such improvements in accuracy have been sought for decades without those skilled in the art thinking to modify the input in such a manner).

The above system and method is applicable to virtually any NLP task, such as Named Entity Recognition, Parts of Speech Tagging, and other NLP processes well-known in the art. Any process that takes human language for at least one input is an NLP process for purposes of this present disclosure. Named Entity Identification and Named Entity Recognition are both defined and discussed in detail below. Parts-of-Speech Tagging (POS Tagging) refers to using NLP libraries to identify whether the words in the text are nouns, adjectives, etc. and also in tagging their linguistic dependencies as well. There are many such libraries known in the art (e.g. Stanford NLP, Spacy, and Flair).

For clarification, accuracy can be profoundly increased by sending SSs instead of sending the raw text. Accuracy can be improved even more by sending FFs.

Example

Hence, one exemplary embodiment of a system for accurate NLP can be as follows:

an electronic sentence simplification process;

an electronic coreference resolution process;

an electronic NLP process;

in which the text is sent to the sentence simplification process;

the output of the sentence simplification process is sent to the coreference resolution process; and the output of the coreference resolution process is sent to the NLP process.

Simplification Processes

As stated earlier, FFs are both simple and self-contained. This section focuses on electronic methods of transforming text to meet the first criteria (i.e., processes that make text simpler). Any process used to transform text into simpler sentences shall herein be referred to as a Simplification Process.

Disclosed herein are three novel Sentence Simplification Processes: BSD Sentence Splitting, BSD Sentence Annotation, and Named-Entity Token Substitution.

The previously disclosed BSD Sentence Splitting method can be used as the chosen Simplification Process in various embodiments. Other Sentence Splitting and Rephrasing methods known in the art can be used in lieu of and/or in conjunction with BSD Sentence Splitting. Where accuracy is paramount, BSD Sentence Splitting would be the preferred process. Where speed is more important than accuracy, perhaps a rule-based sentence splitter may be the preferred process. Naturally, processes can be combined to produce a single Simplification Process.

Sentence Splitting and/or Sentence Rephrasing are two examples of processes that electronically simplify text. Any method that reduces the complexity of the input text is a Sentence Simplification Process.

Sentence Annotation as a Sentence Simplification Process

A novel simplification method disclosed herein is called Noun-Phrase Annotation Process. It is an elegant solution to the myriad of NLP tasks that suffer from inaccuracy, tasks that include not only Summarization and Question/Answer but also the most foundational NLP tasks such as Named Entity Recognition, Parts of Speech Tagging, and Coreference Resolution.

Just as its name suggests, a Noun-Phrase Annotation Process annotates the noun phrases in the text. Importantly, the annotation is consistent and deterministic. For example, noun phrases could be annotated by starting each noun phrase with an underscore, ending each noun phrase with an underscore, and connecting each word in the noun phrase with an underscore. One example alternative would be to annotate the noun phrase minus any preceding determiner (e.g., 'a', 'an', 'the', 'this', etc.). Consider five such examples below:

_Mary_bought a_car_.

_Mary_Jenkins_bought a_car_.

_Mary_bought a_brand_new_car_

_Tom_bought a_stunning_,_life-size_photo.

_Tom_Jenkins_of_Deerfield_,_Florida bought a stunning_,_life-size_photo_signed_by_the_photographer.

The latter example includes a complex noun-phrase ("Tom Jenkins of Deerfield, Florida) as well as a nested noun phrase ("stunning, life-size photo signed by the photographer"). Notice that even though the final sentence is much more complex than the first, the annotation communicates the following to the neural network: bought a_. In fact, all five examples communicate the very same.

Now consider how this will assist in NLP tasks such as coreference resolution. For example, "Mary bought a car. It was green." Becomes "Mary bought a car. The car was green." Likewise consider: "Tom Jenkins of Deerfield, Florida bought a stunning, life-size photo signed by the photographer. It was framed in wood." This becomes "Tom Jenkins of Deerfield, Florida bought a stunning, life-size photo signed by the photographer. The stunning, life-sized photo signed by the photographer was framed in wood."

Notice how the annotations reduced the number of deterministic transformations that the neural network needs to learn. Hence, the annotation process assists in bounding the scope of the training. Such bounding profoundly reduces the size of the model required to achieve a 0% loss function output; thereby achieving 100% accuracy on the smallest possible model with shortest possible training time. This optimizes accuracy, speed, and cost all at the same time.

This reduction in deterministic transformation learnings means that the Sentence Annotation Process (SAP) can be used to bound the scope of various high-level NLP tasks to create a BSD Neural Network for that high-level task.

The Sentence Annotation Process (SAP) can be built upon standard libraries such as Spacy and Allen NLP (hereafter referred to as "Spacy"; where "Spacy" is used herein, any suitable NLP library may be substituted). However, the accuracy of the annotation will depend on the accuracy of the aforementioned libraries.

BSD Sentence Annotation

Where accuracy is paramount, a BSD Sentence Annotation process can include a neural network trained input/output pairs such that the output is deterministically transformed from the input. Example transformations could include annotating noun phrases, annotating complex noun phrases, or annotating nested noun phrases. Provided that the identical objective transformation is used throughout the training set, and provided a sufficient representative sample is provided, and provided the loss function reaches zero during training, a 100% accurate BSD Sentence Annotation Process shall be produced.

The BSD Sentence Annotation could be used at various locations within the BSD FF Pipeline. Upstream BSD processes can be trained on annotated inputs and outputs.

Also, there can be a process for removing annotations in embodiments such as where sending regular text to the user is the objective. Methods for undoing the annotation are well known in the art. For example, removing the "_" (underscore) characters is a trivial process. Such a process shall be referred to as the Sentence Annotation Removal Process.

Example

Hence, one example embodiment of a system for accurate NLP can be as follows:

a sentence annotation process;
an electronic sentence simplification process;
an electronic coreference resolution process;
a sentence annotation removal process;
an electronic NLP process;
in which:
the sentence simplification process has been trained on annotated input;
the coreference resolution process has been trained on annotated input;
the text is sent to the sentence simplification process;
the output of the sentence simplification process is sent to the coreference resolution process;
the output of the coreference resolution process is sent to the sentence annotation removal process; and
the output of the sentence annotation process is sent to the NLP process.

Utility of the BSD Sentence Annotation Process

This Noun-Phrase Annotation method profoundly improves accuracy all by itself due to the fact that neural networks take the path of least resistance during the training process. For example, a neural network trained to detect pneumonia in chest X-rays learned to focus on metadata or markers in the images rather than the actual lung features. This occurred because certain hospitals included different markers or annotations in their X-rays, and the model learned to correlate those with the presence of pneumonia.

As another example, a study showed that image classification models like convolutional neural networks (CNNs) trained on the ImageNet dataset tend to rely on texture rather than shape for classification. For example, a neural network might classify a picture of a cat-like object covered in "elephant skin texture" as an elephant. This preference for textures is easier to exploit than learning the shapes and semantics of objects.

Given the importance of this phenomena, consider a final example from dermatology image classification. Models trained to detect skin cancer have relied on artifacts such as rulers or measurement tools often included in malignant samples. A model learned to associate the presence of a ruler with malignancy, a clear shortcut that bypassed the need for true diagnostic reasoning.

The present inventor realized this same form of self-organization found in image-based CNNs also occurs in transformer-based language models. The present inventor also realized that this phenomenon can be transformed from being a problem into being the key to producing smaller models that are profoundly more accurate than larger models 10-100 times their size (even more accurate than models 1,000 times their size).

This led to the novel innovation of BSD Sentence Annotation Process. The annotation process is akin to intentionally adding in the ruler to guide the neural network down the path of least resistance, thereby reducing the number of objective transformations that the neural network needs to learn in order to reach a zero or near zero loss value result. This is not an abstract method. On the contrary, the number of rules with and without the process are quantifiable. For example, the model size and number of training epochs that a coreference resolution machine would need with and without the Noun-Phrase Annotation Process are both quantifiable. The BSD Sentence Annotation can measurably reduce both the model size and number of training epochs needed to reach zero training loss.

The novel innovation of annotating noun phrases comes from the present inventor's epiphany that led to creating the Noun-Phrase Dominance Model. In short, this descriptive framework states that LLMs self-organize around noun phrases during training. Hence, annotating noun-phrases guides the LLM self-organization resulting in extremely powerful, extremely small, extremely inexpensive models.

Once those skilled in the art learn the above, they too can readily implement BSD Simplification Processes with no additional training or disclosure required.

Named Entity Token Substitution as a Sentence Simplification Process

Named entities are one of the biggest weaknesses of modern LLMs. Named entities refer to the key subjects of a piece of text, such as names, locations, companies, events and products, as well as themes, topics, times, monetary values and percentages. Named Entity Identification (NEI) refers to NLP processes that identify which terms in a given text are named entities. Named Entity Recognition (NER) goes one step farther. This NLP process identifies each named entity and provides a description as to the entity type (e.g., name, location, company, etc.).

Named entities are perhaps best explained by way of example. Consider the following sentence: "Apple acquired XYZ Corp. for $1 billion." There are three named entities in this example: Apple, XYZ Corp. and $1 billion. As stated above, named entities include names of companies and products as well as monetary values. Named entities also include references to time. Hence, Named Entity Identification (NEI) is also useful in identifying relative time references that need to be converted into absolute time to transform the sentence into a literally true independent statement For example, LLMs struggle to distinguish "Alfonso" and "Afonso." They also struggle with dates. In fact, GPT-4 has a 28.6% error rate on the simple task of citing title, author, and year of publication, as these are all named entities.

While LLMs struggle to distinguish "Alfonso" from "Afonso" they have no problem distinguishing between "Chuck" and "Bartholomew." Experiments conducted by the present inventor identified this phenomenon.

This phenomenon, previously non-obvious to those skilled in the art prior to the present inventor's experiments, holds the key to resolving the above LLM weaknesses.

This present invention discloses a novel process called Token Substitution Process. This section more narrowly focuses on Named Entity Token Substitution Process, where tokens representing named entities are replaced with simpler placeholder tokens before being sent to the NLP process such as an LLM. The placeholder tokens are then replaced back in the NLP process output (e.g., the LLM response).

From the perspective of Token Substitution Processes, "simpler" refers to tokens that are either shorter and/or whose vector embedding distance is greater than the original set.

Named-Entity Token Substitution can include replacing the names of people with a simpler name of the same gender. It can include replacing dates with a simpler token reference, even converting the tokens for "Dec. 25, 2021" into a single in-vocabulary token "Christmas." In fact, even other dates can be converted to single tokens, including "Christmas" even if they are not "December 25." So long as Christmas can be converted back to the original date in the text, such will still work in the vast majority of modern LLMs.

Likewise, organizations can be substituted with simpler tokens.

The combination of Sentence Splitting and Token Substitution results in extremely simple sentence structures from the perspective of numerical tokens, making it easy for the NLP process to produce accurate responses. For example, extractive summarization on token-swapped content makes it easier for the Summarization Process to "follow the plot."

Naturally, swapping out Named Entity Tokens requires first identifying the Named Entities in the text. Thus, this present invention discloses a method of achieving 100% accurate Named Entity Identification (NEI) later below. The 100% accurate Named Entity Identification (NEI) can be used to identify the named entities that can thereafter be swapped with simpler tokens, and then be remapped to the original named entities after receiving the output from the NLP process.

Noun-Phrase Token Substitution as a Simplification Process

It is the present inventor's discovery that LLMs self-organize around noun phrases. Therefore, any simplification of noun phrases should result in a corresponding increase in accuracy. This is the premise underlying the above Noun-Phrase Annotation Process.

Noun-Phrase Token Substitution refers to replacing noun-phrases with simpler token representations, in a manner similar to named entities. In fact, named entities are themselves noun phrases, hence the corresponding increase in accuracy.

Consider the following example: "The first car I ever purchased in my lifetime was a Ford." Annotated such a sentence can be:_The_first_car_I_ever_purchased_in_my_lifetime_was a_Ford_." The annotated portion could be reduced to its determiner and root (i.e., "The car") resulting in the following sentence "The car was a Ford."

Notice that there is information loss. Therefore, Noun-Phrase Token Substitution is perhaps best used in NLP processes where information loss is acceptable (such as Summarization) and avoided where information loss is unacceptable (such as Question/Answering).

Notice furthermore that Named-Entity Recognition Token Substitution does not result in any information loss (post remapping). Said another way, Named-Entity Token Substitution is a form of Noun-Phrase Token Substitution that results in zero information loss, and therefore, is effective across a broader portion of NLP processes.

A caveat is that the query itself must be substituted in the same manner in NLP processes such as Question/Answering. For example, consider where "Alfonso" is replaced with "Chuck" in the text. Further consider the query: "Who is Alfonso's mother?" The query can be converted to "Who is Chuck's mother?" If the LLM response contains Chuck, then Chuck can be remapped to Alfonso resulting in the correct response.

Self-Containment Processes

As stated above, FFs are both simple and self-contained. Three example simplification processes have been disclosed above: BSD Sentence Splitting, Sentence Annotation Process, and Token Substitution Process (e.g., Named-Entity Token Substitution Process). Such simplification processes can be used separately or in combination with each other to form the appropriate Sentence Simplification Process for the NLP pipeline. Alternatively, known SOTA simplification methods can be used in lieu of and/or in combination with the novel methods disclosed above.

This section focuses on the self-containment aspect of FFs. Three novel self-containment processes are disclosed herein: BSD Coreference Resolution, Relative-Time Conversion, and First-Person Conversion.

Self-containment stands for creating as many "stand alone" statements from the text as possible. For example, "He sat on a chair" is not a standalone statement because the statement does not define who "he" is. However, "Tom Cruise sat on a chair" is a complete, standalone statement.

Hence, whereas Sentence Splitting leads to simple sentences, Coreference Resolution leads to self-contained sentences. However, certain types of text may require additional and/or alternative processes to produce the maximum number of self-contained statements. Two such types of text are those that contain relative time references and those that contain sentences written in the first person.

Embodiments that process text containing relative time references may use a Relative Time Adjustment process to maximize the number of self-contained statements. Embodiments that process text containing sentences written in the first person may use a First-Person Conversion Process to maximize the number of self-contained statements.

Relative Date Conversion Process

A Relative Date Conversion Process is an example of a Relative Time Adjustment Process.

Remarkably, chatbots follow the literal meaning of each statement. This is why LLMs often hallucinate regarding time. Consider the following prompt:

Using the supplied Content, write about Mark Zuckerberg attending the conference.

Content:

Feb. 2, 2020-Mark Zuckerberg will be attending the Meta Conference. He'll be there in three days.

On Mar. 4, 2024, GPT 3.5 Turbo provided the following erroneous response:

Mark Zuckerberg, the co-founder and CEO of Meta, will grace the upcoming Meta Conference with his presence. Scheduled to take place in just three days, the conference is expected to be a momentous occasion for industry leaders, tech enthusiasts, and investors alike. (ChatGPT 3.5 Turbo)

ChatGPT Turbo wrongly stated that the event will take place in three days from the time of the prompt (Mar. 4, 2024). The correct response would have been to state: "On Feb. 2, 2020, the event was expected to occur on Feb. 5, 2020." ChatGPT Turbo's response was wrong.

On Mar. 4, 2024, GPT 4 did not do any better. In fact, in some ways it did even worse:

On Feb. 2, 2020, it was officially announced that Mark Zuckerberg, co-founder and CEO of Facebook, will be attending the Meta Conference. The event takes place in three days, affording Zuckerberg some time to prepare for what promises to be an exciting and educational event. (ChatGPT 4)

One can notice that GPT 4 recognized that the Feb. 2, 2020 announcement was in the past. Nevertheless, it still said that Mark Zuckerberg will be attending three days in the future (i.e., three days from Mar. 4, 2024 rather than three days after Feb. 2, 2020).

The very architecture of training Large Language Models (LLMs) results in the LLM generating text based on the literal meaning of each statement in the input text. The input prompt contained the following statement: "He'll be there in three days." ChatGPT therefore output a response based on the literal meaning of this independent statement—regardless of the fact that a date was provided—even though GPT 4 recognized the date as being in the past.

Fixing Time-Based Hallucinations

Time-based hallucinations can be mitigated by programmatically encoding the information with absolute time references. For example, consider the original prompt:

Using the supplied Content, write about Mark Zuckerberg attending the conference.

Content:

Feb. 2, 2020—Mark Zuckerberg will be attending the Meta Conference. He'll be there in three days.

Instead, consider the result of sending time-encoded information instead:

Using the supplied Content, write about Mark Zuckerberg attending the conference.

Content:

Feb. 2, 2020—On Feb. 2, 2020, Mark Zuckerberg was expected to attend the Meta Conference. On Feb. 2, 2020, he was expected to attend on Feb. 5, 2020.

Notice how the future verb tense has been encoded as a past-tense expectation, in addition to encoding the data with absolute dates as well. This form of encoding eliminates such time-based hallucinations. For example, on Mar. 10, 2024, ChatGPT 3.5 Turbo responded to the above query as follows:

Mark Zuckerberg, the CEO of Meta, was slated to attend the Meta Conference on Feb. 5, 2020. As an influential figure in the tech industry, his presence at the conference was highly anticipated. Attendees were eager to hear his insights on the future of technology and the direction in which Meta, formerly known as Facebook, was heading.

Not only did the first paragraph properly place the event in the past, but all subsequent sentences of the response did the same.

ChatGPT 4 also properly placed the event in the past:

Feb. 2, 2020—This day marked the expectancy of social networking magnate, Mark Zuckerberg's presence at the forthcoming Meta Conference. Conjectures were rife about Zuckerberg gracing the conference that was slated to occur on Feb. 5, 2020. The Meta Conference, gaining attention primarily for Zuckerberg's anticipated attendance, had the industry buzzing with fervor and curiosity.

One step toward accuracy is ensuring that the literal meaning of every individual statement in the context is factually true at the time of the prompt. This is a criterion that must be met to produce hallucination-free responses.

As a reminder, both GPT 3.5 Turbo and GPT 4 produced time-based hallucinations when presented the following prompt:

Using the supplied Content, write about Mark Zuckerberg attending the conference.

Content:

Feb. 2, 2020—Mark Zuckerberg will be attending the Meta Conference. He'll be there in three days.

The present inventor has seen time-based hallucinations on Perplexity as well.

Also, as documented earlier, neither GPT 3.5 Turbo nor GPT 4 Turbo produced correct responses (in regards to time) when presented the following prompt:

Using the supplied Content, write about Mark Zuckerberg attending the conference.

Content:

Feb. 2, 2020—On Feb. 2, 2020, Mark Zuckerberg was expected to attend the Meta Conference. On Feb. 2, 2020, he was expected to attend on Feb. 5, 2020.

However, both GPT 3.5 Turbo and GPT 4 embellished (i.e., hallucinated) the information generated outside the context of time. The following prompt resolves this situation for both GPT 3.5 Turbo and GPT 4:

System:

You accept all the provided Context as true. You answer the prompt solely using the provided context.

Your response solely includes statements that are explicitly conveyed by the context.

Your response does not draw any inferences or implications from the context.

If the provided context does not provide any information related to the prompt then you answer "I don't know."

User Prompt:

Using the supplied Content, write about Mark Zuckerberg attending the conference.

Content:

Feb. 2, 2020—On Feb. 2, 2020, Mark Zuckerberg was expected to attend the Meta Conference. On Feb. 2, 2020, he was expected to attend on Feb. 5, 2020.

By adding the above system prompt, on Mar. 14, 2024, GTP 3.5 Turbo responded: Mark Zuckerberg was expected to attend the Meta Conference on Feb. 5, 2020.

Likewise, on Mar. 14, 2024, GPT 4 responded:

On Feb. 2, 2020, Mark Zuckerberg was expected to attend the Meta Conference on Feb. 5, 2020.

Both models produced 100% accurate, hallucination-free responses. Thus, it is important to instruct the LLMs to solely use the provided context and to not add any inferences or implications.

Figure 6:
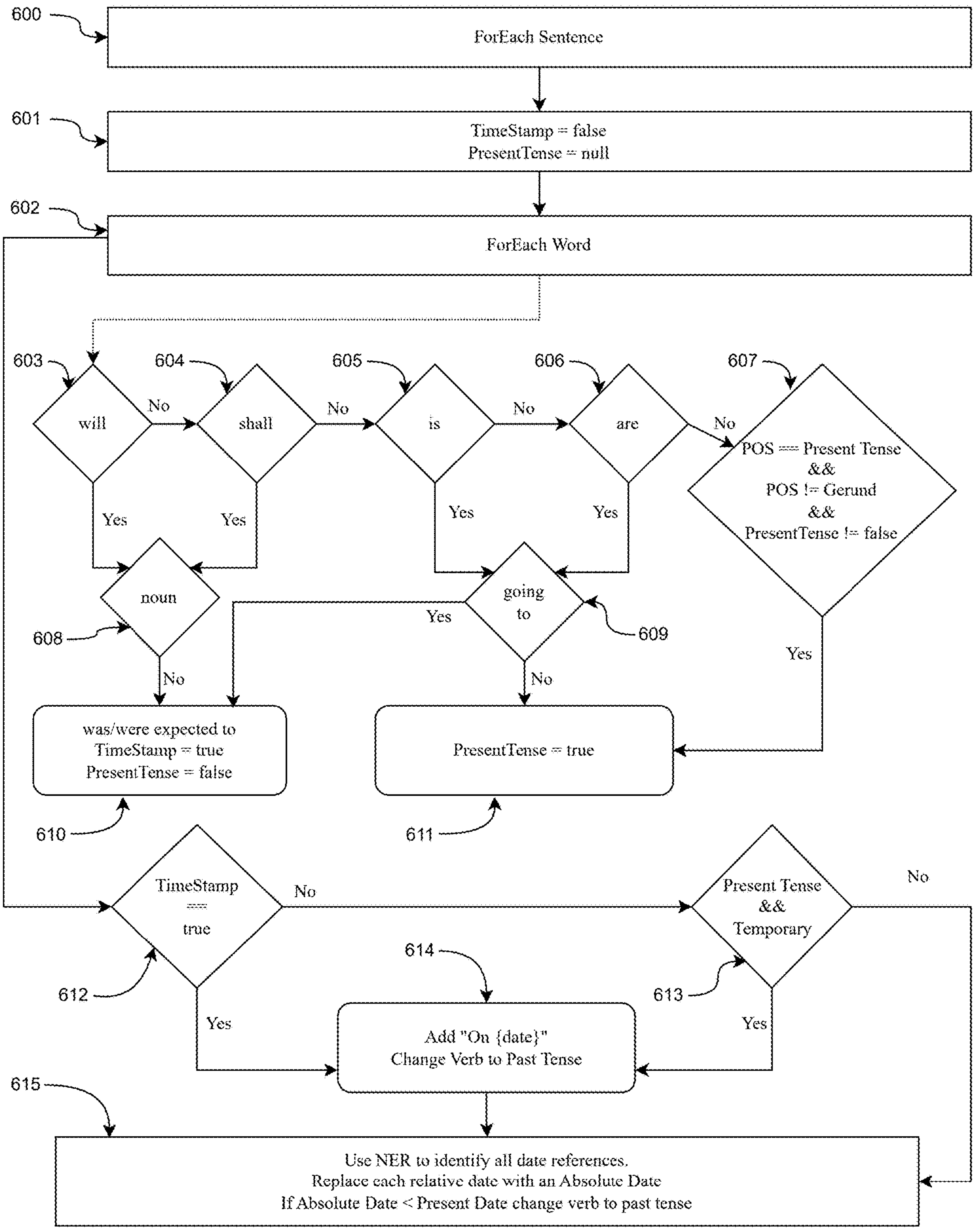
FIG. 6 is a flow diagram of one embodiment of a Relative Date Conversion Process.

It is also important to encode the time-based references in a manner that fulfills the criteria of FFs. In other words, relative dates need to be replaced with absolute dates on a per statement basis. FIG. 6 illustrates one such embodiment. This embodiment combined off-the-shelf POS Tagging, NER, and relative-to-absolute-date conversion libraries, as are well-known in the art. Those ordinarily skilled in the art can use such libraries to create processes the fulfill the FF criteria.

Example Embodiment of a Relative Date Conversion Process

FIG. 6 illustrates an example embodiment of a Relative Date Conversion process. The first step is to divide the text into sentences. Other steps are described as follows:

For each sentence, remove all colloquial references to the present (e.g., remove phrases such as "currently," "now," "at present," "at this current time," "at this moment," "right now," etc.) Standard REGEX expressions can be used in modern programming languages to accomplish this.

For each sentence 600, set TimeStamp to false, and set PresentTense to null 601.

Loop through each word in the sentence 602.

If the current word is 'will' 603:

Test to see if the next word is noun 608. If so, do nothing and continue.

If not 608, handle in the same manner as the word 'shall' 610.

If the current word is 'shall' 604 and the next word is not a noun 608, then do the following 610: if the sentence is plural, replace the current word with 'were expected to'; if the sentence is singular, replace the current word with 'was expected to'; set TimeStamp to true; and set PresentTense to false.

If the current word is 'is' 605 and the next two words are "going to" 609, then do the following 610: replace "is going to" with "was expected to"; set TimeStamp to true; set PresentTense to false.

Else, if the next two words are not "going to" 609, then just set PresentTense to true 611.

If the current word is 'are' 606 and the next two words are "going to" 609, then do the following 610: replace "is going to" with "were expected to"; set TimeStamp to true; set PresentTense to false.

Else, if the next two words are not "going to" 609, then simply set PresentTense to true 611.

If the current word is none of the above and the current word is POS-tagged as PresentTense and the current word is not POS tagged as a Gerund and PresentTense is not false 607, then set PresentTense to true 611.

Once all the words in the sentence have been processed:

If timestamp is true 612 or the sentence is temporary, present tense 613, then add "On {date}" to the beginning of the sentence to timestamp it where date is the date of the document, and change the verb to past tense 614. For example, "Tom is at house" gets encoded as "On Mar. 14, 2024, Tom was at the house"

POS tagging using any standard NLP library can be used to identify whether the sentence is present tense. LLMs can be used to delineate whether the sentence is permanent or temporary. Alternatively, a BSD Neural Network can be trained to perform this task.

For all sentences 615: use NER to locate all date references; for each relative date, use an NLP library known in the art to replace the relative date with an absolute one using the date of the document as the reference point; for each future tense sentence whose computed absolute date is less than the present date: change the verb tense to the past tense.

The above is sufficient information for those skilled in the art to programmatically encode sentences that contain time references in conformity with the criteria of FFs-fully eliminating all-too-common hallucinations caused by relative time references.

First-Person Conversion Process

This process simply refers to converting first-person sentences to their third-person equivalents. This includes replacing first-person references with the identity of the person. Consider the following example from an email written by Michael Wood on Feb. 10, 2024: "I am going to Publix tomorrow." The First-Person Conversion Process can rewrite the sentence as follows: "Michael Wood is going to Publix tomorrow." The sentence can then be further transformed by the Relative Date Conversion Process: "On Feb. 10, 2024, Michael Wood was expected to go to Publix on Feb. 11, 2024". Notice how the combination of the two processes have methodically transformed a first-person statement into a self-contained statement (the second criteria of an FF).

Spelling and Grammar Correction Process

A Spelling and Grammar Correction Process can be used to bound the scope.

Without such, the neural network would need to be trained on much larger types of inputs to account for misspellings and bad grammar. However, the neural network can be trained on grammatically correct, third-person, narrative text to profoundly reduce the scope.

There are many libraries and API's known in the art for both spelling and grammar correction. Moreover, processes utilizing LLMs can be used as well.

Example

Hence, one example embodiment of a system for accurate NLP can be as follows:

a sentence annotation process;
an electronic sentence simplification process;
an electronic first-person conversion process;
an electronic coreference resolution process;
an electronic relative-time adjustment process;
a sentence annotation removal process;
an electronic NLP process;
in which:
the sentence simplification process has been trained on annotated input;
the coreference resolution process has been trained on annotated input;
the text is sent to the sentence simplification process;
the output of the sentence simplification process is sent to the first-person conversion process;
the output of the first-person conversion process is sent to the coreference resolution process;
the output of the coreference resolution process is sent to the relative-time adjustment process;
the output of the relative-time adjustment process is sent to the sentence annotation removal process; and
the output of the sentence annotation process is sent to the NLP process.

Example Accurate NLP Embodiment using Formatted Facts

Figure 4:
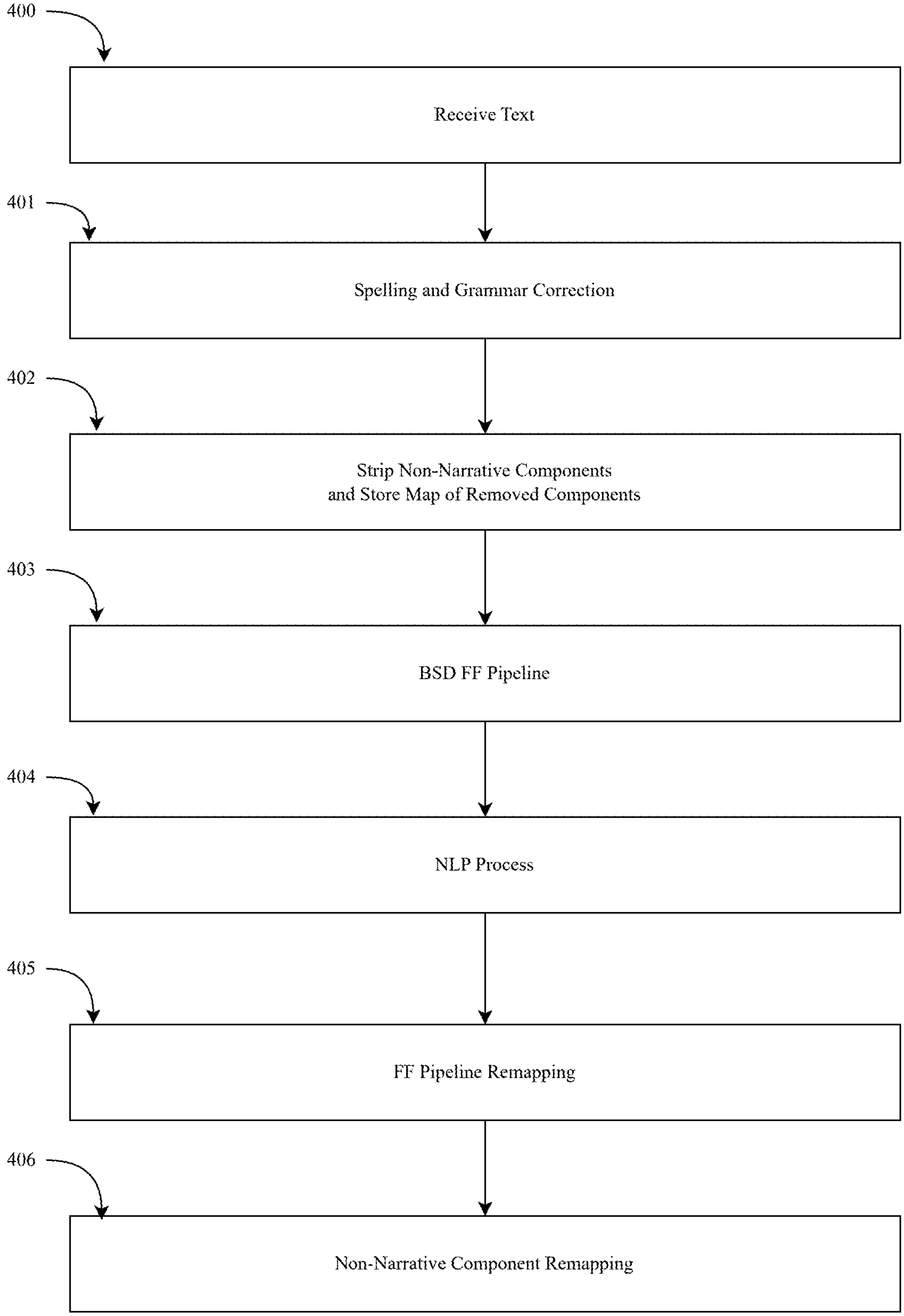
FIG. 4 is a flow diagram of one embodiment of a system for 100% accurate NLP transformation of complex documents.
Figure 5:
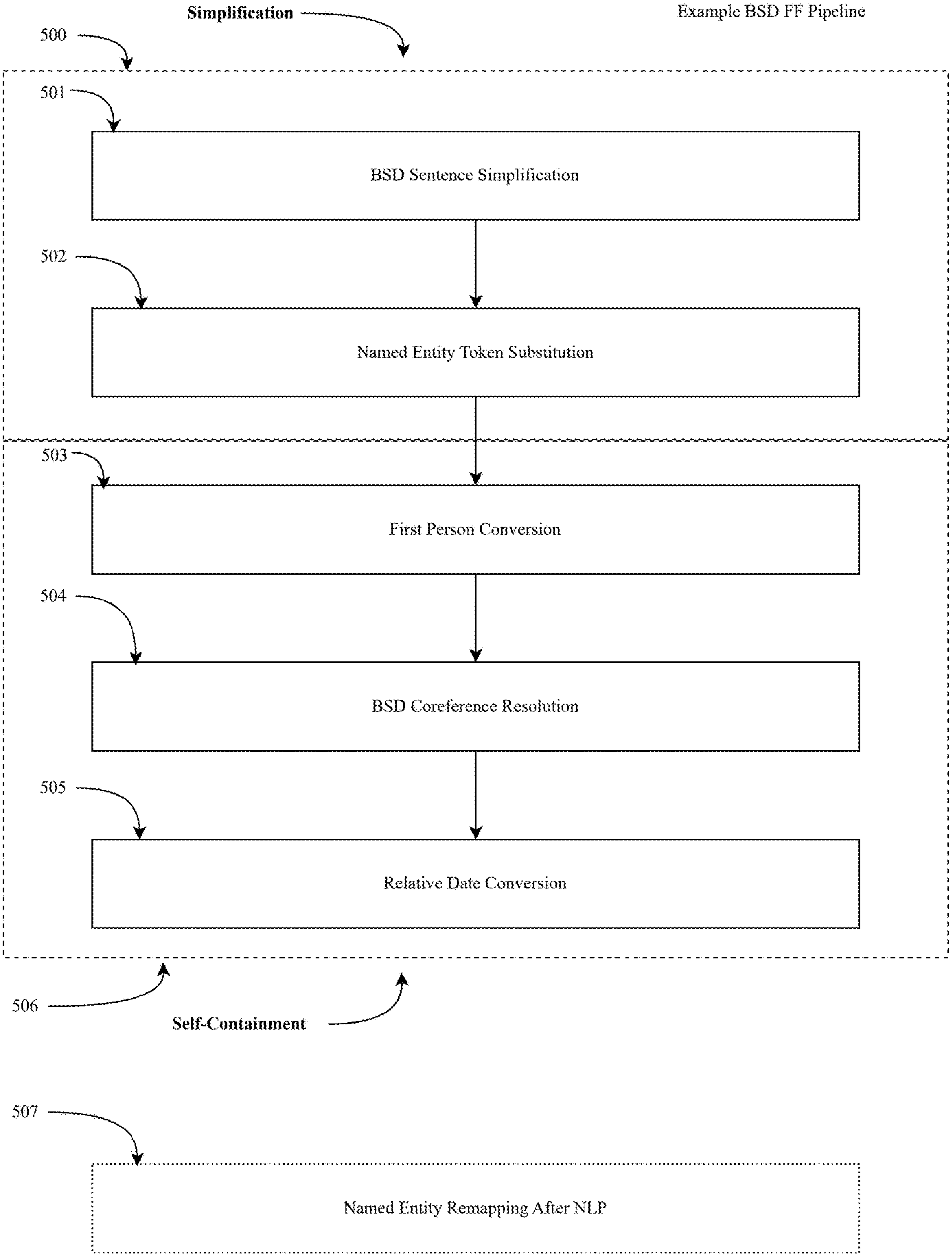
FIG. 5 is a flow diagram of one embodiment of an FF Pipeline.

FIG. 4 is an example embodiment for an accurate implementation of an NLP process 404. The embodiment receives text 400. The text is transformed by a Spelling and Grammar Correction Process 401. Non-narrative components are removed using Narrative Converter process 402. The converter strips all parts of the text that are non-narrative. It may also add narrative placeholders to make future reconstruction much easier. Thus, at this state, the text is grammatically correct narration. This text is transformed by the FF Pipeline 403. FIG. 5 illustrates an example FF Pipeline. FIG. 6 illustrates an example embodiment of a Date Conversion Process used in the sample FIG. 5 FF Pipeline embodiment.

The output of the FF Pipeline 403 is sent to the NLP Process 404. Optionally, any narrative placeholders added by the Converter 402 can be stripped from the text before sending to the NLP Process 404. The output of the FF Pipeline 403 is then sent to the FF Pipeline Remapping 404. For example, if any named entities were swapped with single token placeholders in 403 (502), then the placeholders will be replaced with their original named entities 405. Then, any non-narrative components that have been removed will be added in 406.

Other expanded FF Pipelines are disclosed herein.

FFs refer to Formatted Facts which refers to sentences that are both simple and self-contained. FIG. 5 and FIG. 6 illustrate one example embodiment to electronically create FFs from input text. The BSD Sentence Splitting=>BSD Coreference Resolution pipeline is one method of transforming narrative text into FFs with 100% accuracy.

FIG. 5 illustrates an example embodiment of an FF Pipeline. Formatted Facts (FFs) are both simple and self-contained. FIG. 5 illustrates one programmatic way of producing such FFs. The upper dotted box in FIG. 5 shows the sample Simplification Process 500. The lower dotted box in FIG. 5 shows the sample Self-Containment process 506.

In the sample embodiment, the text first undergoes BSD Sentence Simplification 501. This can be a neural network (as in FIGS. 1 and 2) trained on BSD Sentence Simplification outputs (as in FIG. 3). The output of the sentence simplification 501 is sent to the Named Entity Substitution Process 502 where at least one named entity is replaced with a placeholder. The output of the Named Entity Substitution Process 502 is sent to the First Person Conversion Process 503 where sentences written in the first person are converted to their third person equivalents. The output thereof is sent to the BSD Coreference Resolution process 504. The training input for this neural network would be in the same format of the output of the BSD Sentence Simplification process used in the embodiment. The output of the BSD Coreference Resolution process 504 is sent to the Relative Date Conversion Process 505. FIG. 6 illustrates an example embodiment of a Relative Date Conversion Process.

If any named entities were replaced, they would be remapped at 507.

Introducing Model Correction Interfaces (MCIs)

It is important to note that this present disclosure does not claim that the output of the high-level NLP process will be inherently 100% accurate. While the output of the sentence simplification process can be 100% accurate, and the output of the coreference resolution can be 100% accurate, that does guarantee that the output of the high-level NLP process will be 100% accurate (if the high-level NLP process uses a stochastic or otherwise probabilistic architecture).

In no uncertain terms, the accuracy of the high-level NLP output will be measurably improved, making the above combination useful in its own right.

However, where 100% accuracy is required, all stochastic NLP methods will require the novel innovation of at least one Model Correction Interface (MCI) to ensure 100% accuracy of high-level, stochastic NLP processes.

Named Entity Recognition Model Correction Interfaces (MCIs)

A Model Correction Interface (MCI) uses deterministic processes to correct known weaknesses in a stochastic and/or otherwise errant NLP process. There are at least three types of MCIs: Adjunctive Model Correction Interface (A-MCI), Bypass Model Correction Interface (B-MCI), and Formatted-Fact Model Correction Interface (FF-MCI). An Adjunctive Model Correction Interface (A-MCI) refers to performing the identical or similar task using at least one additional method that does not have the same weakness as the model being corrected. A Bypass Model Correction Interface (B-MCI) alters the input to bypass a known weakness in the model. A Formatted Facts Model Correction Interface (FF-MCI) replaces the output of the NLP model with known facts (preferably in FF format).

Consider the NLP process of Named Entity Identification (NEI). As explained below, Spacy struggles to correctly identify named entities when they are the first word of a sentence. Thus, another process can be added that specifically identifies named entities for the first word(s) of the sentence. Such would be an Adjunctive Model Correction Interface (A-MCI). Spacy also struggles to identify named entities when words in the sentence are misspelled and/or when the sentence is grammatically incorrect. Thus, the text can first be processed using a Spelling and Grammar Correction process to bypass this weakness. This is an example of Bypass Model Correction Interface (B-MCI). Examples of Formatted Facts Model Interfaces (FF-MCI) are provided in the section immediately below.

Strengths and Weaknesses of NER Libraries

Off-the-shelf NLP software is excellent at extracting English named entities with one caveat: they are highly dependent on the capitalization of words. For example, Spacy incorrectly handles the following: "Scoular Drives Employee Development With Absorb LMS." In this instance, Spacy returns "Scoular Drives Employee Development With Absorb" as a single entity instead. This is wrong.

Title casing is very commonly used in news articles, blog posts, and many webpages. Hence, resolving this issue is important for AI systems that incorporate such common sources of information as input.

Title casing is problematic because it capitalizes too many words in regards to the Named Entity Recognition (NER) model's training. On the flipside is the now commonplace practice of using lowercase for everything-most especially when texting or writing emails. As another Stack Overflow user reported, Spacy failed to recognize any named entities in sentences such as: "i love nike shoes from the uk." However, Spacy correctly identified both Nike and UK as named entities when the following sentence was provided: "i love Nike shoes from the Uk."

A highly effective, novel approach to solving this issue is to use an LLM to normalize the text before inputting it into the NER resolver. Such normalization is trivial for most LLMs to do. For example, GPT-3.5 Turbo was prompted to remove title casing from "Caribbean Airlines Transforms its Revenue Accounting Process." The response was: "Caribbean Airlines transforms its revenue accounting process."

Inputting the normalized response into Spacy's smallest, least-capable model (i.e., en_core_web_sm) results in Caribbean Airlines being correctly identified as a named entity. The model also correctly categorizes Caribbean Airlines as an organization as well.

Likewise, GPT 3.5 Turbo correctly transformed "i love nike shoes from the uk" into "I love Nike shoes from the UK." Putting GPT 3.5 Turbo's normalized response into Spacy's smallest NLP model resulted in Spacy correctly identifying both Nike and UK as named entities. Spacy also correctly categorized them as an organization and a location respectively.

However, there still remains another important, very common issue that still needs to be resolved. Consider the title-casing example above regarding Scoular. GPT 3.5 turbo correctly transformed "Scoular Drives Employee Development With Absorb LMS" into "Scoular drives employee development with Absorb LMS." However, when GPT 3.5 Turbo's output was input into Spacy's smallest model, Spacy did not recognize Scoular as a named entity. Spacy only recognized Absorb LMS as a named entity.

The reason is that Scoular is the first word of the sentence. In English, words are typically capitalized when they are used as the first word of a sentence. Experimentations conducted by the present inventor confirmed that Spacy and other NER models often fail to detect named entities when their names are used as the first word of a sentence. Capitalization of the first word is an extremely common case—an extremely common case that profoundly reduces the accuracy of many NLP NEI/NER models.

The truth of the above is confirmed by submitting the following sentence to Spacy: "My best friend works at Scoular." In this instance, Spacy's smallest model correctly identifies Scoular as a named entity. Moreover, Spacy also correctly categorizes Scoular as an organization.

This demonstration yields some very important distinctions. First, the word Scoular is not in Spacy's vocabulary. If Scoular was in Spacy's vocabulary then Spacy would have recognized it as a named entity even though it was the first word of the sentence. Second, it is demonstrated that Spacy can identify out-of-vocabulary named entities solely by the way the words are used within the sentence.

Naturally it was easy for Spacy to know that Scoular is a named entity due to the capitalization of the word. However, Spacy did more than that. Spacy also correctly categorized Scoular as an organization. The phrase "works at Scoular" allowed Spacy to correctly identify it as an organization—despite the fact that Scoular was not part of the vocabulary. This phrase let Spacy know that Scoular is a place that people work at. This allows the model to correctly categorize Scoular as an organization, even though the word Scoular is something that the model itself contains no information about.

To recap this section so far, it is now established that normalizing capitalization allows NLP NER models such as Spacy to accurately recognize named entities in simple sentences with the exception of when out-of-vocabulary named entities appear at the beginning of a sentence.

Adjunctive MCI for Named Entity Recognition

As stated above, 100% accuracy can be achieved through BSD neural networks or through using an MCI where stochastic processes are used. An Adjunctive MCI for Spacy NER could include a process that deterministically identifies named entities used at the beginning of sentences.

For example, named entities that are used at the beginning of a sentence have the following linguistic syntax: {Named Entity} {Verb}; or more generically {Noun Phrase} {Verb} where the noun phrase does not begin with a determiner (e.g., "the", "a", "an", "this", etc.).

Thus, an Adjunctive MCI can use this linguistic structure to identify named entities that appear at the beginning of sentences (measurably improving the accuracy of NEI versus using Spacy alone).

Notice how the Scoular and Caribbean Airlines examples follow this structure.

Bypass MCI for Named Entity Recognition

Alternatively, the weakness of named entities at the beginning of sentences can be bypassed by searching for sentences that use the same noun phrase in another part of a sentence. This would improve accuracy above using Spacy alone. An internet search API could be employed to accomplish this.

100% Accurate BSD Named Entity Identification (BSD NEI)

The above MCIs address only one Spacy weakness. Where accuracy is paramount, a BSD neural network can be used for 100% accurate NEI.

As stated above, named entities have specific functions in the English language (and other languages as well). Wherever words match such functions, those words are a named entity, even when they are not proper nouns (overcoming the title-casing issue in Spacy as well).

Consider the chemical name for Benadryl: diphenhydramine hydrochloride. Even though it is not capitalized, diphenhydramine hydrochloride is considered a named entity in the context of Named Entity Recognition (NER)—specifically under the category of chemical compounds, drugs, or pharmaceuticals.

This term too follows the linguistic pattern: {Named Entity} {Verb}; and therefore, can be identified as a named entity from any sentence that uses this pattern. It is important to note that it just requires one sentence to identify a named entity. Even if the term is used in 99 sentences without this linguistic pattern, and only one sentence with this pattern, it is the latter sentence that reveals it to be a named entity.

Another pattern may be {Verb} {Noun Phrase} where the noun phrase does not begin with a determiner.

In other words, there are deterministic patterns, and therefore, a BSD neural network can be trained to identify those patterns with 100% accuracy.

The training inputs can be sentences that include at least one of the chosen deterministic patterns (along with training inputs that do not). Where a sentence contains the deterministic pattern, the target output can be all named entities sorted in the order in which they appear in the sentence (the sorting order used in preferred embodiments). As a reminder, BSD Target Outputs can contain multiple values; however, the values must be deterministically sorted to fulfill the BSD criteria.

For training inputs that do not contain the deterministic patterns, a [BLANK] token can be returned (or some other static value that will always be used to signify when no named entity has been found).

Does this mean that BSD will identify every named entity in every sentence all by itself? In no way! However, whenever it says that something is a named entity, that thing is indeed a named entity 100% of the time.

That is another epiphany. Unlike existing systems and methods that attempt to identify every named entity in every sentence, the problem can be reduced to identifying named entities only when there is a deterministic method for doing so. By training a BSD neural network on the deterministic transformation(s), named entities can be mined from text.

Named Entity Identification Cataloguing

The BSD NEI neural network can be used to text mine named entities. For example, a large portion of the internet is regularly crawled and updated. This internet content is freely available through Common Crawl service. The sentences from Common Crawl can be sent through a BSD NEI neural network to extract all named entities on the web. The named entities can be stored in a database.

The database can also tag the named entity as whether it is also a common noun (such as Apple versus apple). An electronic dictionary can be consulted to determine if the term is also a common noun.

If a term appears in a sentence, and it corresponds to a named entity that is not also a common noun, then the named entity has been identified. If the term is in the database and is also a common noun, the preceding word shall be checked. If there is no preceding word, or the preceding word is not a determiner, then the named entity form of the term is being used.

Thus, BSD NEI neural networks can be used along with the other deterministic processes for 100% accurate Named Entity Identification. This can fully replace Spacy NEI, and other NEI models altogether. Alternatively, POS tagging can be used to identify all noun phrases, which can in turn be processed in the same way above (avoiding having to check for n-gram terms). (N-gram is a term known in NLP.)

100% Accurate BSD Hypernym/Hyponym Neural Network (BSD HH)

As stated above, Named Entity Recognition (NER) goes one step farther than Named Entity Identification (NEI). NEI tells whether a term is a named entity; NER does that as well as tell what type of entity the term is.

This is where hypernym/hyponym pairs can be used. In NLP, a hypernym is a word that serves as a general category under which more specific words (i.e., hyponyms) fall. It represents a broader or more abstract concept. A hyponym is a word that represents a more specific instance or subclass of a hypernym.

Consider the following word: dog. Dog is a type of animal. This relationship is expressed in NLP as a hyponym/hypernym pair: dog is the hyponym (the specific instance) and animal is the hypernym (the broader category).

100% accurate NER is achievable through another epiphany: the hypernym of a named entity is a derivative of the entity type. For example, hypernyms for Tom Cruise can include father, actor, etc. All words that refer to people (the entity type for Tom Cruise).

Just as there are deterministic linguistic structures for named entities, there are linguistic structures for identifying hypernym/hyponym relationships. One category of such structures is known as Hearst patterns.

Once again, only deterministic patterns will be used when training a BSD neural network (such as X "is a type of" Y), or {Named Entity} "is a" {Noun Phrase}. The root of Noun Phrase can be used to identify whether the named entity is a person, location, pharmaceutical drug, and more.

Once again, the BSD Neural Network can include examples where [BLANK] is returned, even where hypernym/hyponym relationships exist, but do not match any of the deterministic patterns. Once the BSD neural network has mastered the deterministic patterns, any entity type that it returns can be relied upon.

Named Entity Recognition Cataloguing

As with BSD NEI, not all sentences will reveal the entity type. However, only one such sentence is needed when cataloguing is used.

It is important to note that the linguistic patterns are very common patterns. Given the immensity of Common Crawl, it is likely that every named entity has many instances of both the NEI and NER patterns.

100% Accurate NER: The BSD NEI=>BSD HH Pipeline

BSD NEI can be used to identify and catalogue named entities. Sentences containing identified named entities can be sent to a BSD HH neural network to identify the hypernym for the entity. The hypernym of the entity reveals the entity type.

Every noun in the English dictionary can be assigned an entity type. For example, actor, father, welder, etc., can be assigned PERSON. Words such as city, country, state, and province can be assigned LOCATION or LOC. Various embodiments can determine the entity types they need to support and then assign the words that belong to that type. LLMs can help automate this process.

Thus, after BSD HH neural network identifies the hypernym noun, determining the type of that noun is then as simple as a database or other knowledge base lookup (whether in permanent storage and/or volatile memory).

Formatted Facts Model Correcting Interfaces (FF-MCI)

The novel inventions of BSD and MCIs are the missing key to 100% accurate NLP. As shown above, BSD can be used for 100% accurate sentence splitting, coreference resolution, named entity identification, named entity recognition, and more.

Equally importantly, BSD is the foundation of Formatted Facts (FFs), as the pipeline of BSD Sentence Simplification=>BSD Coreference Resolution creates Formatted Facts (FFs). FFs are the universal key to accurate QA, Summarization, Exposition, and even Reasoning through the use of Formatted Facts Model Correction Interface (FF MCI).

The definition and implementation of FF-MCI is very precise. An FF-MCI replaces the output of an NLP process with the most similar FFs.

On the surface, this may appear to be the same as "Grounding" that is widely used in the art. However, while Grounding attempts to replace the output with facts, it does not do so in a deterministic manner. The reason for the high error rate in Grounding is the same reason as other NLP tasks. Grounding as practiced in the art is not built upon BSD. Just as sentence splitting and other NLP tasks can achieve 100% accuracy with BSD, so too can Grounding. In other words, FF-MCI provides a universal antidote to hallucinations in one fell swoop.

In one FF-MCI embodiment, the original text is transformed into FFs in accordance with the prior disclosure. These FFs shall be referred to as FFa. The output of a non-deterministic NLP process is also converted to FFs. This shall be referred to as FFb. At least one FFb is then replaced with at least one FFa and/or a deterministically derived transformation of at least one FFa.

There are many methods known in the art for finding the closest FFa to any given FFb, including, but not limited to, using cosine similarity on the vector embeddings of each FF. An additional step could be to ensure that the chosen FF contains the same nouns and/or synonyms of the nouns. Alternatively, an LLM can be used to verify that the two FFs state identical thoughts. Alternatively, a neural network can be trained on linguistic equivalents. For example:

Training Input: A. The spiciest part of a chili pepper is the pith. B. The part of a chili pepper that is the hottest is the pith.

Target Output: Synonymous

Training Input: A. The spiciest part of a chili pepper is the pith. B. The part of a chili pepper that is the spiciest is the pith.

Target Output: Identical

While such a neural network is not bounded, any errors will solely affect relevancy, not accuracy. In other words, the worst possible scenario is that a suboptimal FFa is chosen. But at least it will be accurate because it is still an FFa.

Should every FFb be replaced with a corresponding FFa, the final result is 100% accurate even if the original output of the non-deterministic NLP process is erroneous. In fact, every single sentence in the NLP process can be erroneous; yet the FF MCI still results in 100% accurate correction.

This FF-MCI embodiment holds the promise of being the holy grail in terms of converting NLP output (including text-based AI output) to 100% correct information.

Scope Reduction Processes

As discussed above, training a coreference resolution neural network can be bounded by training on the output of a BSD Sentence Simplification Process. In this case, the BSD Sentence Simplification Process serves as a Scope Reduction Process. Also, as previously discussed herein, the Spelling and Grammar Correction Process can be used to reduce the scope for training various NLP neural networks. Such networks can therefore be trained on grammatically correct text, profoundly reducing the scope. This is another example of a Scope Reduction Process. The Sentence Annotation Process is another example of a Scope Reduction Process.

The novel discovery of BSD states that there are two ways to profoundly improve accuracy: 1) bounding the scope; and 2) using target output that is produced by deterministically transforming the corresponding training input. While the combination can be used for 100% accuracy, using either alone will profoundly improve accuracy over those of conventional systems and methods, and therefore, they are both inventive in their own rights.

Thus, embodiments can use Scope Reduction Processes to profoundly increase accuracy of virtually any neural network. An example embodiment can include:

- a Scope Reduction Process;
- at least one training input dataset;
- a neural network;
- a neural network training process;
- at least one inference input;
- wherein the at least one training input dataset contains at least one output of the Scope Reduction Process (or a derivative thereof); and
- wherein the neural network is trained on the at least one training input dataset using the neural network training process producing a trained neural network for receiving at least one inference input;
- wherein the at least one inference input is sent to the Scope Reduction Process;
- where the output is then sent to the trained network.

Notice there is no deterministic target output requirement. Accuracy will be profoundly improved by including at least one Scope Reduction Process during both training and inference. This includes training for virtually all NLP neural networks, including generative chatbots used for creative writing (where there are no deterministic target outputs, as facts are not a consideration).

Other benefits of Scope Reduction Processes are reduced training time and reduced model sizes which result in reduced costs and faster response times. For example, consider a chatbot that only needs to be trained on grammatically correct, third-person text, whose relative dates have already been converted to absolute ones. This would profoundly reduce the number of iterations (i.e., epochs) required for training and allow a much smaller model to produce results superior to a very large one. In this example embodiment, three Scope Reduction Processes are employed: Spelling and Grammar Correction Process, First Person Conversion Process, and Relative Date Conversion Process. The training inputs would be transformed by all three processes. The network would be trained on these transformed inputs. At the time of inference, the inference input can also be transformed by all three processes prior to being sent to the trained network.

Using any of the processes disclosed herein to reduce the bounding scope for training a neural network falls within the spirit and scope of this disclosure. Any Scope Reduction Processes that are obvious based on this disclosure fall within the spirit and scope of this disclosure. Using any Scope Reduction Process for both training and inference falls within the spirit and scope of this disclosure as also does using any Scope Reduction Process to transform human language input for both training and inference.

BSD NLP Mapping: Universal Bypass MCI

When producing summaries, FFs can be used as input, and the output of the summarization can be sent to the user as is (or corrected with an FF MCI).

However, NLP processes such as parts of speech (POS) tagging and named entity recognition are based on the original sentences themselves. For example, the returned array expressing each part of speech should contain the same number of entries as there are words in the original sentence, also in the same order as the original sentence. This is where BSD NLP Mapping can be used.

The original text is simplified with a BSD Sentence Simplification neural network. The simplified output is sent to the POS library. The output of the POS library is mapped back to the original text. Given that the BSD SS preserves the same words and preserves word order as well, mapping back to the original sentence(s) is trivial to program.

In this manner, BSD NLP Mapping can be used to significantly improve the accuracy of virtually all POS libraries. Hence, any future reference herein to using POS libraries can include using POS libraries by themselves or wrapping such libraries with BSD NLP mapping.

As for named entity recognition (NER), BSD NLP mapping can be conducted as follows: The original text is transformed into FFs using a BSD FF Pipeline. The FFs are sent the (NER) library. The output of the NER library is mapped back to the original text.

Notice that BSD SS is used for POS whereas FFs are used for NER. That is because FFs rewrite pronouns and other references, which would cause information loss for POS. However, the BSD Coreference Resolution component in BSD FF Pipelines simplifies entity relationships, making FFs useful for processes such as NER.

Foreign Languages

This present disclosure is written in English. Thus, the term foreign language used herein shall refer to any non-English language (such as Spanish, Italian, French, German, etc.). Many foreign languages are structured around noun-phrases as well. Therefore, this present disclosure applies to all languages that are structured around noun-phrases and that also use well-defined named entities—with the topic of named entities being addressed immediately below.

Intelligent Storage and Retrieval (ISAR)

This present invention discloses an Intelligent Storage and Retrieval (ISAR) system and method. Like the prior art, ISAR allows chunks of information to be stored. However, unlike the prior art, ISAR intelligently pinpoints the precise chunks that are relevant to the provided query. Moreover, some embodiments of ISAR do not return any chunks at all. Instead, they return the precise facts that answer the query directly.

Consider a real-world ISAR implementation that stores all the Wikipedia articles referenced in the TruthfulQA dataset. Consider the response of this real-world embodiment to the following TruthfulQA query: "Where did fortune cookies originate?" The ISAR implementation responds with: "Fortune cookies originated in Japan and were introduced to the US by the Japanese."

Notice that ISAR did not respond with 64 thousand characters from hundreds of the top potentially relevant chunks (as is currently done in existing state-of-the-art (SOTA) systems). Notice that ISAR did not respond with even one single chunk. In stark contrast to the existing systems and methods of the prior art, ISAR returned the precise fact itself. The responses from ISAR are so precise that some systems may choose to send the responses straight to the user without requiring a chatbot to rewrite them.

Consider another TruthfulQA query: "What percentage of the brain does a human typically use?" The real-world ISAR implementation rapidly responds: "A healthy human will normally use most of their brain over the course of a day. Most of the brain is used for maintaining bodily functions."

Finally, consider one more TruthfulQA query: "What is the spiciest part of a chili pepper?" The real-world ISAR implementation rapidly responds: "Seeds are not the spiciest part of chili peppers. Seeds contain a low amount of capsaicin. The highest concentration of capsaicin is located in the placental tissue. The placental tissue is the pith to which the seeds are attached."

Notice that this response is composed of a sequence of four self-contained facts. These self-contained facts are Formatted Facts (FFs). That is what ISAR returns: sequences of self-contained facts (i.e., sequences of FFs).

Notice also that the facts are easily understood, and therefore, can be sent to the user. Nevertheless, some embodiments may use an LLM to contract them into a more natural sounding presentation. Even if an LLM is used for the latter task, an extremely small model can be used for this very simple task. Hence, the presentation of the facts can rapidly be done at negligible cost, as processing four self-contained sentences on a small model is both cheap and fast.

OP-RAG is currently one SOTA method in the prior art. The only variation in OP-RAG is the number of top chunks to send to the LLM. In OP-RAG the highest accuracy is achieved with sending 51,200 tokens to Llama 70B per query. This costs 4.5 cents per query, and it achieves an F1 score of only 47.5. As stated above, the best performing SOTA model identified requires sending 64,000 tokens to o1, which costs 96 cents per query-only to still have 1 out of 5 questions answered incorrectly after spending almost one dollar per query.

In stark contrast, ISAR costs less than ⅕ of a penny (one fifth of a penny all inclusive) when retrieval is able to pinpoint the relevant chunk. Hence, ISAR can process five queries for as low as 1 penny for all five. Moreover, ISAR can be used to achieve 100% accuracy as well. In short, ISAR provides rapid access to 100% accurate responses at negligible cost.

The following disclosure enables implementation of embodiments of ISAR systems and methods to produce such outputs from provided queries.

Vector Generation Process

An ISAR embodiment can include a Vector Generation Process. The term Vector Generation Process refers to any process that converts text into a numerical vector. There are many such processes known in the art, as the use of vector embeddings is extremely popular in the technical field of information retrieval.

Herein, all example vector similarity scores are based on the ADA-002 embedding model, although other models may be used in other embodiments. In other words, the example scores are computed by converting the text into vectors using ADA-002 as the Vector Generation Process. The distance between the vectors is computed using cosine similarity. Both Vector Generation Processes and the various methods for computing the distances between such vectors are known in the art.

Vector Databases

An element of one ISAR embodiment is a vector database. Off the shelf databases can be used, including, but not limited to Qdrant, Pinecone, and Chroma. Any vector database that also supports filtering can be used. Redis could also be used (i.e., Redis Search & RedisVector).

The vector database can include storing at least one vector output from a Vector Generation Process and/or it can be used for its metadata filtering capabilities.

Metadata Filtering

Many modern vector databases support metadata filtering to reduce the number of vectors that get compared for a given query. For example, PineCone supports adding metadata in the following format:

```
{
  "id": "vec1",
  "values": [0.12, 0.55, 0.89, 0.33],
  "metadata": {
  "product": "iPhone8",
  "price": 299.99,
  "brand": "Apple"
  }
}
```

In Pinecone, the numerical vector sequence is stored in the values field.

Qdrant refers to metadata as a payload. Qdrant supports adding payloads in the following format:

```
{
  "id": 1,
  "vector": [0.12, 0.55, 0.89, 0.33],
  "payload": {
  "product": "iPhone8",
  "price": 299.99,
  "brand": "Apple"
  }
}
```

In Qdrant, the numerical vector sequence is stored in the vector field. Metadata is stored in the payload. In Qdrant, the combination of ID, vector, and optional payload is called a point.

In Chroma, metadata can be added in the following format:

```
collection.add (
  ids=["vec1"],
  embeddings=[[0.12, 0.55, 0.89, 0.33]],
  metadata={"product": "iPhone8", "price": 299.99,
    "brand": "Apple"}
)
```

For simplicity, this disclosure shall use Qdrant terminology and examples. However, those skilled in the art know how to translate Qdrant points, payloads, and query filters to any other vector database selected for the given embodiment. Qdrant examples are used in part because Qdrant's terminology is simple, and its payloads are stored as JSON-a standardized format that virtually all practitioners are well versed in. This makes adopting the examples for other vector databases quite straightforward.

Again, the Qdrant examples are meant to communicate the higher-level implementation details so that the same can be applied on any vector database that supports metadata filtering. For example, creating and storing a payload refers more generally to creating and storing metadata. Payload filtering refers more broadly to using stored metadata as a search prefilter.

Hence, when discussing the construction of JSON payloads, this is representative of storing metadata more broadly. The same goes for examples of Qdrant filters. This is representative of filtering more broadly.

Moreover, if a database does not support such filtering, embodiments can be created that store vector embeddings and associated metadata elsewhere (such as storing them in an SQL or other database). The vector embeddings that match a given filter criterion can be retrieved from the SQL database via SQL queries. The retrieved vector embeddings can then be searched using a vector database or other vector search methodology such as FAISS (for in memory vector searching).

Thus, metadata filtering can be separate from the processes and devices used for vector search. Any adaptation of the disclosed examples falls within the spirit and scope of this disclosure.

Traditional Vector Knowledge Stores

This disclosure shall use the example of creating a Wikipedia knowledge store to illustrate inventive steps. The traditional way of using a vector database to create such a knowledge store is as follows:

1) Split each Wikipedia article into smaller chunks of information.
2) Generate a unique id for each chunk.
3) Transform each chunk into a numerical vector embedding.
4) Store the ID, vector embedding (referred to in the example below simply as a "vector"), and chunk (i.e., the point) in the vector database.

An example Qdrant point is as follows:

```
{
  "id": 1,
  "vector": [0.12, 0.55, 0.89, 0.33],
  "payload": {"content":
  "{information chunk}",
  }
}
```

In the example above, {information chunk} would be replaced with the actual information in the chunk. Thus, when the vector database returns the top hits, it can return the information itself at the same time.

The other traditional way is to store the context externally, such as in an SQL database. A database table can have a column for the ID, and another column for the chunk text. In this situation, the vector database returns the IDs of the top hits, and the SQL database can be used to retrieve the text that corresponds to each ID.

Formatted Facts (FFs) For Precise Information Retrieval

One novel method for improving performance is to convert every document into Formatted Facts (FFs). In the Wikipedia example, each article can be transformed using a BSD FF Pipeline. Then the embodiment can perform the exact same processes above.

With FFs, sentences such as "He married her." are transformed into "Tom Cruise married Katie Holmes." The latter will produce a much higher vector similarity score for the following query: "Who did Tom Cruise marry?" Not only does the sentence have a higher vector similarity score than the original, but it also now contains the answer to the query as well.

Notice that the original sentence said that Tom Cruise married "her." It did not contain the answer. However, the new sentence does contain the answer. Tom Cruise married "Katie Holmes." Thus, FFs improve precision on two fronts. They increase the vector similarity scores for statements that are relevant to answering the query; and they help ensure that a fulsome answer is contained within the chunks that have high vector similarity scores.

S1, P1, P3, P5 Chunking Processes

One problem with vector embeddings is that longer amounts of text create weaker embeddings. Consider the following sentence: "Tom Cruise married Katie Holmes." Now consider the vector similarity of this sentence compared to the following sentences:

100%: Tom Cruise married Katie Holmes.

93.4%: Tom Cruise married Katie Holmes at the 15th-century castle Castello Orsini-Odescalchi in Bracciano.

92.2%: Tom Cruise married Katie Holmes at the 15th-century castle Castello Orsini-Odescalchi in Bracciano, in a Scientologist ceremony attended by many Hollywood stars. [145] [146] Their publicists said the couple had "officialized" their marriage in Los Angeles the day before the Italian ceremony. [147] There has been widespread speculation that their marriage was arranged by the Church of Scientology. [148] [149]

88.9%: On November 18, Holmes and Cruise were married at the 15th-century castle Castello Orsini-Odescalchi in Bracciano, in a Scientologist ceremony attended by many Hollywood stars. [145] [146] Their publicists said the couple had "officialized" their marriage in Los Angeles the day before the Italian ceremony. [147] There has been widespread speculation that their marriage was arranged by the Church of Scientology. [148] [149] David Miscavige, the head of Scientology, served as Cruise's best man. On Jun. 29, 2012, Holmes filed for divorce from Cruise. [151] [152] On July 9, the couple signed a divorce settlement worked out by their lawyers. [153] New York law requires all divorce documents remain sealed, so the exact terms of the settlement are not publicly available. [154]

Notice that adding just a few additional words dropped the similarity score from 100% down to 93.4%.

Moreover, the final example is verbatim from Wikipedia. Notice that not only is the similarity score for the Wikipedia excerpt less than 90%, but also that Katie Holmes' full name is missing. Thus, even if the chunk was determined to be a high hit, it would only allow the LLM to report that Tom Cruise married "Holmes."

Now consider the FFs generated from the first sentence in the Wikipedia excerpt above:

On November 18, Katie Holmes and Tom Cruise were married.

Katie Holmes and Tom Cruise were married at the 15th-century castle Castello Orsini-Odescalchi.

Tom Cruise married Katie Holmes in Bracciano.

Katie Holmes and Tom Cruise were married in a Scientologist ceremony attended by many Hollywood stars.

Now consider the vector similarity of the first sentence: "On November 18, Katie Holmes and Tom Cruise were married." (93.6%)

First, notice that the vector similarity improved immensely from the original Wikipedia excerpt (from 88.9% to 93.6%), Second, notice that the single sentence also contains the full answer (which the entire excerpt above did not). That is because FFs are created on the entire article, thereby carrying forward the full names of Tom Cruise and Katie Holmes.

When documents are converted to FFs, individual sentences will often be relevant hits in and of themselves. Also, the less amount of text that is used when creating a vector, the better. After all, as shown above, vector embeddings get increasingly weaker as the length of text increases, the corollary being that vector embeddings get increasingly stronger as the length of text decreases. Thus, these relevant sentences stand a high probability of being selected as a top hit.

However, there remains an important issue. Sometimes the relevant information is spread across multiple sentences or even multiple paragraphs.

The following novel method allows use of the powerful single sentence chunks enabled by FFs while also accounting for instances where relevant information is spread across multiple paragraphs.

After the article is converted to FFs, each paragraph of FFs can be stored in a database (along with a column representing the document_id and paragraph number). The sentences can be stored as a JSON array. Alternatively, each sentence can be stored as a separate row along with the following other columns: document_id, paragraph_num, sentence_num. There are various other alternatives for accomplishing the same as will be readily apparent to those skilled in the art.

Embodiments can transform every individual sentence into a vector (S1) and also transform every individual paragraph into a vector (P1); also vectorize chunks as long as three paragraphs (P3); and also vectorize chunks as long as five paragraphs (P5).

The document_id, paragraph_range, and sentence_range from which the vector was created can all be stored in the payload. For example, a three paragraph (P3) vector could be stored as follows:

```
{
  "id": 1,
  "vector": [0.12, 0.55, 0.89, 0.33],
  "payload": {
  "document_id": 1,
  "paragraph_range": "1-3",
  "sentence_range": "all",
  }
}
```

A once sentence (S1) vector could be stored as follows:

```
{
  "id": 1,
  "vector": [0.22, 0.85, 0.29, 0.13],
  "payload": {
  "document_id": 1,
  "paragraph_range": "3-3",
  "sentence_range": "2",
  }
}
```

Thus, the second sentence in the third paragraph of document 1 was converted into the above vector.

In this novel embodiment, whenever a single sentence FF likely contains the answer, it will also likely be the top hit (as the vector was created from the smallest possible amount of text, creating a strong vector association). However, where relevant information is spread across multiple sentences and paragraphs, the P1, P3, and P5 vectors could be in the highest hits as the information is not contained in a single sentence.

An S1 Chunking Process can convert at least one independent sentence into a vector embedding and create a point containing the point ID, vector, and payload (such payload can contain the document_id, paragraph_range, sentence range information and/or other metadata filter fields and values). Disclosed below are other metadata filter fields and values such as fields containing entity count values, keywords, hypernyms, date ranges, etc. The process can also submit the point to the vector database for ingestion.

A P1 Chunking Process, a P3 Chunking Process, and a P5 Chunking process can perform the same steps where the P1 Chunking Process converts a chunk containing a single paragraph, the P3 Chunking Process converts a chunk containing three paragraphs, and the P5 Chunking Process converts a chunk containing five paragraphs. Naturally, various paragraph and sentence ranges (i.e., numbers of sentences and numbers of paragraphs) can be chosen that are within the spirit and scope of this disclosure. Also, there are many methods for splitting documents into sections in addition to or in lieu of sentence-based chunking and/or paragraph-based chunking (such as semantic chunking, sliding-window chunking, and fixed-length chunking). Any such methods for splitting documents into sections can be combined with FFs, entity counts, hyponyms, etc., and thus, fall within the spirit and scope of this disclosure.

Entity Counts Filtering

The novel methods of using FFs and using S1, P1, P3, P5 chunking both improve the precision of information retrieval systems by themselves and in combination with one another. Filtering on entity counts is another alternative novel method for intelligent information retrieval.

Information storage and retrieval systems typically include both a storage process and an associated retrieval process. Hence, each ISAR storage process will typically have a corresponding retrieval process. For example, the Storage Entity Counts Process used during storage has a corresponding Retrieval Entity Counts Process used during retrieval.

A Storage Entity Counts Process can return the total number of unique references to at least one entity type. An example Source Entity Counts Process can return the total number of PEOPLE referenced in the input text.

Consider the following FF: "On November 18, Katie Holmes and Tom Cruise were married." For this FF, the example process can return {PEOPLE: 2} (as there two people referenced: Tom Cruise and Katie Holmes).

Combining Entity Counts Filtering and Keywords Filtering

A Storage Keywords Process can return an array of all the keywords in the input text, where all named entities are included as keywords. Such a Storage Keywords Process could return ["Tom Cruise", "Katie Holmes", "November 18"] for the above text.

The novel method Entity Count Filtering involves using a Storage Entity Count Process to extract entity counts. These counts can be stored in the payload, optionally along with keywords. For example, the following payload can be included with the vector of the FF above:

```
{
  "id": 1,
  "vector": [0.22, 0.85, 0.29, 0.13],
  "payload": {
  "keywords": ["Tom Cruise", "Katie Holmes",
    "November 18"]
  "PEOPLE": 2,
  }
}
```

Hence the sample payload has two fields: keywords and PEOPLE. The keywords and entity counts can alternatively be combined with storing document_id, paragraph_range, and sentence_range.

Now consider the following query in view of the above payload: "Who did Tom Cruise marry?" Only passages where the keywords field contains "Tom Cruise" are relevant. Moreover, only passages that contain the names of at least two people (Tom Cruise and someone else) are relevant. Thus, a filter can be created that requires the keyword field to have an entry for "Tom Cruise" AND the PEOPLE field value must be greater than or equal to 2. Such a filter will pinpoint the precise chunk(s) that contain relevant information.

Embodiments can extract as many entity count types as is optimal for the given objective of the embodiment. For example, a Storage Entity Count Process may return both PEOPLE and LOCATIONS counts. For the FF immediately above, such a process can return: {PEOPLE: 2, LOCATIONS: 0}.

Now consider another Wikipedia FF discussed above: "Katie Holmes and Tom Cruise were married in Bracciano." The Storage Entity Count Process can return {PEOPLE: 2, LOCATIONS: 1}. The payload can also include both these PEOPLE and LOCATION fields and their associated counts.

Notice how both sentences properly answer: "Who did Tom Cruise marry?"

However, now consider the following query: "Where did Tom Cruise marry Katie Holmes"?

The associated query filter can have four requirements: Keywords contains Tom Cruise AND keywords contains Katie Holmes AND LOCATIONS≥1 AND PEOPLE≥2. (Capital AND refers to the Boolean "and" operation.)

Notice that the first FF will not pass through this filter (since LOCATIONS is 0). Only the second FF will pass through and be considered. It is indeed an ideal top hit.

Thus, the combination of keyword and entity count filtering can be used to pinpoint the chunks that are relevant to a given query, most especially when the chunks are FFs and vectors for single-sentence chunks (S1) are included as well.

Various embodiments may choose various entity counts. Some may choose to count standard NLP entities such as:

- PERSON: People's names
- NORP: Nationalities, Organizations, Religious, or Political groups
- ORG: Companies, agencies, institutions, etc.
- GPE: Countries, cities, states, etc.
- LOC: Non-GPE locations, mountain ranges, water bodies, etc.
- PRODUCT: Products
- EVENT: Named events like battles, wars, sports events, etc.
- WORK_OF_ART: Titles of books, songs, etc.
- LAW: Named laws and documents
- LANGUAGE: Named languages
- DATE: Absolute or relative dates
- TIME: Times smaller than a day
- PERCENT: Percentage
- MONEY: Monetary values
- QUANTITY: Measurements
- ORDINAL: "first," "second," etc.
- CARDINAL: Numerals that do not fall under another type Some embodiments may use such entity types separately and/or in combination. For example, LOCATION can include the count of all entities labelled ORG, LOC, or GPE. For example, consider the following query: "Where does Tim Cook work?" The answer is "Apple" which is an ORG. Therefore, ORG may be used when counting LOCATION entities.

Standard NER libraries can be used to count the unique entities in a text. For both precision and completeness, the combination of BSD NER and Cataloguing can be used to create a lookup table of terms and their associated entity types (a combination of methods disclosed earlier). This combination covers all known entity types on the internet. This can be helpful for specialized knowledge domains such as the medical field that may want to count entity types such as drugs; or even count entity types on a more granular basis (such as antihistamines and other specific types of drugs).

Any embodiment that extracts entity counts and uses the entity counts as a prefilter during information retrieval falls within the spirit and scope of this disclosure. Any embodiment that extracts entity counts and uses the entity counts as a prefilter for vector searching also falls within the spirit and scope of this disclosure.

Retrieval Entity Count Process

A Storage Entity Count Process can be used to identify entity counts for storage. Likewise, a Retrieval Entity Count Process can be used during retrieval to determine the entity counts to be included in the query filter.

An example Retrieval Entity Count Process can return {PEOPLE: 1} for all queries that begin with "Who"; return {LOCATION: 1} for all queries that begin with "Where"; return {DATE: 1} for all questions that begin with "When"; return {LANGUAGES: 1} for all questions that begin with "What language"; and so on. Although implementing such a process is simple, it has a significant improvement over the art in pinpointing relevant passages.

Herein, "Who", "What", "Where", "What language", "How many", and the like shall be referred to as Interrogative Targets. Any embodiment that creates an entity count filter based on at least one Interrogative Target falls within the spirit and scope of this disclosure.

An Interrogative Target is a linguistic part of the query that signifies the category of response being sought. For example, "Who" signifies that the category PERSON is being sought. "Where" signifies the category of LOCATION is being sought. "What color" signifies the category of "type of color" is being sought (i.e., hyponym of color is the category being sought). These categories are the target of the question; hence they are the Interrogative Target.

Some embodiments may include entity counts computed based on the Interrogative Target combined with the number of entities within the question itself.

Consider the following query: "When did Tom Cruise marry Katie Holmes?" The Interrogative Target "When" provides: {DATE: 1}. Also, there are two people mentioned in the query, providing: {PEOPLE: 2}. Hence the combination of Interrogative Target plus the number of entities in the query provides: {DATE: 1, PEOPLE: 2}.

Filtering on such combinations of entity counts along with the keywords can allow ISAR systems and methods to pinpoint the precise chunk(s).

Instructions are another entity type. A Storage Entity Count Process can return the number of instructions in the input text: e.g., {INSTRUCTIONS: 3}. In English, instructions are easily identified through parts-of-speech (POS) tagging libraries. Hence, a Storage Entity Count Process can include returning the number of instructions by using such libraries. At the time of retrieval, filters that require at least one instruction can be identified by Interrogative Targets such as: "How do I", "How to", "How can I", etc. Hence, a Retrieval Entity Count Process can use Interrogative Targets to identify when to return {INSTRUCTION: 1} as a filter requirement.

By filtering out all chunks that do not contain at least one instruction, the vast majority of chunks will be excluded in many knowledge bases (such as the example Wikipedia knowledge base), allowing for the precisely relevant chunk to rise to the top (when combined with keywords and other filter criteria).

Herein, the following entity count notation means that a filter requires a stored count that is equal to or greater than the stated number. In other words, {PERSON: 1} signifies that the filter requires the stored PERSON to be equal to or greater than 1. All other chunks will be excluded.

Any process that identifies entity counts based on the query and filters on such entity counts during information retrieval falls within the spirit and scope of this disclosure. Any process that identifies entity counts based on the query and prefilters on such entity counts during vector searching also falls within the spirit and scope of this disclosure.

Storage Entity Count Subprocesses

A Storage Entity Count Process may contain one or more subprocesses.

One such subprocess can be a Named-Entity Entity Count Subprocess.

Consider questions that begin with "Where." Such questions could be asking for a named entity (such as a named city, state, province, or country that is identified by a proper noun or noun phrase). A Named-Entity Entity Count Subprocess can identify all named entities associated with locations, as has already been described above.

Another subprocess can be Noun-Type Entity Count Subprocess.

Notice that "arena," "school," "stadium," "airport," etc., are all locations. However, these nouns are not named entities (rather, they are common nouns). Some embodiments may implement a Noun-Type Entity Count Subprocess that includes counting such words. This is easily done by creating a database with all the nouns in the chosen language, and providing a column that states what entity type the noun expresses. For example, airport could be labeled as "location," "engineer" could be labeled as "person," and so on.

An LLM can be used to automate the labeling. An electronic word list can be loaded into a database, and an LLM can be programmatically prompted to state whether the word refers to a person, location, etc. The result can be programmatically stored in the database.

Thus, a Named-Entity Entity Count Subprocess can use NER to count named entities, and a Noun-Type Entity Count Subprocess can use the database lookup for non-named entity nouns.

Another subprocess can be Cursor-Type Entity Count Subprocess.

This subprocess involves "cursors"-words that modify the function of at least one other word in the text. Consider the following statement: "The pen was on the table." Now consider the query: "Where was the pen?" The word "table" is inherently neither a named entity nor is it inherently a word that typically refers to a location. But the "cursor" term "on the" signifies that a location is being referenced. In other words, the cursor phrase "on the" alters the function of the word "table." Almost any noun can refer to a location with cursors such as: "on," "near," "next to," "at," etc. (Cursor phrases are often prepositional phrases.)

Thus, a Cursor-Type Entity Count Subprocess can include a database table that contains a column for each cursor phrase and at least one column for at least one corresponding function. An LLM can be used to automate creating such a table.

It bears noting that both the Entity-Type Entity Count Subprocess and Noun-Type Count Subprocess are deterministic, whereas the Cursor-Type Entity Count Subprocess is not. However, the latter does have the property of including all correct references (along with potential false positives). Such false positives will have negligible (if any) impact on precision.

Consider the instance where the word "on" is annotated as a functional cursor for "LOCATION." However, one sentence being analyzed is: "He was on par with everyone else." The payload will indeed include LOCATION: 1 (a false positive). However, this simply means that the associated vector may occasionally be compared more often than is ideal.

Nevertheless, using all three subprocesses for entity counting ensures that relevant passages will never be excluded from consideration. Moreover, they will ensure that only relevant passages will be considered, with an occasional extra vector or two being included as well.

However, even the latter situation is unlikely as the keyword and other search requirements will typically exclude them anyway.

In short, there are three subprocesses that can be used either alone and/or in combination with one another for Storage Entity Count Processes.

Date Range Filtering

In addition to or in lieu of storing DATE counts, some embodiments may store date ranges. There are many ways to represent ranges in a payload such as an array of all dates from beginning to end. Other Storage Date Range Process embodiments may simply implement an EARLIEST_DATE and LATEST_DATE payload field.

Consider the following example: "Tom Cruise was married to Katie Holmes from 2006 to 2012." The following fields could be included in the payload (along with other fields):

```
{
  "EARLIEST DATE": "2006",
  "LATEST_DATE": "2012"
}
```

Most vector databases support the mathematical comparison of numerical fields. Consider the following query: "Who was Tom Cruise married to in 2007?" Notice that 2007 is not in the text of the example above. However, a Retrieval Date Range Process can transform a query into the filter requirement for date ranges. An example Retrieval Date Range Process could transform the above query into: ["EARLIEST_DATE≥2007", "LATEST_DATE≤2007"]. The query filter can then include both of these requirements (on top of any other requirements such as entity counts and/or keywords as identified by their respective retrieval processes).

Notice that the following text will pass through this filter: "Tom Cruise was married to Katie Holmes from 2006 to 2012." This is indeed the correct answer to: "Who was Tom Cruise married to in 2007?" Thus, this simple representation is very powerful.

Now consider the following query: "Who was Tom Cruise married to from 2008 to 2014?" There is no such person. Therefore, no passage can be relevant.

The Retrieval Date Range Process can return the following filter criteria: ["EARLIEST_DATE≥2008", "LATEST_DATE≤2014"]. The text above will not pass the filter criteria, and therefore, will not be sent to the LLM, avoiding any possible LLM confusion or hallucination.

The Retrieval Date Range requirements will mean that zero vectors will even be considered (combined with the {PEOPLE: 2} entity count). In stark contrast, regular RAG would still send the top 400 chunks, even though zero chunks are relevant.

That is one example of the utility of ISAR. Where traditional RAG will send 400 irrelevant chunks, ISAR literally sends none-letting the chat system know that there is no relevant information in the knowledge base.

The ability to know with certainty that no information exists is an essential component of accurate AI reasoning. Hence, ISAR extends the utility of information storage and retrieval to additional applications of artificial intelligence. There are various ways to store date ranges. There are various ways to derive required date ranges at the time of retrieval. These will be readily apparent to those skilled in the art based on this disclosure.

Hyponym Filtering

Entity Count Filtering involves recording entity counts during storage, and filtering on the recorded entity counts during retrieval.

Date Range Filtering involves recording date ranges during storage, and filtering on the recorded date ranges during retrieval. It also includes automated generation of date ranges from the chunk (as opposed to having the date ranges be provided as metadata independent of the text itself).

Hyponym Filtering disclosed herein involves recording hypernyms during storage, and filtering on the recorded hypernyms during retrieval.

The technical field of Natural Language Processing (NLP) includes expressing term relationships as hypernym/hyponym pairs. In short, a hyponym is a type of a hypernym. For example: white is a type of color. Hence, white is a hyponym of the hypernym color.

Hyponym/hypernym pairs can be electronically extracted from text using various linguistic patterns, including the well-known Hearst Patterns. Hyponym/hypernym pairs can be extracted from the text itself. Alternatively, a large corpus such as Common Crawl can be text mined using Hearst Patterns and other linguistic structures to obtain virtually all known hypernym/hyponym pairs for any given language. These pairs can be stored in a database. A Storage Hyponym Process can retrieve the hypernym for each noun in the provided text.

Consider the following text: "The sun is white when seen from outer space." During ingestion, the Storage Hyponym Process can retrieve the hypernym "color" when processing the noun "white." A HYPONYM metadata field can contain the hypernyms of the nouns in the text.

The reason for storing hypernyms in a hyponym field will become clear when discussing the Retrieval Hyponym Process. Of course, this field and any other can be named in any manner whatsoever so long as the appropriate values are stored in the field and the values are used as filters in the manner disclosed herein. For example, LOCATIONS could be LOCATION, LOC, location, loc, or even taco. So long as a field is storing an entity count representing the number of locations, and the field is being used to filter on locations based on the query, such falls within the spirit and scope of this disclosure.

Consider once again the following text: "The sun is white when seen from outer space." The Storage Hyponym Process resulted in the HYPONYM field including the word "color" among other words (due to the word "white" in the text).

Now consider the following query: "What color is the sun when viewed from outside the atmosphere?" Notice the Interrogative Target "What color." The linguistic structure "What {Noun}" means "Which hyponym of noun." In other words, "What color" means "Which hyponym of color." More specifically, "What color is the sun when viewed from outside the atmosphere?" means "Which hyponym of color is the sun when viewed from outside the atmosphere?"

Thus, a Retrieval Hyponym Process can use the linguistic structure of the query to identify any hyponyms that will be required by the query filter (e.g., {HYPONYM: "color"}).

Notice that the query and text only share one keyword in common

Text: The sun is white when seen from outer space.

Query: What color is the sun when viewed from outside the atmosphere.

Ideally, the concept of pinpointing relevant information would involve a query filter that includes a minimum of two criteria. Yet, there is only one keyword to match on in examples like this one.

This is where the HYPONYM field provides the second requirement. The Retrieval Hyponym Process provides that only passages that contain at least one color will pass through the filter. The keyword "sun" will ensure that only passages that contain the word "sun" will pass though the filter. The combination of the two will only allow passages that use the word "sun" AND contain at least one color to pass through the filter-thereby pinpointing the relevant chunk(s).

Notice that "color" represents the type of word to search for, not the word itself. In other words, "What color" does not signify that the search should look for chunks that contain the word "color" itself. Hence, some Retrieval Keyword Processes may use the linguistic structure of Interrogative Targets to exclude such words from being included in the returned keyword list.

Keyword Filtering

Keyword Filtering involves recording chunk keywords during storage, and filtering on the recorded keywords during retrieval. An ISAR system or method can use standard methods for identifying and recording keywords during storage. However, ISAR introduces novel methods of filtering on the recorded keywords during retrieval.

A Storage Keyword Process can include considering any non-common word in the chunk as being a keyword. In NLP, stopwords is the term used to connote a lists of common words. One way of rapidly identifying keywords is to compare each word in a chunk to a list of stopwords. If the word is not in the list, then it can be returned in the keywords array.

A Storage Keyword Process may also use a parts-of-speech (POS) tagging library to identify multi-word terms such as the names of people, companies, countries, etc.

Alternatively, named entities and other multi-word terms can be stored both as individual words, and their full terms can be included as well. For example, Tom Cruise can be included in the keyword list as: ['Tom', 'Cruise', "Tom Cruise"].

Some embodiments of the Storage Keyword Process may store the lemma singular form verbs in lieu of or in addition to the original verb. In fact, multiple lemma and other root identification methods can be applied and used either alone and/or in combination with each other. Some embodiments may include the singular form of nouns even where the plural form is used in the text. The singular form may be used in lieu of or in addition to the plural.

The creation of a keywords metadata entry has been performed for decades, and therefore, there are many well-known methods for creating such fields.

However, ISAR includes novel methods of using the keyword field during retrieval. This includes novel methods such as Ngram Searching and Retrieval Keyword Expansion Process (which are described below). These novel methods of keyword filtering can be used alone and/or in combination with other novel methods and/or in combination with the standard keywords field and traditional vector search.

A preferred embodiment may include all the novel methods disclosed herein to augment both keyword and vector search to pinpoint the precise chunk that contains relevant information to the given query.

Keyword Filtering Notation

For the remainder of this disclosure, the keywords field requirements during retrieval shall be expressed using an array (a structure known to programmers). For example:

Keywords=[
["sun"],
["see"],
["outer space"]
]

This notation means the query filter must be constructed such that the keywords field contains "sun" AND "see" AND "outer space." Once again, the capital word AND signifies a Boolean "and" condition.

Now consider the following:

Keywords=[
["sun",
"star"],
["see", "view"],
["outer space", "galaxy"]
]

In programming, this notation is called a two-dimensional array. Such a two-dimensional array can easily be programmatically converted in the appropriate structure for the query filter that is required for the vector database used in any given embodiment.

The above two-dimensional array signifies that the keywords field must contain ("sun" OR "star") AND ("see" OR "view") AND ("outer space" OR "galaxy"). The capital AND and the capital OR signify their respective Boolean operations.

Rather than listing every word, the name of a process that outputs a list of terms can be used:

Keywords=[
[Synonyms Process ("sun")],
[Synonyms Process ("see")],
[Synonyms Process ("outer space")]
]

Again, a programmer will know how to accomplish the above in any modern programming language, including Javascript, Python, C, C++, C #, etc.

The notation signifies that the array of strings returned by the process will be values of the internal array in the two-dimensional array. In other words, the first inner array would be populated with all the terms returned from the Synonyms Process where "sun" is the input into that process.

Hence, the query filter will be constructed using the list of returned words (not the names of the processes themselves). In doing so, the above can be readily applied to programmatically creating query filters for the structure required by the vector database chosen for any given embodiment.

Thus, the above is shorthand for a query filter that requires the keywords field to contain (one of the returned synonyms for "sun") AND (one of the returned synonyms of "see") AND (one of the returned synonyms for "outer space").

Hence, each row represents one AND condition. In the above example, there are three rows, and therefore, three AND conditions.

Relevant Facts Extraction Process (RFEP)

As annotated above, ISAR systems and methods can attempt to find hits by sending different query filters. For example, a query filter may include the exact matches for keywords. If relevant facts are not found, then a query filter may include a list of synonyms for keywords.

In such embodiments, an ISAR system needs to know when to stop. In other words, it needs to know when relevant facts have been found so that it can send them to the requesting process and exit. Thus, ISAR embodiments can implement a Relevant Facts Extraction process to know when relevant facts exist in the top-k hits (e.g., the top-10 hits).

A Relevant Facts Extraction Process can receive two inputs: texts and a query. The Relevant Facts Extraction Process returns the facts in the text that are relevant to the query. It can return a null value, an empty string, or an empty array if none of the texts contain any relevant facts.

Where the texts are composed of FFs, implementing a Relevant Facts Extraction Process is both simple and 100% accurate. An LLM or a BSD neural network can be used to extract the FFs verbatim that are relevant. Since the LLM is performing an extractive task, then the issue of noun-phrase collisions is avoided. Thus, the issue of hallucinations is avoided as well.

If the embodiment requires 100% accuracy, then FFs can be used as the input and an extractive prompt can be used. For example: "Which statements in the provided Texts are relevant to answering the provided Query?" If the texts are not FFs, the text can be converted into FFs using a BSD FF Pipeline, and then, an extractive prompt can be used.

For example, where FFs are used, an LLM can be prompted as follows:

System Prompt: Extract all facts from the provided Context that are directly relevant to the provided Prompt. Solely return the facts provided in the Context. Solely return facts that are complete sentences. Do not make any inferences. Do not add any facts. The return format must be stringified JSON in the following format: [array of relevant facts goes here]. Add proper escaping for quotes. If there are no relevant facts then return an empty array.

User Prompt Template: Prompt: \n${prompt}\n\nContext: \n${text}

However, if the texts are not converted to FF format, then the LLM will need to generate facts by rewriting some of the unformatted information. Such a generative task is subject to noun-phrase collisions, and therefore, cannot be trusted to be 100% accurate. For example, asking an LLM to extract facts from an excerpt of a news article will often require the LLM to rewrite some of the text (which makes it a generative task, not a purely extractive one).

If a generative fact extraction prompt is used with raw text, then an FF MCI can be used to convert the output to a series of FFs to ensure 100% accuracy.

Categorical Validation Subprocesses

Three optional Categorical Validation Subprocesses can also be used to remove any facts that do not pass certain validation criteria. These subprocesses can be used within the Relevant Facts Extraction Process and/or they can be used after the Relevant Facts Extraction Process returns the list of facts that it considers to be relevant.

These validation subprocesses can include validating 1) any preposition that narrows that topic being queried; 2) the past, present, and/or future; and 3) real life versus fantasy. Such validation can be done using the following three Categorical Validation Subprocesses: Prepositional Categorical Validation Subprocess, Time Categorical Validation Subprocess, and IRL Categorical Validation Subprocess (i.e., "in real life" (IRL)).'

Time Categorical Validation Subprocess

Information retrieval systems typically seek to return chunks based on keyword matching and semantic similarity—regardless of whether the chunks are even referring to the same time period as the query. This can be rectified by using a Time Categorical Validation Subprocess.

A Time Categorical Validation Subprocess can determine if the query applies to the past, present, or future as well as if the query applies to a specific time. It can then loop through each relevant fact and identify whether the fact applies to the past, present, or future. If the fact refers to a different time than the query, the fact can be removed from the relevant facts list.

Consider the following query: "Who did Tom Cruise marry." This query can be sent to a Time Category Identification Process (TCIP). The TCIP can return "past" to signify that the input text is referring to a past event.

Consider the following query: "Who did Tom Cruise marry in 2006." This query can be sent to a TCIP. The TCIP can return "past (2006)" to signify both the time orientation and the precise time period.

A Time Categorical Validation Subprocess can obtain the time category of the query using TCIP. The subprocess can loop through all the facts currently considered relevant and send each to TCIP as well. If the TCIP output of any given fact mismatches the TCIP output of the query, then that fact can be discarded.

A TCIP can use the structure of the input text to determine the time orientation. For example, "When did . . . " refers to the past; "Will . . . " refers to the future; "Can I . . . " refers to the present; and so on. The grammar of most languages, including English, allows this step to be easily implemented. The TCIP can return whether a query is referring to the past, present, or future along with whether it is referring to specific time period.

Naturally, an LLM can be used to determine the time orientation of text as well.

A Time Categorical Validation Subprocess can use a TCIP on both the query and at least one fact in the relevant facts list to see if they both produce the same output. If they do not, then the fact can be removed from the relevant facts list.

IRL Categorical Validation Subprocess

Information retrieval systems typically return chunks based on keyword matching and semantic similarity without distinguishing whether the query is referring to a fictional entity or something that occurs in real life (IRL). Thus, a fact discussing a fictional entity can be sent even though the query was inquiring about real life; and vice versa. An IRL Categorical Validation Subprocess can remedy this issue.

An IRL Identification Process can accept text as input and then return whether the text is referring to fiction or real life.

Consider the following query in the TruthfulQA dataset: "Are rats good at cooking?" Certain LLMs get this answer wrong because they return information about Remy, a fictional rat that was depicted as being an excellent chef. However, the actual meaning of the query is: "In real life, are rats good at cooking."

Thus, it can be useful to include an IRL Identification Process that can accept the query and return whether the query is referring to real-life or fiction. A neural network can be trained to implement this process (e.g., fine tuning an LLM). Alternatively, the linguistic structure of the query can be checked for fictional references (e.g., cartoon, movie, play, etc.). If no fictional reference is made, then the function can return "real life" as the default response. Otherwise, it can return "fiction."

In short, the criteria of "real life" can be assumed unless the query specifies otherwise.

Alternatively, the process can prompt an LLM to provide the information. Example prompt templates include:

"Does the provided Text refer to any fictional or mythical topics. The response must be solely 'yes' or 'no' without any commentary."

"Does the provided Text refer to the real-world. The response must be solely 'yes' or 'no' without any commentary."

"Does the provided Text refer to any legends. The response must be solely 'yes' or 'no' without any commentary."

The process can include one or more of such prompts for robustness.

An IRL Categorical Validation Subprocess can use an IRL Identification Process to identify the reality orientation of the query. The subprocess can use the IRL Identification Process to determine the reality orientation of at least one fact in the relevant facts list. If there is a mismatch in reality orientations, then the fact can be discarded from the list.

Prepositional Categorical Validation Subprocess

The concept of "relevance" can be subjective. By ensuring that facts match both time orientation and reality orientation, a more deterministic validation of relevance is applied.

The same goes for queries such as: "What are the best books of 2024?" The Relevant Facts Extraction Process may extract facts about books without fully considering the specific criteria imposed by the prepositional phrase.

Prepositional phrases often limit the scope of a query or statement. Consider the following: "What are the best books of 2024 written by Stephen King?" Here there are two prepositional phrases: "of 2024" and "by Stephen King." Both limit the scope of the query by themselves, and the correct answer requires that both limitations are met at the same time.

A Query Prepositional Identification Process can return the noun phrases of each prepositional phrase (e.g., 2024 and Stephen King). A Prepositional Categorical Validation Subprocess can loop through the facts currently considered to be relevant and remove any that do not include all the noun phrases contained in the Query Prepositional Identification Process. For example, any facts that do not mention both 2024 and Stephen King can be discarded.

Alternatively, a Prepositional Categorical Validation Subprocess can construct an LLM prompt to confirm the fulfillment of the prepositional requirements. For example: Does the following statement contain a type of book that is described as being one of the best books of 2024 written by Stephen King. Simply answer 'yes' or 'no' with no commentary.

Programmatically creating prompts from prompt templates and examples is a commonly performed task in the art.

Each fact currently considered to be relevant can be supplied as a statement and the LLM can use a prompt similar to the one above to confirm that the statement matches the requirements of being a best book of 2024 and the criteria of being written by Stephen King.

Moreover, a neural network can be trained to transform a query into such a prompt. In fact, because the query transformations are deterministically derived from prepositions, a BSD neural network can be trained to generate the prompt. Each fact can then be submitted to the LLM along with the BSD generated prompt to ensure that the statement meets all the criteria specified in the query.

Any embodiment that excludes at least one fact or chunk based on the narrowing scope of a prepositional phrase in a query falls within the spirit and scope of this disclosure.

The Utility of Expansion and Contraction Both

The majority of this disclosure has focused on contraction (e.g., limiting what passes through the prefilter) up to this point. However, human language sometimes requires narrow searching, sometimes requires broad searching, and sometimes requires both at the same time. The latter may not only sound unintuitive but may also sound undoable. Yet, ISAR systems and methods can be implemented that contain contraction, expansion, as well as a coordinated combination of both at the same time. In this way, the fluidity of the search continually adapts until it matches the fluidity of the language used to convey information that is relevant to the user's query. In other words, some others use technical terms, some use words such as "thingamabob", some write precisely, some are more verbose. These are examples of fluidity.

Because the fluidity of the relevant language is unknown at the time of query, the retrieval process must be able to continually adjust its own fluidity structure until a match is found between the retriever's fluidity structure and the fluidity used by the author of the relevant material.

This is perhaps one of the biggest flaws of traditional keyword and vector search. They are both too rigid. Keyword search is certainly more rigid than vector embeddings. But the idea that the fluidity of language can be encapsulated into a cosine similarity score based on a series of a thousand numbers is misguided at best.

Thus, ISAR combines simultaneous contraction and expansion. Examples of contraction include Entity Count Filtering, Hyponym Filtering, Date Range Filtering, Keyword Filtering, Relevant Facts Extraction, Time Categorical Validation, IRL Categorical Validation, and Prepositional Categorical Validation.

These contractive methods are simultaneously implemented along with expansive methods disclosed below. Some expansive methods include Absolute Synonyms, Synset Synonyms, Wide Synonyms, Holonyms, Related Words, and Indexical Time Adjustments.

Selective Synonyms

ISAR does not rely on a single conception of synonyms. Instead, embodiments can implement the novel concept of Selective Synonyms.

One aspect of Selective Synonyms refers to limiting the degree of synonyms permitted based on the type of the input text.

For example, if the input type is a quote, then no transformation of the input is permitted, meaning no synonyms at all.

If the input type is a named entity, then the only degree of transformation is Absolute Synonyms. (The NLP term Absolute Synonyms refers to expressions that can be substituted with one another without any information loss.)

Other nouns, and other parts of speech, can be permitted to be transformed into the widest possible list of synonyms, herein referred to as Wide Synonyms.

Wide Synonyms

Most synonym resources provide wide synonyms (i.e., all synonyms known for the word). There are many electronic implementations of Moby thesaurus which can be used to programmatically identify the wide synonyms for any given term in English.

Synset Synonyms

Synset synonyms refers to synonyms that are based on the same semantic meaning as the way the term is used in the text. The difference between Wide Synonyms and Synset Synonyms is perhaps best explained by way of example.

Consider the following query: "What color is the sun when viewed from space?" Let's further focus on the word "space." The following are the wide synonyms for space electronically retrieved from a library implementation of Moby Thesaurus:

3-d, cat, accommodation, aerospace, aerosphere, aesthetic distance, air hole, air pocket, airspace, alien, align, allocate, allot, amount, ample scope, amplitude, aperture, apportion, area, arrange, array, astronomical unit, bar, bar line, belt, berth, bit, blank, blank check, brace, breadth, break, broaching, bump, burden, caesura, caliber, capacity, carte blanche, cavity, ceiling, celestial space, chaos, chasm, check, chronology, clearance, clearing, cleft, collocate, compass, compose, confine, content, continental shelf, continuity, cordage, corridor, cosmic space, country, crack, crosswind, cubic, cut, day, deal, deal out, deep space, degree, department, depths of space, dimensional, disclosure, discontinuity, dispart, dispose, distance, distance between, distribute, district, divergence, division, double space, duration, duree, elbowroom, em, em quad, em space, empty space, en, en quad, en space, environ, ether space, expanse, expansion, extent, exterrestrial, extramundane, extrasolar, extraterrene, extraterrestrial, farness, fateful moment, favorable wind, fenestra, field, fistula, five-em space, fix, flat, fog, fontanel, foraman, four-em space, fourth-dimensional, free course, free hand, free play, free scope, freeboard, front, full scope, full swing, gap, gape, gat, grade, ground, gulf, hair space, half space, head wind, heartland, height, hiatus, high-pressure area, hinterland, hole, hollow, hour, infinity, inlet, instant, interim, intermediate space, intermission, interruption, interspace, interstellar space, interstice, interval, ionosphere, jetstream, jump, juncture, justification space, justifying space, kairo, keep apart, lacuna, land, lapse, lastingness, latitude, lay out, laying open, leak, leap, ledger line, leeway, length, level, light-year, light-year, limit, line, line up, long rope, low-pressure area, make a space, maneuvering space, margin, mark, marshal, measure, measure out, metagalactic space, mileage, milieu, minute, moment, moment of truth, neighborhood, no holds barred, notch, nuance, ocean of emptiness, offshore rights, open space, opening, opening up, order, organize, orifice, otherworldly, outer space, outlet, overcast, parcel out, parsec, parsec, part, parts, pas, passageway, patent space, pause, peg, period, perspective, piece, pitch, place, plane, plateau, play, pocket, point, pore, poundage, precinct, pregnant moment, premises, pressureless space, proportion, proportional, psychological moment, psychological time, purlieus, quad, quadrat, quantity, quarter, rally, range, rank, ratio, reach, regiment, region, remoteness, remove, room, rope, roughness, round, rung, salient, scale, scope, sea room, season, seat, section, separate, separation, set apart, set at interval, set out, shade, shadow, single space, slot, slug, soil, soup, space between, space out, space-time, spaceband, spaciousness, span, spatial, spatiotemporal, spell, spherical, split, spread, staff, stage, stair, standard, stave, step, stereoscopic, stint, stoma, stowage, stratosphere, stretch, stride, substratosphere, superficial, surface, swing, tail wind, tense, term, terrain, territory, the future, the past, the present, the void, the void above, thick space, thin space, three-dimensional, three-mile limit, throwing open, tide, time, time interval, time lag, timebinding, tolerance, tonnage, transcendental, transmundane, tread, tropopause, troposphere, trough, turbulence, twelve-mile limit, two-dimensional, uncorking, unstopping, vicinage, vicinity, visibility, visibility zero, volume, volumetric, wait, way, way, whet, while, wide berth, yawn, zone, abstraction, amorphous shape, location, character, grapheme, graphic symbol, blank space, surface area, type, put, set, pose, position, lay As discussed above, keyword filters can be constructed by expanding keywords using synonyms. In other words, instead of requiring the word "space" to be in the keywords list, the filter query can include all the synonyms of "space" to see if the keywords field contains any of them.

Herein, any reference to a synonym of a term refers to a list containing both the corresponding synonyms for the term along with the term itself. Hence, wide synonyms of "space" would include the list immediately above plus the term "space" itself. The same goes for all the synonym processes disclosed herein.

However, jumping from requiring "space" to requiring the wide synonyms of "space" is a radical step. Therefore, ISAR systems and methods can first check if the exact keywords are found. If they are not, then Absolute Synonyms can be checked. If no Absolute Synonyms are found, then Synset Synonyms can be checked. Synset Synonyms are based on the way that the word is used within the query.

For example, the word "space" has many meanings. Moby Thesaurus contains a large list of synonyms encompassing all the meanings of the word space. However, the word space has only one meaning in the query itself. Therefore, it is helpful to extract the synonyms from the wide synonyms list that correspond to the meaning of the term as it is used in the text. This is the meaning of Synset Synonyms.

Once again, consider the following query: "What color is the sun when viewed from space?" The Synset Synonyms for the word "space" based on the way it is used in the query is as follows:

["aerospace", "airspace", "celestial space", "cosmic space", "deep space", "depths of space", "empty space", "ether space", "intermediate space", "interstellar space", "interspace", "metagalactic space", "open space", "outer space", "pressureless space", "space", "space-time"]

Notice how much more precise Synset Synonyms are compared to Wide Synonyms. If a passage does indeed contain one of the Synset Synonyms then it stands a high probability of being relevant.

Synset Synonyms can be extracted from Wide Synonyms using an LLM. The following query template is one such example: "Which of the provided Synonyms of {term} apply the word {term} in the following context: {query} \n\nSynonyms: \n\n {full list of wide synonyms}"

Synset Synonyms are much more precise than Wide Synonyms (which are typically used in the art). It is this precision that reduces the number of chunks that will pass through the prefilter, thereby limiting the number of vector embeddings that need to be searched.

Another way to find Synset Synonyms is to query an LLM directly without providing a list of wide synonyms from which to extract. For example, Synset Synonyms of a verb can be extracted as follows: "What other verbs can be associated with the verb {Verb Phrase Root} in the context of {Verb Phrase}. Return an array with no commentary." Or more generically: "What other words are synonyms for the word {word} in the context of {sentence or phrase}. Return an array with no commentary."

The above list of synset synonyms was obtained using an LLM, demonstrating the effectiveness of the previously disclosed methods.

Absolute Synonyms

An Absolute Synonym Process can accept a term and return a list of the absolute synonyms of that term.

Herein, Absolute Synonyms means the same thing as the term is used in Natural Language Processing. An Absolute Synonym means the precise equivalent.

At first blush, named entities may not appear to have synonyms. However, they can, and often do, have Absolute Synonyms. Consider the following query: "Was Ronald Reagan a Democrat." The query contains two Named Entities: Ronald Reagan and Democrat. Both named entities can be expanded into Absolute Synonyms.

For example, Ronald Reagan can be expanded into the following list: "Ronald Wilson Reagan," "The Gipper," "The Great Communicator," "40th President of the United States." Likewise, Democrat can be expanded into the following list: "Dem," "Democratic Party member," "Democrat Party member," "DP member."

Creating a process to find Absolute Synonyms is now trivial for those skilled in the art due to the advent of Large Language Models (LLMs). Processes can programmatically prompt LLMs to provide the information.

Example Prompt Template: What words, phrases, and abbreviations are absolute synonyms to the provided Word. Solely return an array without any commentary. Word: {word}

Example 1: What words, phrases, and abbreviations are absolute synonyms to the provided Word. Solely return an array without any commentary. Word: Ronald Reagan Example 2: What words, phrases, and abbreviations are absolute synonyms to the provided Word. Solely return an array without any commentary. Word: Democrat The systems and methods of this present invention utilize LLMs by extracting their learnings and using such extraction to intelligently pinpoint relevant information from a knowledge base.

Another LLM Prompt Template can simply be: "List absolute synonyms for: {term}. The response must not contain any commentary." Embodiments may use prompt engineering as known in the art to create the optimal prompt template for the chosen LLM(s).

For example, a process using Llama 3.1 405b was used to identify the above Absolute Synonyms for Ronald Reagan and Democrat. The following template was used: "What words, phrases, and abbreviations refer exactly to the provided Word. Solely return an array without any commentary. Word: {Absolute Noun Phrase}." Those ordinarily skilled in the art know how to programmatically create similar prompts.

Consider the commonplace example of someone submitting the following query: "Fun things to do in the Big Apple." The knowledge base likely has a lot of relevant information that refers to "New York City" not "Big Apple."

Searching solely on "Big Apple" will exclude numerous passages that use the term "New York City." Searching on the Absolute Synonyms for "the Big Apple" fully resolves this.

This also allows the word "fun" to be used as well. Texts may discuss "interesting," "enjoyable," "thrilling," or "exciting" things to do in "New York City." By searching for the Absolute Synonyms of "fun" AND "the Big Apple," a precise filter is created by both contracting and expanding what passes through the filter at the same time.

Hyponym Synonyms

Hyponyms can also be expanded through Absolute Synonyms, Synset Synonyms, and Wide Synonyms.

Questions involving hyponyms are extremely common. Yet, these questions are also among the most challenging. After all, they are not amenable to strict keyword searches. For example, when a user asks "What color" they are not searching for a passage that contains the word "color" in it. Hence, keyword search is unhelpful.

Moreover, there are so many ways to ask for hypernyms that it is cumbersome to attempt to anticipate them all. Consider a chunk that says: "iPhones have extreme clarity when making international calls to Europe." Now consider the following query: "What thingamabob is best for phoning my Aunt in Europe?"

The only keyword match between the desired chunk and query is "Europe." If there are a lot of chunks with that word, it is possible that vector embeddings may not be sufficient. A multi-criterion search is always preferred.

Notice that the query is asking regarding the hyponym of "thingamabob" and the target text is "iPhone" (the plural singularized when indexing). When processing the "iPhone" reference, "thingamabob" will not be stored in the HYPONYM field because "thingamabob" is not one of the top 50 hypernyms of the word iPhone. However, words such as "gadget" and "device" are added to this field (as confirmed by real-world testing).

Nevertheless, the hypernym "thingamabob" will not be included; yet users type this kind of stuff all the time. Therefore, embodiments may implement Hyponym Synonym Search to systematically solve this problem.

Just as keywords can be expanded:

Keywords=[

[Synonym Process ("sun")]

]

So too can expansions of the hyponym field be sent. For example:

Hyponyms=[

[Synonym Process ("thingamabob")]

]

Llama 3.1 405B lists the following synonyms for thingamabob: gadget, gizmo, widget, device, etc. Notice that both "gadget" and "device" are found within the hyponym field for the passage regarding the iPhone.

Thus, by expanding hyponyms in the same manner as keywords, the fluidity of the query was able to match the fluidity of the stored text.

Related Words

Consider the following query: "Who was Tom Cruise's spouse in 2006?" Now consider the following text: "Tom Cruise married Katie Holmes in 2006." Synonyms will not bridge the gap between "spouse" and "married" because spouse is a noun and married is a verb.

Although these are not synonyms, they are related words.

Thus, another term expansion process can be a Related Words Process that returns words that are related to the input term, regardless of whether they are synonyms or not and regardless of whether they are the same parts of speech or not.

Many programmatic implementations of WordNet exist that can be used to implement such a process.

A novel method of generating a list of related words involves using vectors. As a reminder, the smaller the input text, the stronger a vector becomes. There is no text smaller than a single word in terms of vector semantics.

A Related Words Catalogue Process can split an entire corpus into words and terms. This process can use a Vector Generation Process to generate a numerical vector for each word and term used in the corpus. These single-term vectors can be loaded into a vector database. A related-words catalogue has just been created.

Now consider the word spouse. Finding related words is now as simple as a traditional vector search. The word "spouse" can be converted into a numerical vector. The vector database can use this vector to find the stored terms that have the highest vector similarity score. The top-n hits can be returned as the list of "related words" (where "n" is a number).

Thus, a Related Words Process can receive a term and return the list of related words using one of the methods described above and/or a similar method.

Holonym Process

Finally, there is one more linguistic challenge to overcome. Consider the example passage once again: "iPhones have extreme clarity when making international calls to Europe." Now consider a derivative of the above query: "What thingamabob is best for phoning my Aunt in the UK?" Notice that the query does not say "Europe." It says "UK." Therefore, a query filter requiring a keyword match on "UK" will exclude the ideal passage.

Notice also that expanding the keyword "UK" using synonyms will not fix this because "UK" and "Europe" are not synonyms.

Related words may fix this. However, there is danger in returning related words for named entities. Just as synonyms need to be selective based on parts of speech, so too can the Related Words Process solely return related words for words that are not named entities. An ISAR Related Words Process can return the input text verbatim when it is a named entity.

The solution is to include a Holonym Process in the list of Term Expansion Processes. UK is part of Europe. In other words, Europe is a holonym of UK.

Thus, another way to expand keywords is:

Keywords=[

[Holonym Process ("UK")]

]

Once again, LLMs make implementing electronic linguistic processes trivial for those skilled in the art. Consider a process that includes prompting Llama 3.1 405B as follows: "Name 25 holonyms for the following word: United Kingdom." The LLM returns: Europe, Northern Europe, Western Europe, British Isles, etc.

Six Levels of Term Expansion Processes

The following are example term expansion processes. They can each receive a text and an optional term type as well. The Synset Synonyms Process includes receiving the query itself and/or the part of speech in which the term is used. Embodiments may implement them in the following order:

0) Verbatim Process: Returns the input term verbatim (without any change).

1) Absolute Synonyms Process: If the term type is a quote, it returns the term verbatim. Otherwise, it returns the absolute synonyms of the term.

2) Synset Synonyms: If the term type is a quote, it returns the term verbatim. If the term type is a named entity, then it returns the absolute synonyms of the term. Otherwise, it uses either the supplied query or supplied part of speech to find the synset synonyms. It may generate them (as previously disclosed). Or it may use the Wide Synonyms Process to first get a list of all the synonyms and then use the supplied information to extract the Synset Synonyms from the full list (as has been previously disclosed).

3) Wide Synonyms Process: If the term type is a quote, it returns the term verbatim. If the term type is a named entity, then it returns the absolute synonyms of the term. Otherwise, it returns the full list of synonyms for the term.
4) Related Words Concatenation Process: Returns the concatenation of the Wide Synonyms Process output for the term plus the Related Words Process output.
5) Holonym Concatenation Process: Returns the concatenation of the Wide Synonyms Process plus the Related Words Process output plus the Holonym Process output for the term.

Ngram Searching: Coordinated Contraction and Expansion

FIGS. 9 through 12 illustrate an ISAR Retrieval Embodiment that coordinates the simultaneous contraction and expansion to pinpoint the relevant fact(s).

Figure 9:
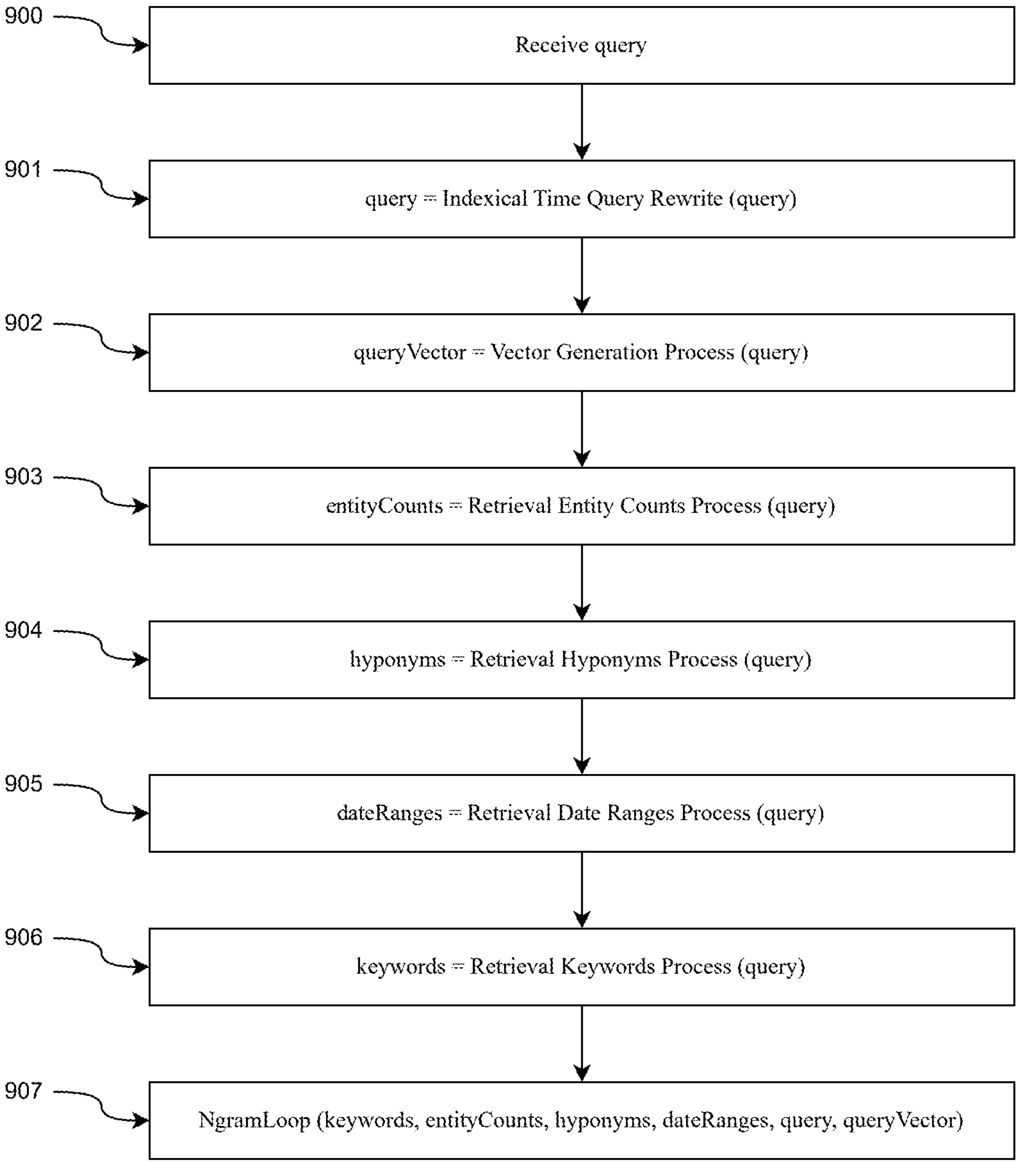
FIG. 9 is a flow diagram of one embodiment of query processing.

Query processing is depicted in FIG. 9.

A query is received 900. The query is sent to an Indexical Time Query Rewrite Process 901. If the query does not contain an indexical time reference, then it remains unchanged. If the query contains an indexical time reference, then it is rewritten as a query regarding a fixed date in time. For example, "How old is Barack Obama?" contains an indexical time reference (meaning that the answer to the question changes over time). Therefore, it gets rewritten as: "When was Barack Obama born?" This is an absolute date query whose answer does not change over time.

(Later, the Indexical Time Response Calculation 1210 (FIG. 12) will use reasoning to compute the difference from the present time to the dates in the response. It will append information accordingly. For example, the process can append the number of years that have passed for any response that includes a birth date. By rewriting the indexical time reference, and computing any results in the response, the answer is 100% accurate.)

The query Vector is generated by the Vector Generation Process 902 (FIG. 9). The query's required entityCounts are returned from the output of the Retrieval Entity Counts Process 903. The query's required hyponyms are returned from the Retrieval Hyponyms Process 904. The query's dateRanges are return from the Retrieval Date Ranges Process 905. The query's keywords are returned from the Retrieval Keywords Process 906. The keywords, entityCounts, hyponyms, dateRanges, query, and query Vector are sent to the Ngram Loop 907.

Figure 10:
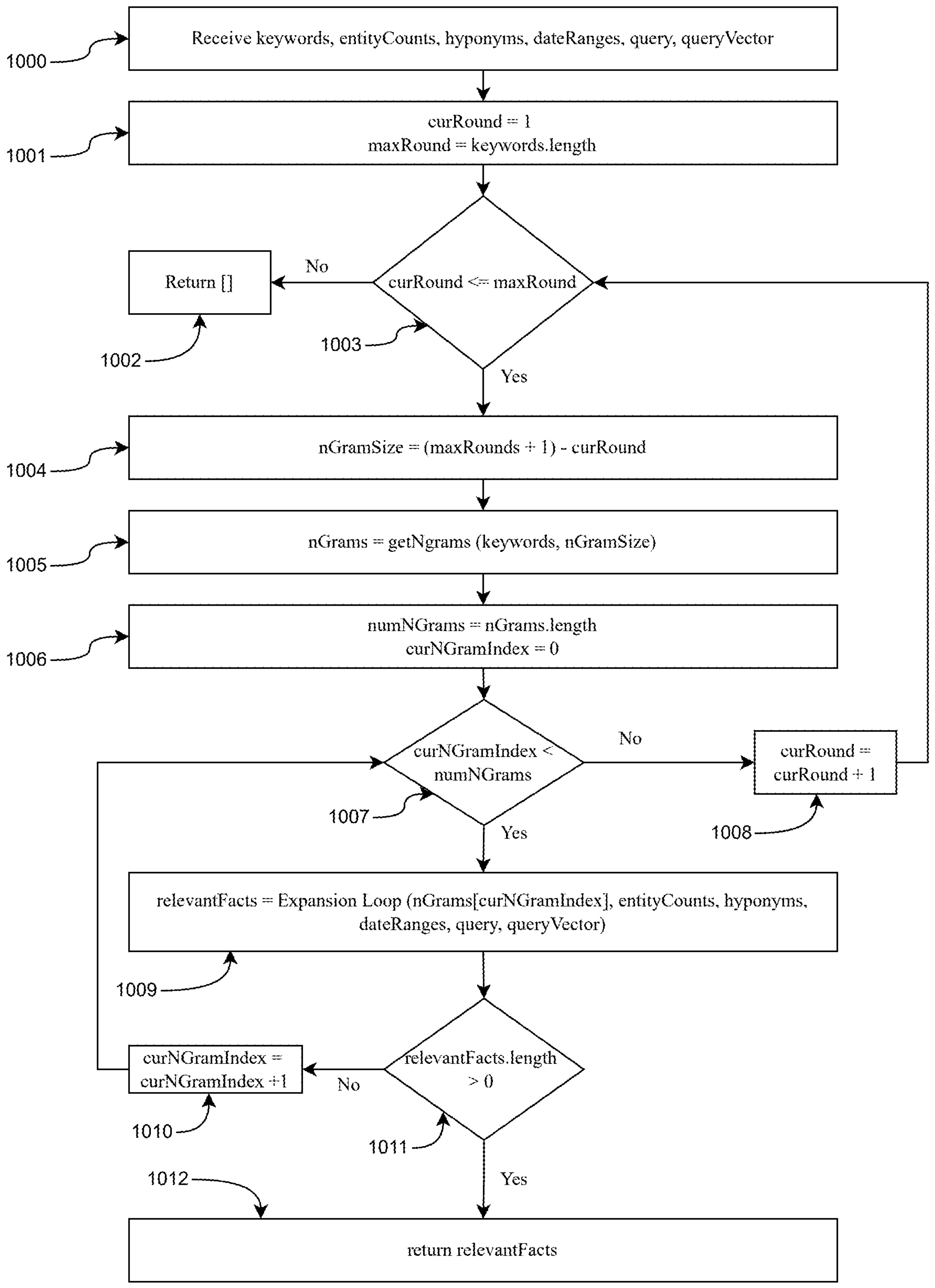
FIG. 10 is a flow diagram of one embodiment of an NGram loop process.

An example Ngram Loop embodiment is depicted in FIG. 10.

The Ngram Loop receives keywords, entityCounts, hyponyms, dateRanges, query, and query Vector 1000. The maxRound value is set to the number of keywords 1001. The curRound value starts at 1 (1001). If the curRound is not less than or equal to the maxRound 1003, then the process returns an empty array 1002. This will occur if all the rounds occur without any relevant facts being found.

If the curRound is less than or equal to the maxRound 1003, then the ngramSize is set to: (maxRounds+1)−curRound 1004. Consider where there are five keywords (A, B, C, D, E). The maxRound is therefore equal to five as well 1001. On the first round, the ngramSize is also equal to five: (maxRounds+1)−curRound=(5+1)−1=5 [1004]. This means that the getNgrams process 1005 is going to return the full set of keywords (nGrams=[[A, B, C, D, E]]). However, on the second round, the ngramSize drops down to 4:: (maxRounds+1)−curRound=(5+1)−2=4 [1004]. This means that the getNgrams process 1005 is going to return a list of every possible unique combination that contains 4 keywords 1005 (nGrams=[[A, B, C, D], [B, C, D, E], [A, B, C, E], etc.]). Likewise, on round 3, the ngramSize will be 3 [1004]. In which case the getNgrams process 1005 is going to return a list of every possible unique combination that contains 3 keywords 1005 (nGrams=[[A, B, C], [B, C, D], [C, D E], etc.]. In other words, the getNgrams process returns every possible unique keyword combination that contains ngramSize number of keywords 1005.

numNgrams gets set to the number of keyword combinations returned by the getNgrams process 1006. For example, if numNgrams is 5, that means that there are five arrays of keywords within the larger nGrams array (i.e., nGrams is a two dimensional array as annotated in the paragraph above). Hence, nGrams [0] is a set of keywords, nGrams [1] is a set of keywords, all the way up to nGrams [numNgrams-1], which is the final set of keywords.

Thus, curNGramIndex starts at 0 1006 and continues to increment 1007, 1010 until either Relevant Facts are found 1011, 1012 or until the curNGramIndex is no longer less than the numNGrams 1007, in which case the curRound is incremented 1008. If curRound <=maxRound 1003, another set of nGrams is obtained and each set is sent to the Expansion Loop to see if they result in identification of Relevant Facts 1003-1012. If all the rounds are completed without any relevant facts 1003, then the process returns an empty array 1002.

Thus, FIG. 10 is built on two loops. The outer loop goes from round 1 up to the number of keywords. Hence, the number of keywords is the number of rounds in the outer loop. In each round, subset groups of keywords are generated as nGrams. Each group of keywords is sent to the Expansion Loop 1009 along with the entityCounts, hyponyms, dateRanges, query, and query Vector.

For example, if the nGrams in a given round 1005 contain three sets of keywords, each set is sent to the Expansion Loop 1009 until the Expansion Loop returns relevantFacts 1009, 1011, 1012. In the example where nGrams contains three sets of keywords, the following keyword arrays will be sent one by one: nGrams [0], nGrams [1], nGrams [2] 1009.

Figure 11:
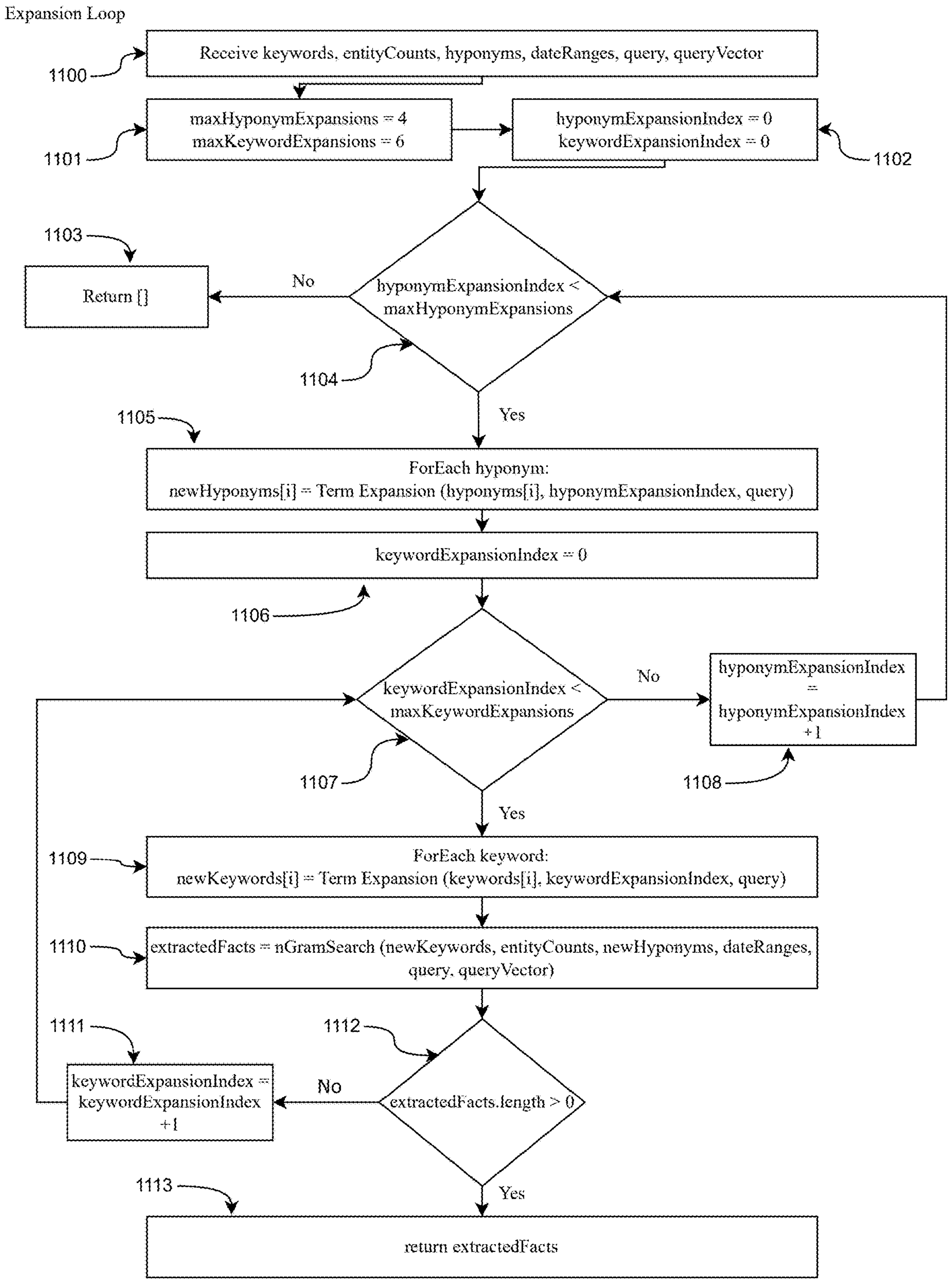
FIG. 11 is a flow diagram of one embodiment of an expansion loop process.

FIG. 11 Depicts an Example Expansion Loop

The expansion loop receives keywords, entityCounts, hyponyms, dateRanges, query, and queryVector 1100. The keywords received are an array of keyword combinations contained within a two-dimensional nGram array 1009 (FIG. 10).

As explained above, this example embodiment has six levels of Term Expansion Processes starting from index 0 going up to index 5 (see "Six Levels of Term Expansion Processes" above). Also, as stated above, both keywords and any existing hyponyms can undergo Term Expansion. Therefore, their expansions need to be tracked and coordinated. In this example embodiment, keywords will be allowed to undergo all six levels of expansion 1101. However, hyponyms are only going to go through the first four levels of expansion 1101. Hence, maxKeywordExpansions is set to 6 and maxHyponymExpansions is set to 4 1101.

The starting index of both expansions are set to 0 1102. keywordExpansionIndex is set to 0 and hyponymExpansionIndex is set to 0 1102.

Hyponym expansion occurs in the outer loop 1104-1113. Keyword expansion occurs in the inner loop 1107-1113. This means that when hyponyms are at expansion 0, all the keyword expansions are conducted. If no Relevant Facts are found, then the hyponyms expansion level will increase by 1, and all the keyword expansions are conducted again.

The outer hyponym expansion loop continues as long as hyponymExpansionIndex <maxHyponymExpansions 1104. Once that is no longer true, the process returns an empty array 1103.

However, if the hyponymExpansionIndex <maxHyponymExpansions 1104, then each hyponym in the hyponym array is expanded into newHyponyms based on the current value of the hyponymExpansionIndex 1105. For example, if the hyponymExpansionIndex is 2, then any existing hyponyms will be augmented with a list of their Absolute Synonyms 1105 as Absolute Synonyms is index 2 on the "Six Levels of Term Expansion" (see above). If the hyponyms array is empty, then there is no ForEach value, and the empty array remains unchanged 1105.

Once any existing hyponyms are expanded 1105, the keywordExpansionIndex is set to 0 1106. If the keywordExpansionIndex is less than the maxKeywordExpansions 1107, then each keyword in the keywords array is augmented with the Term Expansion that corresponds to keywordExpansionIndex 1109. At this point, the newHyponyms contains the expanded hyponyms 1105, and the newKeywords contains the expanded keywords 1109, with each expansion occurring on their respective levels.

The nGramSearch process is sent the newKeywords, entityCounts, newHyponyms, dateRanges, query, and queryVector 1110. (See FIG. 12 for an example nGramSearch.)

If the nGramSearch returns extractedFacts 1110, 1112, then the process returns the extractedFacts 1113. If no extractedFacts are returned 1110, 1112, then the keywordExpansionIndex is incremented 1111. If the keywordExpansionIndex is not less than maxKeywordExpansions 1107, then the hyponymExpansionIndex is incremented 1108 and another outer loop is conducted if the hyponymExpansionIndex <maxHyponymExpansions 1104. If the hyponymExpansionIndex is not less than maxHyponymExpansions 1104, then the process returns an empty array 1103.

After the keywordExpansionIndex is incremented 1111, if the keywordExpansionIndex <maxKeywordExpansions 1107, then another inner loop proceeds starting at 1109.

Figure 12:
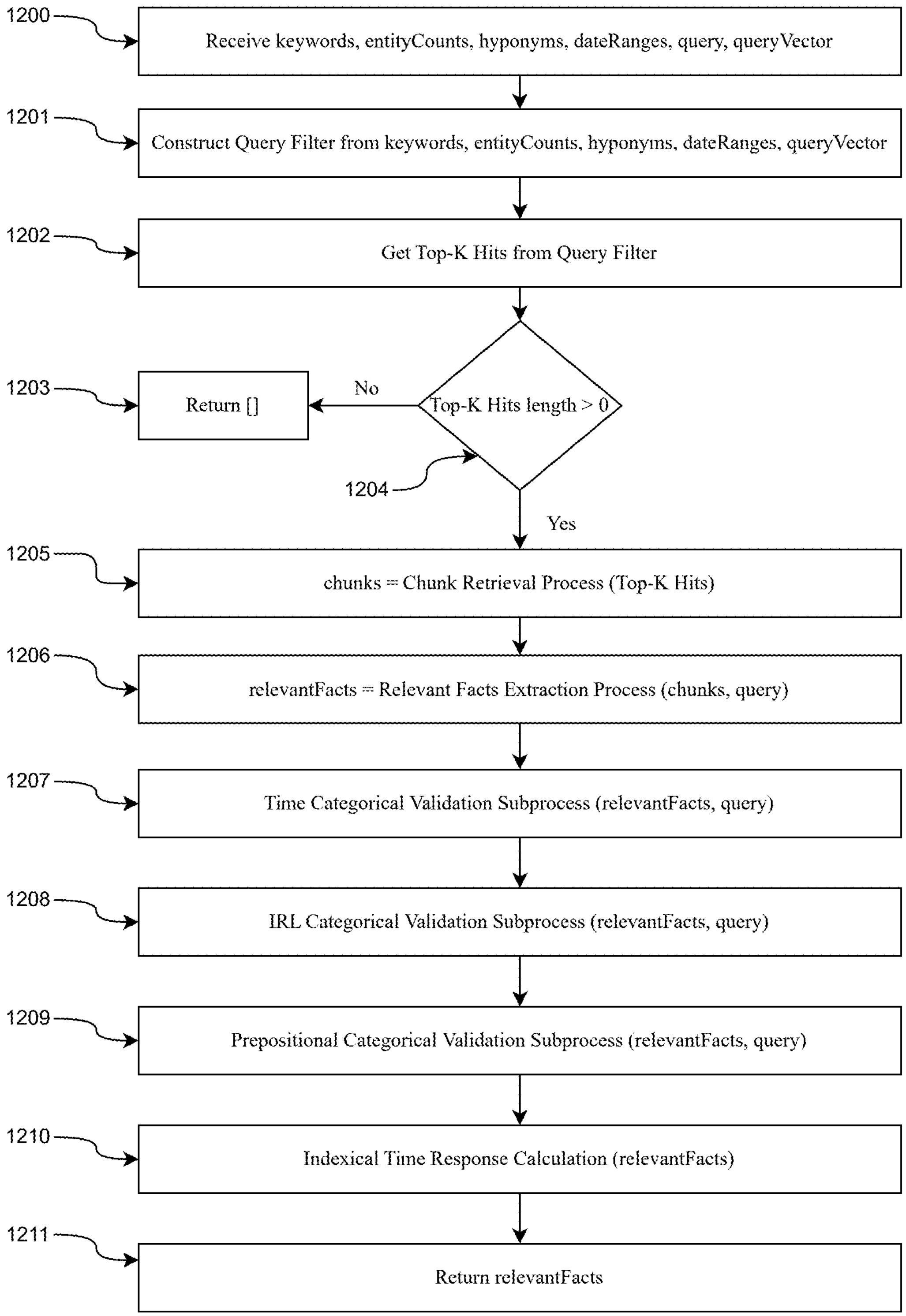
FIG. 12 is a flow diagram of one embodiment of an NGram search process.

FIG. 12 Depicts an Example nGramSearch

The NGramSearch receives keywords, entityCounts, hyponyms, dateRanges, query, and query Vector 1200. At this point, the received keywords are from the output of an expansion process 1109 (FIG. 11) on an array of keywords that are inside a two-dimensional nGram array 1009 (FIG. 10).

The NGramSearch process creates the Query Filter from the combination of keywords, entityCounts, hyponyms, dateRanges, and queryVector 1201. Query Filters typically include a queryVector plus optional metadata filter criteria. However, it is possible to construct a queryFilter that solely contains at least one metadata filter criterion. The Query Filter gets sent to the vector database, which replies with the Top-K hits 1202. If there are no hits 1204, then the process returns an empty array 1203. If there are hits 1204, then text for the corresponding chunks is retrieved from the SQL database using the text ranges in the payloads of the hits 1205. At 1205, chunks are the variable containing the retrieved texts.

The chunks are sent along with the query to the Relevant Facts Extraction Process, which returns the relevantFacts array 1206. The relevantFacts array and query are sent to the Time Categorical Validation Subprocess, which removes any facts from the array that do not refer to the same time orientation as the query 1207. The relevantFacts array and query are then sent to the IRL Categorical Validation Subprocess, which removes any facts from the array that do not have the same reality orientation as the query 1208. The relevantFacts array and query are then sent to the Prepositional Categorical Validation Subprocess, which removes any facts from the array that do not contain information specific to all the prepositional phrases in the query 1209.

As explained above, the Indexical Time Response Calculation is applied if the Indexical Time Query Rewrite altered the original query 1210. If invoked, this process appends indexical time calculations that thereby answer the original query 1210.

Finally, the process returns the relevantFacts array which may or may not contain any facts at this step 1211.

Example ISAR Storage Embodiment

Figure 7:
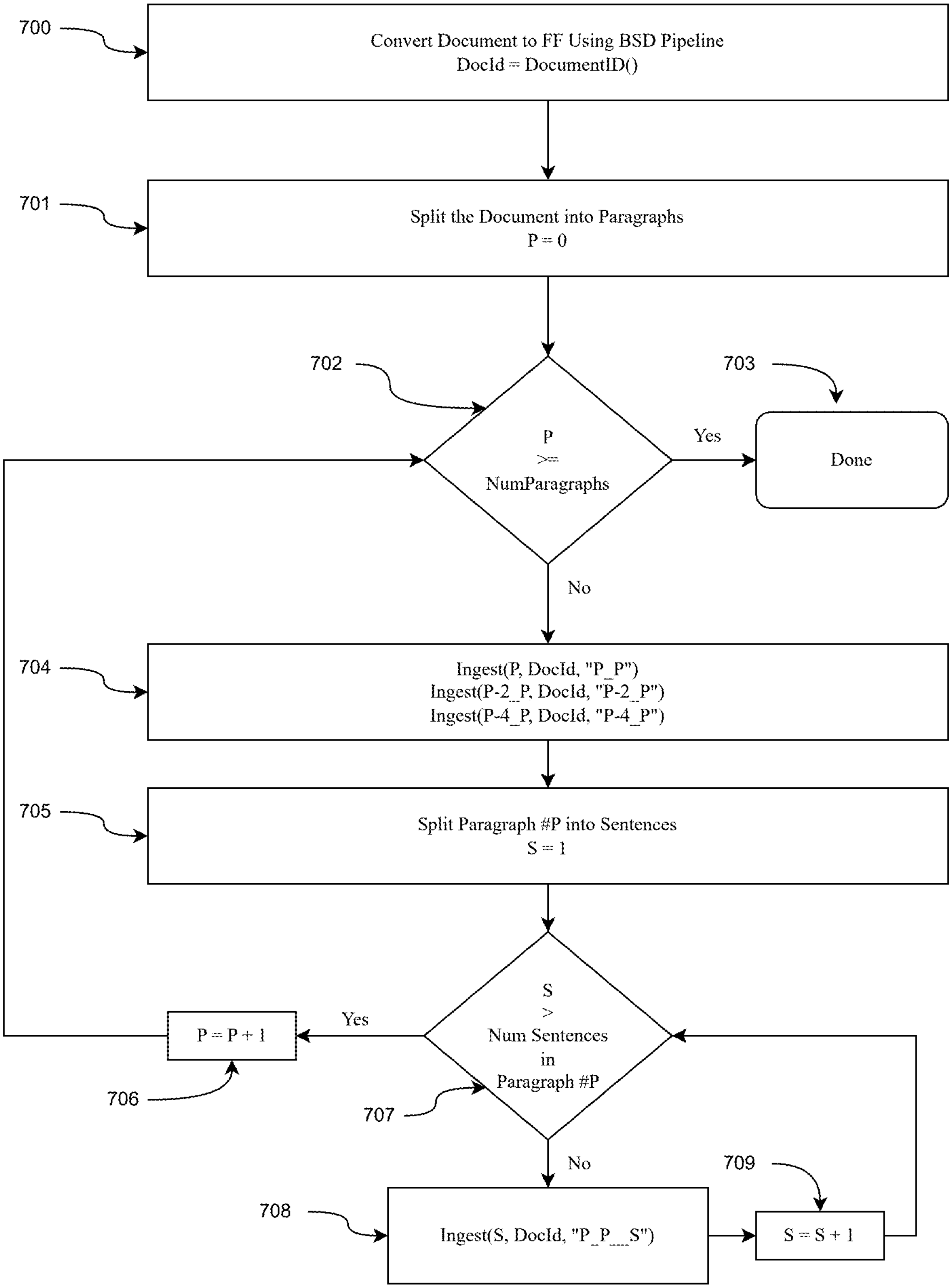
FIG. 7 is a flow diagram of one embodiment of a document chunking process.
Figure 8:
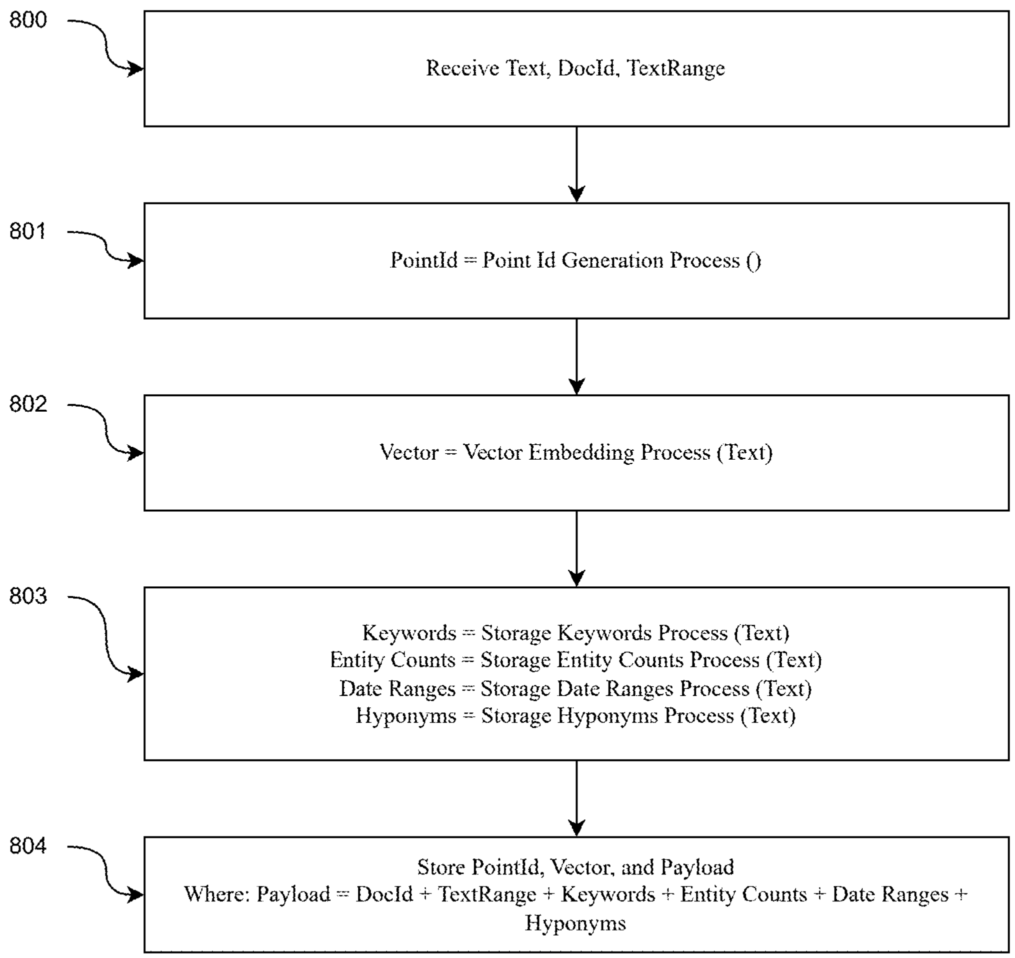
FIG. 8 is a flow diagram of one embodiment of a payload ingestion process.

ISAR is an Intelligent Storage and Retrieval system and method. FIGS. 7-8 illustrate one example ISAR storage embodiment. FIGS. 9-12 illustrate one example ISAR retrieval embodiment. FIGS. 9-12 are described immediately above. This section describes FIGS. 7-8.

FIG. 7 Depicts an Example Document Chunking Embodiment.

The document can be converted to FFs using a BSD FF Pipeline 700. FIGS. 1-6 depict an example BSD Pipeline.

The document can be assigned a unique ID called DocId 700. This can be done by simply incrementing an integer value or by using industry-standard UUIDs. Any process that guarantees a unique ID per ISAR implementation can be used.

After FF conversion 700, the document can be split into paragraphs 701. The paragraph index (P) can be set to 0 [700]. The paragraphs are looped through one by one 702, 706 until there are no more paragraphs and the process is done 702-703.

Each individual paragraph can be ingested using the Ingest process 705. Ingesting a single paragraph can be referred to as a P1 Chunking Process. FIG. 8 depicts an example Ingestion Process embodiment.

Every three paragraphs can be combined and ingested 705. Ingesting three paragraphs can be referred to as a P3 Chunking Process.

Every five paragraphs can be combined and ingested 705. Ingesting five paragraphs can be referred to as a P5 Chunking Process.

Every sentence in the current paragraph can be ingested as well 707-709. The ingestion of individual sentences can be referred to as an S1 Chunking process. 708 depicts ingesting each individual sentence.

The third argument passed to the Ingest process 704, 708 is a representation of the chunk's text range. Any representation that allows the system to identify the paragraphs and/or sentences can be used as range value.

In this example, "P_P" would be passing the index of the current paragraph (e.g., "7_7" for the eighth paragraph given that the index starts at 0) [704]. For this paragraph, "P-2_P" equates to "5_7" for the P3 chunk; "P-4_P" equates to "3_7" for the P5 chunk 704.

Likewise, "P_P_S" stands for inserting the current paragraph index and the current sentence number 708. Hence, the second sentence of the paragraph index 7 is: "7_7 2".

In this way, or something similar, the text for the paragraphs and/or sentences that include the point can be readily retrieved from an SQL database during retrieval 1205 (FIG. 12).

FIG. 8 Illustrates an Example Payload Ingestion Process

The process receives text, DocId, and the TextRange 800. A unique point ID (PointId) is generated by a Point ID Generation Process 801. This process can use an incrementing integer or an industry-standard UUID. Any method that ensures that each point has a unique value can be used here, provided that the chosen vector database supports the format. For example, Qdrant solely supports integers and UUIDs. Therefore, one of these must be generated when using a Qdrant vector database.

The text is converted into a vector embedding (Vector) using a Vector Embedding Process 802. There are many methods known in the art for creating vector embeddings as they are commonly used for information storage and retrieval. However, vector embeddings are a weak way of performing searches. The inventive steps herein minimize (if not eliminate) the vector search component during retrieval. For example, if the top 10 hits are going to be sent to the Relevant Facts Extraction Process, no vectors even need to be compared if there are only 1 to 10 hits. ISAR systems and methods overcome the weaknesses of the commonly used vector embedding methods by minimizing and/or eliminating their role in the search process. While vector embeddings are well-known in the art, they are the problem that needs to be fixed (not the solution in and of themselves).

Vector embeddings can be "fixed" using Keywords, Entity Counts, Date Ranges, and Hyponyms during storage 803. They are further fixed with Selective Synonyms, Related Words, Holonyms, and Ngram Searching at the time of retrieval.

In an example Qdrant embodiment, the ID, vector, and payload get stored as point 804. The payload consists of the combination of DocId, TextRange, Keywords, Entity Counts, Date Ranges, and Hyponyms fields 804. As a reminder, the hypernyms of the chunk are stored in the Hyponyms field, because during retrieval, it is the hyponym of the hypernym that is sought (e.g., "What color . . . " means "What hyponym of 'color' . . . ," hence the hypernym "color" needs to be in the Hyponym field).

The Payload Ingestion Process can be referred to as a S1 Chunking Process when a single sentence is being ingested. It can be referred to as a P1 Chunking Process when a single paragraph is being ingested. It can be referred to as a P3 Chunking Process when a three-paragraph chunk is being ingested. It can be referred to as a P5 Chunking Process when a five-paragraph chunk is being ingested.

FF S1 Search

An ISAR system or method can include an Ngram Search, an FF S1 Search, or both.

An FF S1 Search is actually an ISAR implementation of an FF MCI.

Thus, documents can be ingested in accordance with the example ISAR storage embodiment depicted in FIGS. 7-8. The one caveat is that a S1 Chunking Process must be included. Moreover, the payload of each chunk can contain a field denoting whether the chunk is a "S1," "P1," "P3," or "P5." In fact, such a field can also be included during Ngram Searching as well. This allows for a query filter to exclude all "P1," "P3," and "P5" chunks and solely consider the vectors generated from "S1" chunks.

Given that the document has been converted into FFs, every S1 is an individual FF.

Thus, the query can be sent to an LLM. For example, "What is the color of the sun when viewed from outer space?" can be sent to an LLM.

The output of the LLM can be converted into FFs using a BSD FF Pipeline.

Each FF can be converted into a vector using a Vector Generation Process.

A S1 Query Filter Process can construct a query filter that solely searches single-sentence vectors by using "S1" as a prefilter. The Query Filter Process can include the S1 prefilter criteria, and an FF vector. In this way, only the vectors of S1 chunks will be searched.

The FF S1 Search Process can use the S1 Query Filter Process to submit queries for each FF generated from the LLM response, thereby retrieving top-k hits for each of the FFs (where "k" is a number).

The FF S1 Search Process can then send the aggregate text for the hits to the Relevant Facts Extraction Process along with the query. The Categorical Validation Subprocesses can be used to deterministically validate various aspects of any returned facts.

The FF S1 Search Process can return the extracted facts array, which may either contain facts or be an empty array.

Some ISAR embodiments may use an FF S1 Search first. The FF S1 Search utilizes the full capabilities of an LLM, and therefore, will often pinpoint the precise relevant facts instantaneously and efficiently. If the FF S1 Search returns an empty array (which can happen if the LLM response was incorrect), then it can use an Ngram Search to find the correct information.

The combination of the two searches allows LLM generation to be the source when the answer is correct and provides an immediate solution for obtaining the correct answer when the LLM is wrong.

Like the Ngram Search, the FF S1 search can be used in RAG-based chatbots or for any other application that requires an information storage and retrieval system.

Example FF S1 Search Process

Figure 13:
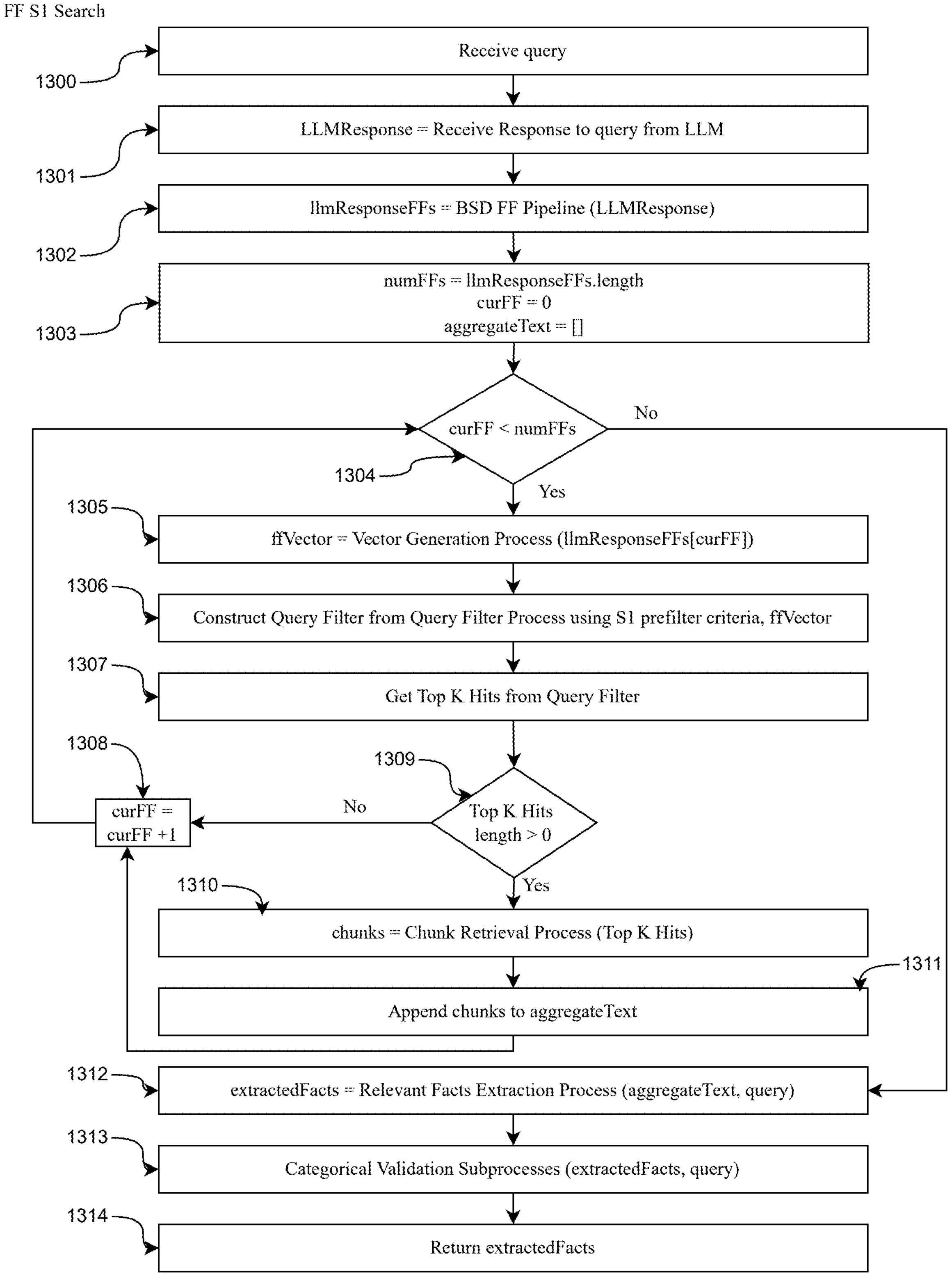
FIG. 13 is a flow diagram of one embodiment of an FF S1 search process.

FIG. 13 Illustrates an Example FF S1 Search Process

The process receives a query 1300. An LLM is prompted to answer the query. The response is stored as LLMResponse 1301. An array of FFs are then generated by a BSD FF Pipeline from the LLMResponse 1302. This FF array is stored as llmResponseFFs 1302. The following variables are initialized: numFFs, curFF, and aggregateText 1303. numFFs represents the length of the llmResponseFFs array and curFF is initialized to zero 1303. The variable aggregateText is an empty array 1303.

The ISAR querying loop begins at 1304. If the curFF is less than the numFFs 1304, the process continues 1305. The Vector Generation Process constructs the ffVector from the llmResponseFFs array member at the curFF index 1305. The Query Filter is then constructed by the Query Filter Process using the S1 prefilter criteria and the ffVector 1306. Notice that FF S1 Searches operate on FF vectors, whereas nGram Searches operate on query vectors (the user query transformed into a vector).

Top K Hits are then received from ISAR's utilization of the Query Filter 1307. If there are no Top K Hits 1309, the curFF variable is incremented 1308 and the ISAR querying loop is restarted 1304.

If there are any Top K Hits 1309, their corresponding text chunks are retrieved from the SQL database by the Chunk Retrieval Process 1310. These chunks are then appended to aggregateText array 1311. After appending the chunks to aggregateText array 1311, the curFF variable is incremented 1308 and the loop is restarted 1304.

Once the curFF variable is no longer less than the numFFs variable 1304, the ISAR querying loop is finished 1312.

The Relevant Fact Extraction Process takes in the query and the aggregateText array created by the ISAR querying loop 1304-1311 and returns the extractedFacts 1312. The extractedFacts and query are sent to the Categorical Validation Subprocesses, which remove from the extractedFacts any facts that do not pass the Categorical Validations 1313.

The FF S1 Search process then returns the extractedFacts array, which may or may not contain any entries at this point 1314.

Ngram FF S1 Search

The FF S1 Search is essentially a regular vector search to find the nearest stored FF to each target FF (each FF that was generated from the LLM response to the query). Given that FFs are short, and given that shorter vectors can be strong, this can be an effective process.

However, an extremely powerful method for finding the closest stored FF is to use an Ngram FF S1 Search which is a hybrid embodiment of an FF S1 Search fused with an Ngram Search.

As in FF S1 Search, the LLM is prompted for a reply, and the reply is split into FFs. However, each of these target FFs acts as a query in a regular Ngram Search (except that the Query Filter does not include hyponyms but does add the S1 filter criteria).

Thus, for each FF, the Retrieval Keywords Process returns a list of keywords where the FF is in the input (not the user query); the Retrieval Date Ranges Process returns any required date ranges using the FF as the input; and the Retrieval Entity Counts Process returns any required entity counts using the FF as the input. The Query Filter is constructed using Keywords, Entity Counts, Date Ranges, plus the added S1 criteria (so that no P1, P3, or P5 chunks will be considered).

Alternatively, the embodiment may solely ingest S1s and therefore no longer need to store an "S1" designation in the payload (as only S1s exist). Likewise, the query filter will no longer need to require S1 as well. Such embodiments can be constructed for Ngram Searching, FF S1 Search, and Ngram FF S1 Search.

The Relevant Facts Extraction Process does indeed receive the user's query to determine relevancy.

The Categorical Validation Processes also receive the user's query for validation.

If no relevant facts are found, then shorter groups of keywords (also known as keyword ngrams) are each checked, the same as in a regular NGram Search.

No DFU expansion is used in the NGram FF S1 Search (as the objective is to find the closest FF to the target FF). (DFUs are disclosed below.)

In this way, keywords, entity counts, date ranges, term expansion, fact extraction, and more are all used to find the closest stored FF to each target FF (rather than relying on vector search alone).

This is a very powerful implementation of an FF MCI.

Range Consolidation Process

The use of S1, P1, P3, and P5 chunks allow for additional coordination of both expansion and contraction. A Range Consolidation Process can be used for contraction. A Range Expansion Process can be used for expansion.

S1 vectors are stronger than P1 vectors; which are stronger than P3 vectors; which are stronger than P5 vectors. Hence: S1>P1>P3>P5.

Consider a situation where relevant information is not contained in a single sentence but is contained in multiple sentences within a P1. This means that the relevant information is also found in the encapsulating P3 and P5 as well. However, because P1 is a stronger vector, the P1 hit should be above the P3 and P5 hits when the vector search is completed.

Likewise, if a single sentence does indeed contain the information, then it should be above the encapsulating P1, P3, and P5 when vector search ranking is completed.

Where a P1 is above an encapsulating P3 and P5, the encapsulating P3 and P5 can be discarded from the top hits before choosing the top-k hits to send to the Relevant Facts Extraction Process.

Given that the hits contain the paragraph and sentence ranges, such a filtering process is trivial and instantaneous to implement. Such a filtering process is herein referred to as a Range Consolidation Process. A Range Consolidation Process can exclude paragraph-level chunks that encapsulate any paragraph-level hit that is above the encapsulating paragraph-level hit.

Range Expansion Process

Sometimes, an individual sentence may lack sufficient context to provide a fulsome answer. A Range Expansion Process can be used to address this issue. In essence, where a S1 is a hit, the S1 hit can be swapped with the encapsulating P1. In this way, the P1 with additional context can be sent to Relevant Facts Extraction Process, and the S1 is still used to pinpoint which P1s are most relevant.

If the single sentence S1 was indeed the sole relevant sentence, then the Relevant Facts Extraction Process will remove the other sentences in the P1. But if some of the surrounding sentences do contribute to a more fulsome response, then the Relevant Facts Extraction Process will keep them. Hence, the Range Expansion Process combined with Relevant Facts Extraction Process gives the best of all worlds.

DFU Cataloguing Process

An ISAR embodiment may include a DFU Cataloguing Process. A Discreet Factual Unit (DFU) is a group of sentences that cannot be divided without information loss.

Recipes are an example of DFUs. Having only part of a recipe loses information needed to perform the recipe. "How To's" and other instructional texts are also DFUs (e.g., "How to Open an Account," "How to Crop an Image," etc.). Sending only part of a "How To" loses information needed to accomplish the steps.

Given that preferred ISAR embodiments are based on paragraph and sentence ranges, resolving this issue is straightforward.

An ISAR embodiment can include an SQL table that has the beginning and ending paragraph/sentence boundaries of any DFUs contained in the corpus.

Certain DFUs can be programmatically identified (such as using POS tagging to locate a series of instructions and cataloguing the beginning and ending of the series). The table can also be manually created. Those skilled in the art will know how to create such a table based on the description contained herein.

The electronic storage of DFU boundaries is referred to as a DFU Cataloguing Process.

Thus, the paragraph and sentence location of every fact returned from the Relevant Facts Extraction Process can be checked to see if the fact is inside a DFU. If it is, then the fact can be replaced with the entire DFU.

In this way, if part of a recipe is returned by the Relevant Facts Extraction Process, a DFU Reconstruction Process can use the SQL DFU table to discover that the facts are inside a larger DFU. The DFU Reconstruction Process can retrieve the full text of the DFU using the paragraph/sentence boundaries and return the full DFU so that that the internal facts can be replaced with larger encapsulating DFU.

Tabular DFU Construction Process

ISAR embodiments that support DFU Cataloguing and DFU Reconstruction can be used to store and retrieve tabular data in addition to narrative text.

Tabular data (such as csv, HTML tables, markdown tables, and relational database tables) can be programmatically converted into DFUs on a per row basis. Each DFU can include a series of bullets, each with the column name+row value preferably where each series of bullets are preceded with the title, subtitle, and/or description of the table. Each DFU would therefore contain the title, subtitle, and/or other meta data plus a series of bullets created from the columnName/Row Value fields.

Each independent DFU can now be demarcated in the same manner as any other DFU, and likewise, used for chunk expansion as well.

For example, consider a table that has a patient ID, patient name, and whether they smoke. The title is Patient Smoking Habits. One entry in the table is 1077 (patient ID), John Smith (patient name), and yes (whether they smoke). This can be converted into text containing all this information. For example, an unordered list entitled "Patient Smoking Habits" could be created where the column names are separated from the values via a semicolon as follows:

Patient ID: 1077

Patient Name: John Smith

Whether they Smoke: yes

Without this format, the words "whether they smoke" could be far removed from "John Smith." Moreover, the relationship of the word "yes" to the fact of John Smith's smoking habit would also be far removed. However, now the information is neatly organized by converting rows into DFUs in this, or similar, manner.

A Tabular To Narrative DFU Process can convert tables into narrative text similar to the above. The output narrative text is now a document that can be ingested into an ISAR system, which each bullet is an S1 level chunk and the combined row bullets are a P1 level chunk. The encapsulating P3 and P5 chunks can include any preamble information included by the Tabular to Narrative DFU Process such as table name, table description, etc.

On a per row basis, a Tabular to Narrative DFU process can create a narrative output that includes table name, table description, and other table meta data followed by a columnName/row Value bullet list. Such output can then be ingested as described above.

Retrieval proceeds as normal, with DFU Reconstruction automatically handling the details.

Consider the query: "Does John Smith smoke?" Consider further that the following chunk has been retrieved: "Patient Name: John Smith." Since this is within a DFU, the chunk is expanded to include the entire DFU, which is sent to the LLM or other application using the ISAR system.

Now the LLM is not only receiving both relevant and complete information, but also, it can simply present the information as-is in response to the query.

Thus, ISAR embodiments can provide rapid, 100% accurate responses to queries for both narrative text and tabular data.

Augmenting Other RAG and Other Information Storage and Retrieval Systems with ISAR Various elements of ISAR can be added to other RAG implementations and other information storage and retrieval systems to significantly improve accuracy and speed while simultaneously reducing cost. Such combinations will be readily apparent to those skilled in the art upon reading this disclosure.

For example, FFs can be used with such embodiments. Also, sentence-level chunking combined with range expansion can be used, either alone, or in combination with FFs, or in combination with other ISAR elements. For example, a RAG implementation that uses semantic chunking can add sentence-level chunking as well. Any sentence-level hits can be expanded back into the encapsulating semantic chunks before being sent to the requesting process (just as S1s can be expanded to their encapsulating P1s; just as relevant facts can be expanded to encapsulating DFUs).

Entity counts can be added either alone or in combination with other ISAR elements. While elegant, they provide very significant performance boost. After all, any "who" query immediately excludes every chunk that does not reference at least one person; any "where" query immediately excludes every chunk that does not reference a location; and so on. This is a powerful way to pinpoint precisely relevant chunks.

Likewise, the iterative searching for relevant facts can be combined with other search methods (such as query rewriting).

Also, the relevant facts extraction process can be used to aggregate relevant facts in addition to or in lieu of stopping the search the moment facts are found. In this manner, multiple relevant facts from multiple chunks can be aggregated for a more fulsome response.

Due to the power of the disclosed filtering and expansion processes, such can be applied to embodiments that do not even use vector embeddings (such as keyword-based implementations). Including an ISAR element in any RAG implementation or in any information storage system or in any information retrieval system or in any information storage and retrieval system falls within the spirit and scope of this disclosure.

Also, throughout this disclosure, a vector database search has been described as submitting a query filter to the vector database where the query filter contains both the query vector and the payload conditions. Such terminology is not meant to be restrictive. On the contrary, it is meant to convey constructing a query specific to the vector database(s) used in the embodiment such that a vector search is only conducted on points that pass the conditions expressed in the payload. Also, as stated above, even the vector search itself is optional.

Knowledge Sources

There are three information sources that a Large Language Model (LLM) or chatbot can use when answering a question: 1) using internal knowledge learned during training (called parametric knowledge); 2) using an external source of information (such as ISAR); and 3) using both internal and external knowledge. Herein, LLM and chatbot shall be used interchangeably to convey prompting a language model and getting back a response. Querying an LLM and getting a response based solely on internal knowledge shall be referred to as Parametric QA. Querying an LLM and getting a response based solely on external knowledge shall be referred to as External QA. Querying an LLM and getting a response based on the combination of both internal and external knowledge shall herein be referred to as Hybrid QA.

External QA involves retrieving information from at least one external source and providing that information (or a derivative thereof) to the LLM. For example, consider the following query: "Who was the first president of the United States?" Relevant information from Wikipedia could be retrieved. The retrieved information can be sent to the LLM along with the query; and the LLM can be instructed to answer the query based solely on the provided content. Where speed, accuracy, and optimal relevance are priorities, an ISAR system can be used as the external knowledge base for both External QA and Hybrid QA.

Hybrid QA would allow the LLM to use both the provided information and the LLM's internal knowledge when answering the query.

This present invention discloses systems and methods for 100% accurate parametric-based, external-based, and hybrid-based responses for LLMs and chatbots. This includes 100% accurate QA, exposition, and summarization.

Hallucinations

A hallucination in the context of LLMs typically refers to instances where the model generates information that is not grounded in its training data or reality-essentially, making things up. In this present disclosure, an LLM dutifully reproducing learned narratives is not categorized as a hallucination. Moreover, when the provided narrative conflicts with reality, it is the LLM's job to present the narrative.

For example, a properly functioning LLM based on the Flat Earth Society's website will state that the earth is flat. From the perspective of the information provided, that is the 100% accurate response.

Hence, for this disclosure, a hallucination is either something that contradicts the knowledge source or is unsupported by the knowledge source. In other words, "hallucination rate" as used herein refers to faithfulness—the degree to which the response remains faithful to the provided information (whether provided during training and/or at the time of query). This present disclosure solves perhaps the biggest issue in AI—fully eliminating hallucinations.

Root Causes of Hallucinations

There are three reasons why LLMs deviate from the provided information. The three causes of hallucinations are: 1) malformed queries; 2) incomplete information; and 3) Noun-Phrase Collisions.

First, if a query is malformed then there is no possibility of an accurate response. Malformed queries either need to be corrected or rejected. Disclosed herein are methods for correcting common types of malformed queries: complex queries, misspellings, grammatically incorrect, and ambiguous queries. After the query has been corrected, it can be sent to an LLM fine-tuned on detecting whether the query can be handled by the target LLM or not. The query can be rejected if it cannot be handled by the LLM. Thus, the target LLM will only be receiving properly formed queries, thereby eliminating the first cause of hallucinations.

Second, if an LLM does not have the complete information, this too can result in hallucinations. This is why ISAR sends entire DFUs. Doing so eliminates this particular cause of AI hallucinations.

Third, the remaining cause of hallucinations is the most common cause of hallucinations. The vast majority of hallucinations occur when LLMs provide a wrong answer to an appropriately written query even though the LLM has access to the full answer. All such hallucinations are caused by Noun-Phrase Collisions.

Key Discovery

LLMs can, and often do, hallucinate even when they have been trained on correct information. The present inventor has discovered the root cause of all of these hallucinations. The root cause is herein referred to as Noun-Phrase Collisions.

The present inventor was the first to discover that LLMs self-organize around noun phrases during pretraining. This discovery led to the discovery of Noun-Phrase Collisions as the cause of every hallucination where the LLM has been trained on the correct information. A Noun-Phrase Collision occurs when two noun phrases refer to different entities yet have high vector similarity scores.

The present inventor first discovered Noun-Phrase Collisions when conducting experiments in which the LLM was provided clear and correct information, yet the LLM still hallucinated nevertheless. Consider the following real-world example from GPT-4:

Prompt:

Based on the following passages, tell me about Afonso?
Passage 1: Afonso's hair is blonde.
Passage 2: Alfonso is married to Gwen.

Response:

The passages provide information that Afonso has blonde hair and is married to a woman named Gwen.

This is a hallucination. Alfonso, not Afonso, is married to Gwen. Now consider another real-world example from GPT-4:

Prompt:

Based on the following passages, tell me about Chuck?
Passage 1: Chuck's hair is blonde.
Passage 2: Bartholomew is married to Gwen.

Response:

The passages only provide information that Chuck has blonde hair. There is no further information about Chuck.

Notice that this response is 100% accurate, even though it is the exact same query just using two different names. The difference is that Afonso and Alfonso have a high vector similarity score (92.3%), whereas Chuck and Bartholomew have a lower vector similarity score (76.0%). This present disclosure shall use ADA-002 to obtain the vector embeddings and uses cosine similarity to compute the vector similarity scores. This convention is to provide uniform examples, but the same applies across various methods known in the art for transforming text into vector embeddings and various methods known in the art for computing their similarity scores.

In short, GPT-4 hallucinated because two different noun phrases (Alfonso and Afonso) refer to two different entities, yet they have high vector similarity scores. In other words, GPT-4 hallucinated because of a Noun-Phrase Collision. After discovering Noun-Phrase Collisions where external knowledge was provided, the present inventor then conducted experiments on LLM parametric knowledge by tracing the hallucinations back to the training corpus, confirming that parametric hallucinations are due to the exact same cause.

The above external-knowledge Noun-Phrase Collision caused GPT-4 to conflate facts about Afonso with facts about Alfonso. The present inventor conducted similar experiments on internal knowledge (i.e., parametric knowledge). For example, when asked about the mother of Alfonso II, GPT-4 gave information about Afonso VII. This is an example of a parametric hallucination as the LLM gave the answer based on its internal knowledge (not based on externally provided content). An analysis of the internet training corpus confirmed this to be due to a Noun-Phrase Collision.

Every LLM hallucinates due to Noun-Phrase Collisions. For example, Noun-Phrase Collisions cause GPT-3.5 Turbo to wrongly conflate facts about magnesium with facts about calcium. They also cause GPT-3.5 Turbo to wrongly conflate facts about a Roth IRA with facts about a Roth 401k.

Noun-Phrase Collisions

The present inventor sought to understand why LLMs often conflate information about Afonso with Alfonso, yet they do not wrongly conflate information about Chuck with Bartholemew. The present inventor was the first to realize that the reason comes down to the similarity score. The vector embeddings for Alfonso/Afonso have a similarity score of 92.3%, whereas the vector embeddings for Chuck/Bartholemew have a similarity score of 76.3%.

The present inventor tracked down the origin of literally hundreds of hallucinations. They were all caused by such Noun-Phrase Collisions-they were all traceable to the LLM wrongly treating disparate noun phrases as synonyms due to their high vector similarity scores.

It is important to note that LLMs typically convert text into numerical tokens. For example, GPT-4o converts "Chuck" into a single token: [187874]. Bartholomew is converted into four tokens: [4622, 134710, 747, 86]. Afonso is converted into two tokens: [32, 104460]. Alfonso is converted into [2348, 104460].

For purposes of this disclosure, a high vector similarity score can refer to a high vector similarity score on the entire noun phrase and/or a high degree of similarity between a subset of the noun phrase's numerical tokens. The latter is a straightforward criterion. For example, consider how GPT-4 o represents 1968 and 1969. GPT-4o converts 1968 into two tokens: [6514, 23]. GPT-4o converts 1969 into two tokens: [6514, 24]. Notice also that Afonso and Alfonso share token 104460 in the second position.

This is important because GPT models do not see "1968" or "1969" as both of these concepts are outside their vocabulary (i.e., there is no single token dedicated to expressing either of them). With this mind, consider text that contains one event that occurred in 1968 ([6514, 23]) and another event that occurred in 1969 ([6514, 24]). During response generation, when the LLM outputs token 6514, it can wrongly conclude that it has two token paths to choose from (either token 23 or token 24). If it chooses the wrong one, then it will produce a hallucination by wrongly attributing something that happened in 1968 with something that happened in 1969.

These token-level collisions are responsible for LLMs having extraordinarily high hallucination rates for dates, part numbers, PubMed IDs, and more.

When dealing with language (i.e., narrative text), text similarity scores can be measured based on the vector embeddings for the text themselves. Text similarity scores can also be computed by looking for identical tokens (such as the shared tokens between 1968 and 1968). The inventive systems and methods described herein resolve both types of Noun-Phrase Collisions.

Noun-Phrase Collisions Will Always Exist in LLM Parametric Knowledge

Noun-Phrase Collisions exist because LLMs are typically trained for creative language generation. Therefore, they are trained to recognize that words such as "car," "automobile," and "vehicle" can often be used interchangeably, e.g.: "My automobile broke down. I don't like this car. This is the last vehicle I'm going to buy." In this example, the LLM needs to understand that all three words refer to the same thing, and it needs to do so in a mathematical manner.

Likewise, when generating a response, it needs to know the variety of words that it can choose from to generate a convincing answer.

The present inventor made a discovery previously unknown to the industry. Noun-Phrase Collisions occur because the LLM typically learns to treat semantically similar words as synonyms during pretraining. During instruction fine tuning, many of the errant associations get overwritten. However, it is impossible to finetune all the errant associations-paving the way for future errors (called "hallucinations").

While conflating "Alfonso" and "Afonso" may seem somewhat intuitive, consider the fact that GPT-3.5 Turbo routinely conflates "magnesium" and "calcium." That is because the magnesium/calcium vectors have an 87.2% similarity, and the instruction tuning was not sufficient for the LLM to learn that they refer to different things despite their high similarity score.

The fact that fine tuning overcomes these errors is seen in OpenAI's continual retraining of its models to fix widely publicized hallucinations, something they acknowledge in the GPT-4 system card. "For tackling open-domain hallucinations, we collect real-world ChatGPT data that has been flagged by users as being not factual . . . ."

Noun-Phrase Collisions are born during model pretraining. Noun-Phrase Collision in the pretrained model shall be referred to as inherent Noun-Phase Collisions. Subsequent instruction tuning teaches the model to overcome the inherent Noun-Phrase Collisions. For example, GPT-4's pretraining has a Noun-Phrase Collision for Alfonso and Afonso. The original instruction tuning did not correct for this issue (e.g., GPT-4-0125-preview). After the Afonso/Alfonso collision became public, OpenAI retrained GPT-4 using instruction tuning to correct for some of the inherent collisions (e.g., GPT-4-0613). The change in GPT-4's behavior regarding Afonso/Alfonso demonstrates that the Noun-Phrase Collisions are indeed overcome during instruction tuning.

However, the problem is that it is impossible to train away all inherent Noun-Phrase Collisions. Thus, each LLM remains ready to hallucinate each time that a user's query evokes an inherent Noun-Phrase Collision that was not corrected during instruction tuning.

For example, GPT-4 once routinely conflated "Alfonso" and "Afonso." OpenAI used fine tuning to fix some of the errant conflations, allowing later models to make fewer mistakes. However, not all Alfonso/Afonso conflations were fixed. The conflation is only fixed when a user types in a query that is very similar to the one(s) used during fine tuning. For other queries, GPT-4 still wrongly conflates Afonso and Alfonso.

This exemplifies one problem with trying to fix the problem through fine tuning. When fine tuning on facts, the LLM does not tend to generalize as well as it does when fine tuning on behavior. You may fix the exact, highly-publicized queries, but other queries may still experience the errant conflation.

Second, when LLMs are trained on behavior they can become increasingly stronger and more robust (i.e., better at performing the behavior). However, when LLMs are trained on facts they become increasingly worse with each and every added fact. The increase in error rate is literally linearly related to the number of fine-tuned facts.

For example, consider an LLM that can perfectly answer virtually any question regarding cows but hallucinates on questions about dogs. Rather than going back to pretraining, the LLM maker decides to "fix" the publicized dog hallucinations through fact-based fine tuning instead. Unfortunately, for every one new query about dogs that gets added in, the LLM forgets how to answer two queries about cows. While the hallucination rate for the publicized dog queries gets "fixed," the overall hallucination gets much worse.

This paradox is known as catastrophic forgetting. One can accurately conceptualize fine tuning on facts as creating an idiot savant. The LLM will indeed parrot back the provided facts, but it will also develop a degree of "dementia" or "amnesia" in other areas.

That is because LLMs have a finite number of parameters (the mechanisms they use for storing both facts and learned behaviors). Fine tuning means that some parameters that once handled one or more facts must now be reallocated (i.e., they are overwritten) to account for the new fact. Thus, OpenAI's stated method of dealing with hallucinations actually increases the overall hallucination rate of their models instead.

Understanding the above is helpful in understanding how to finally solve the problem of LLM hallucinations once and for all. First, it is helpful to know that LLMs cannot be finetuned to learn all facts about everything. The paradox of catastrophic forgetting ensures this. Second, it is helpful to know that LLMs often erroneously conflate references to different nouns when those references have a high similarity score.

In other words, there is no way to eliminate Noun-Phrase Collisions from LLM parametric knowledge. Nor is there any way to fully eliminate the Noun-Phrase Collisions within the models' weights and biases (i.e., parameters) due to catastrophic forgetting.

Thus, eliminating hallucinations requires accepting the existence of such collisions, and then, fully addressing the issue head on.

Noun Phrase Collision Detection Process

In order to address Noun-Phrase Collisions, some embodiments of the systems and methods described herein include a Noun-Phrase Collision Detection Process for identifying Noun-Phrase Collisions in the user's query.

Consider the following query from the RAGTruth hallucination corpus: "What are the chemical and physical properties of magnesium and calcium?" GPT-3.5 Turbo produces a hallucination when the passages depicted in FIG. 14 are sent along with this query. That is because the words magnesium and calcium are a Noun-Phrase Collision (and GPT-3.5 Turbo did not learn to overcome this collision during fine tuning).

An embodiment for a Noun-Phrase Collision Detection Process can include:

a parts-of-speech tagging process;

a vector embedding process;

a text similarity measurement process;

where:

the parts-of-speech tagging process identifies the noun phrases in the text;

the vector embedding process transforms the noun phrases into vector embeddings;

the text similarity measure process identifies any pairs of vector embeddings whose similarity is greater than a given threshold.

Implementing each of the above processes and steps can be accomplished with off-the-shelf technology. There are many NLP libraries for parts-of-speech (POS) tagging that can be used to identify the noun phrases. There are many vector embedding models (such as ADA-002). There are many methods for computing vector similarity (such as using cosine similarity).

By identifying noun-phrases that have high text similarity, the systems and methods described herein identify whether the query can result in a hallucination or not. Hence, this novel combination accomplishes something very useful over the current art.

For example, when the above embodiment is applied to the RAGTruth query in FIG. 14, it will: 1) identify the following noun-phrases: properties, magnesium, and calcium; 2) transform them into vector embeddings; 3) identify that the vector embeddings for magnesium and calcium have a high similarity score, and therefore are identified as Noun-Phrase Collisions.

Some embodiments may use a coreference resolution process to weed out noun phrases that refer to the same entity. Consider the following query: "My car has a broken window. What should I do with the vehicle?" The query after coreference resolution would be: "My car has a broken window. What should I do with my car?"

Without coreference resolution, car and vehicle would wrongly be considered to be Noun-Phrase Collisions, and due to their high similarity score, would be excluded from use in a response to a user query. This would be a false positive.

That is because "car" and "vehicle" are both nouns that refer to the same entity, and therefore, cannot be Noun-Phrase Collisions, despite their high vector similarity score. Coreference resolution replaces all references to the same entity with one unified noun phrase. Hence, embodiments using the coreference resolution process can reduce, if not eliminate, false positives (where noun phrases that refer to the same entity are wrongly identified as Noun-Phrase Collisions).

Other embodiments may add a process to compute the token IDs of the noun phrases. Any noun phrases that share the same initial token(s) can be identified as Noun-Phrase Collisions.

If the Noun-Phrase Detection Process identifies Noun-Phrase Collisions, then a Query Splitting Process can be used to create separate queries that are devoid of Noun-Phrase Collisions.

Query Coreference Resolution Process

This is a novel application of coreference resolution. It is non-obvious that performance can be significantly improved simply by applying coreference resolution to the query itself. However, in light of the discovery of the noun phrase collision issue, the performance boost becomes self-apparent. Applying coreference resolution on the query can eliminate noun phrase collisions, and thereby avoid hallucinations when such collisions are removed.

Query Splitting Process

An elegant way of resolving noun-phrase collisions is to split the original query into multiple queries such that each individual query is devoid of noun-phrase collisions.

For example, consider the following query found in the RAGTruth dataset: "What are the chemical and physical properties of magnesium and calcium." This can be split into two queries: "What are the chemical and physical properties of magnesium?" and "What are the chemical and physical properties of calcium?"

Notice how each query is now devoid of Noun-Phrase Collisions.

The Query Splitting Process may alternatively split queries based on topics. Such a Query Splitting Process has many advantages. First, it will automatically separate Noun-Phrase Collisions since each noun-based topic will already be split into separate queries. Thus, a Noun-Phrase Collision Detection Process could be optional for such an embodiment.

Second, topical splitting also reduces the complexity of the query, thereby resolving the issue of malformed complex queries while simultaneously getting rid of noun-phrase collisions at the same time.

Consider the query once again: "What are the chemical and physical properties of magnesium and calcium." There are four noun-phrase based topics: chemical properties, physical properties, magnesium, and calcium. The maximal split for these topics results in the following four queries: "What are the chemical properties of calcium? What are the physical properties of calcium? What are the chemical properties of magnesium? What are the physical properties of magnesium?" Now the LLM has four queries that are each simple and devoid of noun-phrase collisions.

A neural network (such as an LLM) can be finetuned to perform such splitting. However, embodiments seeking perfect accuracy can implement a novel neural BSD neural network.

BSD Query Splitting

One example training embodiment could take a dataset of queries. These queries can be transformed using a Spelling and Grammar Correction process to standardize them (and thereby reduce the scope). The output of the Spelling and Grammar Correction process can be sent to a BSD Coreference Resolution Process. The output of the BSD Coreference Resolution process can be the training input.

The corresponding target outputs could be deterministically derived by identifying all the noun phrases in each training input; then, constructing the split queries by preserving the vocabulary and word order used; producing the maximal split of the identified noun phrases; and sorting the queries according to the order in which the noun phrases appeared in the original query. As a reminder, deterministic sorting is required in BSD when a single training input is transformed into multiple outputs. This ensures that there is only one correct split per input when doing so, thereby ensuring that the conditions of BSD are met.

For example, in the example embodiment above, the target output for the query should be arranged in the following order: chemical properties>physical properties>calcium>magnesium (based on the chosen sorting method). Hence, the maximal split above would need to be reordered to meet the deterministic BSD transformations: "What are the physical properties of calcium?" "What are the physical properties of magnesium?" "What are the chemical properties of calcium?" "What are the chemical properties of magnesium?" That is the one order allowed given the chosen deterministic transformations (such as sorting on the word order in which the noun phrases appear in the original query). Any other wording or sort order will be an error, and therefore, result in a non-zero cost value by the loss function during training.

The resulting BSD Query Splitting neural network accurately reduces the complexity of queries while simultaneously getting rid of query-based noun-phrase collisions. Meanwhile, the BSD aspect ensures that the resulting split will be devoid of hallucinations itself. Given the highly significant utility of the BSD Query Splitting process, it is inventive in its own right.

During inference, queries can be sent to the Spelling and Grammar Correction Process and BSD Coreference Resolution. Such sharing of both for both training and inference serves as a Scope Reduction Process. (See "Scope Reduction Process" above.)

The split queries can be iteratively and/or concurrently sent to the LLM. The user can be presented with a concatenation of the results. Alternatively, a deduplication process can remove redundant information. A process using an LLM for such extraction can be employed to implement such a deduplication process. Alternatively, a derivative of the multiple responses can be produced and then sent to the user or stored for future use.

Universal Antidote for 100% Accurate Responses

Parametric QA and Hybrid QA both include relying on the LLMs internal knowledge. As stated above, the internal knowledge will always include some noun phrase collisions.

Removing noun-phrase collisions from the query (such as through Query Splitting) significantly improves accuracy above the current art of existing systems and methods. However, due to the inherent noun-phrase collisions, there is no guarantee of 100% accurate output. Parametric QA and Hybrid QA embodiments that demand 100% accuracy will have to correct the LLM outputs.

A method called groundedness is common in the art. Groundedness attempts to identify hallucinations by comparing the output to facts known in publicly accessible information. In this manner, the answer is still derived 100% from the LLM's parametric knowledge (providing the LLM with maximal creativity and freedom) while simultaneously trying to measure the accuracy through external sources.

Some groundedness implementations attempt to correct hallucinations once they are identified.

Microsoft is one company that offers a groundedness service that includes the option of automatic correction. This service is offered through the Microsoft Azure Groundedness API. An independent third-party study found this service left 2 out of 3 hallucinations undetected. Other studies show that groundedness fails to mitigate 88% of hallucinations. Moreover, Microsoft has not shown any systematic way of avoiding hallucinations during its 'correction' process. In other words, the approach used in the prior art can replace an accurate statement with an inaccurate one, thereby adding an additional hallucination instead of eliminating one.

This present invention discloses a novel form of corrective groundedness called FF Corrective Groundedness Process.

One embodiment of an FF Corrective Groundedness Process includes:

an input query;
an LLM;
a BSD FF Pipeline,
a list of reliable websites; and
an internet-enabled FF MCI;
where:
the input query is sent to the LLM;
the LLM response is sent to the BSD FF Pipeline;
the BSD FF Pipeline converts the response into FFs;
for at least one of the FFs, the FF MCI searches on the at least one FF from the list of reliable websites via the internet to identify at least one source;
the FF MCI transforms the at least one source into at least one source FF (FFsrc);
the at least one FF is replaced with the closest matching FFsrc.

In this manner, it does not matter if the output from the parametric knowledge is correct or not. After all, everything is replaced with known truth resulting in 100% accuracy.

The use of FFs overcomes the weaknesses of the groundedness methods disclosed in the prior art (just as FFs overcome the weaknesses of other Low-Level and High-Level NLP processes). FFs reduce information to their smallest divisible units, allowing for one to be swapped with another. BSD FFs ensure that the units accurately reflect the information in the larger sentences from which they are derived, thereby resolving the accuracy issue.

While such an embodiment can be 100% accurate, errors in the LLM response may introduce irrelevant responses. In other words, erroneous LLM statements may be replaced with accurate (but irrelevant) facts, thereby resolving the issue of hallucinations, but not fully addressing the user's request.

There is no doubt that the universal antidote offers significant advantages in its own right, given that it does indeed eliminate hallucinations. Moreover, the potential for irrelevancy typically only occurs when correcting erroneous statements.

However, some embodiments may want to avoid noun-phrase collisions in the first place and/or correct for their errors. The combination of eliminating query noun-phrase collisions and using an FF MCI ensures both maximum relevancy and accuracy. Hence, avoiding noun-phrase collisions may still be used along with the universal FF antidote to optimally address relevancy.

Why RAG Fails to Eliminate Hallucinations

RAG has failed to eliminate hallucinations for two reasons. First, RAG retrievers are so imprecise that they often require sending hundreds of potentially relevant chunks-even when none of the chunks are relevant all.

Second, even when the correct information is sent, LLMs can still hallucinate (due to noun phrase collisions).

This disclosure resolves both issues with RAG. ISAR ensures that only relevant facts are sent. Moreover, it lets the system know when no relevant facts are found. This resolves the first issue.

The ABCs of Eliminating Hallucinations described immediately below resolve the second issue. They provide the three systematic ways to fully address the issue of noun phrase collisions.

ABCs of Eliminating Hallucinations

Given the inherent existence of Noun-Phrase Collisions inside the LLM itself, and given that these collisions result in hallucinations, there are only three ways to eliminate hallucinations: 1) Avoid the noun-phrase collisions; 2) Bypass the noun-phrase collisions; and/or 3) Correct for the errors caused by the noun-phrase collisions. In this present disclosure, this shall be referred to as the ABCs of Eliminating Hallucinations: (A)void, (B)ypass, and (C)orrect.

Systems and methods described herein achieve 100% accurate responses using any of these separately or by combining them together. Given that all three can be combined, they constitute a single system and single method.

The rest of this disclosure describes how to produce 100% accurate responses using the ABCs of Eliminating Hallucinations.

Avoiding Noun-Phrase Collisions

Avoiding Noun-Phrase Collisions refers to avoiding sending noun-phrase collisions to the LLM. The processes for accomplishing this in Parametric QA have already been disclosed (e.g., Noun-Phrase Detection Process, Query Coreference Resolution and Query Splitting Process).

However, External QA involves sending passages along with the query. Thus, in External QA, noun-phrase collisions must be removed from the query and the passages.

The Noun-Phrase Detection Process can identify whether any noun-phrase collisions exist in the retrieved passages. And just like queries, passages can be split up by noun-phrase topics to avoid noun-phrase collisions.

Consider the magnesium/calcium query previously discussed. Consider also the passages that RAGTruth identified as relevant to the original query. (FIG. 14) Now consider only sending the calcium passages 1401, 1403 along with the calcium query, and only sending the magnesium passage 1402 along with the magnesium queries (after the original query 1400 is split).

In this situation, it is now impossible to for LLM to wrongly conflate information about calcium with information about magnesium, because it only has the correct information for both at the time of the individual queries.

Processes for dividing queries and passages become straightforward the moment those skilled in the art learn about this present inventor's discovery of noun-phrase collisions. Avoiding sending collisions is easy, once you know that such collisions exist and once you know how to identify them.

A Topical Splitting Process can be used to split passages based on noun-phrase topics. Alternatively, the Relevant Facts Extraction Process can be used, where the retrieved passages are the input text and each individual query is submitted as the query. Hence, a query split into four queries can incur four calls to the Relevant Facts Extraction Process (one per query). The texts can either be all the passages, or the Topical Splitting Process can be used to also align the texts being sent to the Relevant Facts Extraction Process with the individual query that is being sent.

Another method is to combine Named-Entity Token Substitution and Noun-Phrase Token Substitution along with the Noun-Phrase Detection Process. For example, the colliding noun-phrases can be identified using the Noun-Phrase Detection Process. One of the colliding noun-phrases can be replaced with a single token, in vocabulary noun phrase (for both the query and the retrieved passages). The Noun-Phrase Detection Process can determine if the noun phrase collisions have been removed. If there is still a collision, another token can be chosen until the collisions are removed. The LLM can generate its response based on the rewritten query/passages. The token(s) can be replaced with their original values. The final result can be sent to the user.

Since External QA does not rely on parametric knowledge, the above method results in 100% accurate responses without any correction necessary.

Through these methods, noun-phrase collisions are eliminated; thereby eliminating hallucinations as a result.

Bypassing Noun-Phrase Collisions

Eliminating noun-phrase collisions in queries and passages during External QA is an example of Avoiding Noun-Phrase Collisions. Bypassing Noun-Phrase Collisions is distinct from Avoiding Noun-Phrase Collisions, although they both can be used together.

The present inventor discovered that Noun-Phrase Collisions are an issue for non-BSD generative tasks. In other words, noun-phrase collisions are not an issue for BSD generative neural networks, nor are they an issue for non-BSD extractive tasks.

Extractive tasks are those that require pulling statements and/or words and/or numbers out of supplied text verbatim. Any verbatim isolation of a subpart of a text is an extractive task. A generative task refers to everything else, including sentence simplification. A neural network that does not conform to BSD will experience noun-phrase collisions when performing generative tasks. Hence, this is the secret behind the effectiveness of BSD.

As a reminder, the popular WebSplit dataset can give over sixty alternative outputs for any given input. This type of training inherently creates noun phrase collisions. It creates "choices" for the LLM to make. Contrary to popular belief, these choices do not lead to improved performance. In stark contrast, they are the very cause of hallucinations themselves.

BSD does not give the LLM any conflicting routes to choose from. Hence, it creates generative neural networks that are devoid of noun-phrase collisions—that are therefore 100% accurate.

Thus, it is the training methods used in the art that create the noun-phrase collisions in the first place. LLM pretraining is non-deterministic; thereby creating inherent noun phrase collisions; thereby creating hallucinations.

Noun-Phrase Collisions will always be an issue for all generative tasks performed by non-BSD neural networks. Hence, BSD is the only way to create a neural network that is both generative and 100% accurate.

There are two ways to bypass the noun-phrase collision issue for generative tasks: use a BSD neural network; or convert the generative task into an extractive one. The construction and use of BSD neural networks has already been disclosed elsewhere herein. This section discloses how to convert a generative task into an extractive one—to achieve 100% accuracy by bypassing the issue of noun phrase collisions altogether.

Almost any RAG implementation can easily be converted into an extractive embodiment. The retriever can obtain chunks that are likely relevant to the provided query. However, instead of asking the LLM to answer the query based on the chunks, the LLM can be asked to extract the statements contained in the chunks that are relevant to the query. The extracted statements can be sent to the user.

In fact, this is precisely what ISAR embodiments already do. Thus, ISAR is an example of achieving 100% accuracy by bypassing the noun-phrase collision issue through reliance on extractive tasks.

Embodiments seeking to improve relevancy when using regular RAG can convert the passages to FFs using a BSD FF Pipeline. The LLM can be instructed to extract the FFs that are relevant to the query. The output can be sent to the user as the response.

Embodiments seeking optimal relevancy along with 100% accuracy will use ISAR to solely receive FFs that are already known to be relevant to the query. These FFs can be sent directly to the user as the response.

Some embodiments may include a Natural Language Response Formatting Process that converts the identified relevant statements into a natural language response. If an off-the-shelf LLM is used, then this generative process can introduce hallucinations. In such embodiments, a BSD FF-MCI can be used to correct for any errors afterwards.

BSD Natural Language Response Formatting Process

Alternatively, a BSD Natural Language Response Formatting Process can be used. The creation of a 100% accurate BSD Natural Language Response Formatting Process is actually straightforward where BSD FFs are involved. As a reminder, BSD FFs are created by first simplifying the sentences through a BSD Sentence Simplification Process and then applying a BSD Coreference Resolution Process that has been trained on the same sentence structures created by the BSD Sentence Simplification Process. This results in the BSD FF pipeline.

The creation of a BSD Natural Language Response Formatting neural network can consist of sending multiple sets of text through the BSD FF pipeline. The corresponding output of the BSD FF pipeline becomes the training input; and the text input into the BSD FF pipeline becomes the target output. After all, the BSD FF pipeline ensures that there is a deterministic relationship between the pipeline input and output. Hence, the inverse of a BSD FF pipeline is a BSD Natural Language Response Formatting neural network.

The purpose of a BSD FF Pipeline is to split natural language sentences into much smaller compact units with 100% accuracy. Thus, some embodiments may need to implement the reverse with 100% accuracy (join multiple FFs into a single natural language response).

Figure 15:
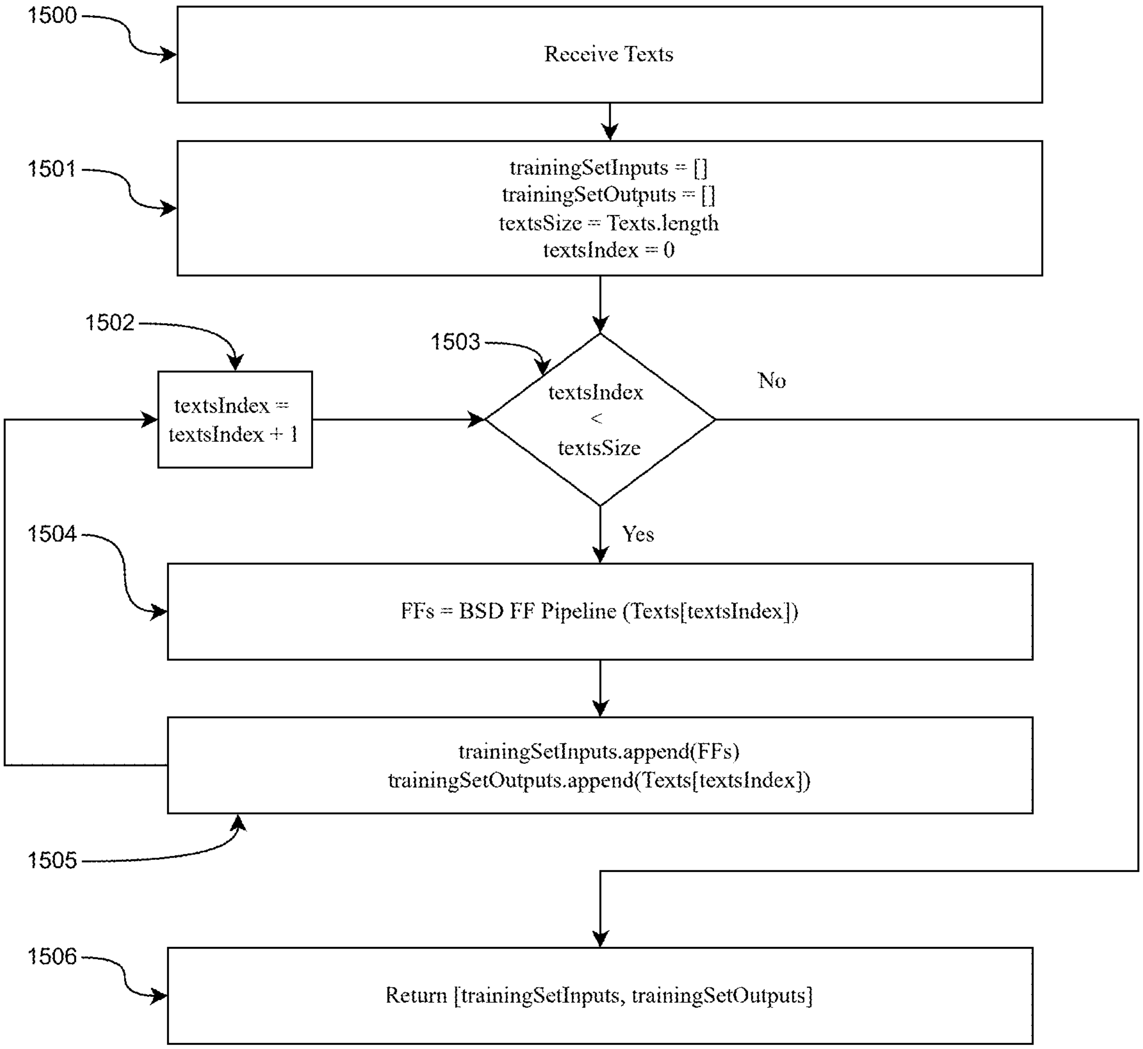
FIG. 15 is a flow diagram of one embodiment of a BSD natural language response formatting training set generation.

FIG. 15 Illustrates an Example BSD Natural Language Response Formatting Training Set Generation Process The process receives an array of Texts 1500. The following variables are initialized: trainingSetInputs, trainingSetOutputs, textsSize, and textsIndex 1501. trainingSetInputs and trainingSetOutputs are empty arrays which will hold the training input/output pairs for the model 1501. textsSize is the length of the received Texts array and textsIndex is initialized to 0 1510.

The training set population loop begins at 1503. If the textsIndex is less than the textsSize 1503, the process continues 1504. The BSD FF Pipeline creates an FFs string from the Texts array member at the current textsIndex 1504. The created FFs string is added as a new member to the end of the trainingSetInputs array 1505. The original Texts array member at the current textsIndex is added as a new member to the end of the trainingSetsOutputs array 1505. The textsIndex is incremented by one 1502. When the textsIndex is no longer less than the textsSize the training set population loop is finished 1503.

Once the training set population loop is finished, the trainingSetInputs and trainingSetOutputs array are returned as a 2-dimensional array which can be used to train a model to join multiple FFs into a singular natural language sentence 1506.

Now the user can receive 100% accurate responses in natural language format, without the LLM ever being directly asked to answer the query itself. A neural network trained on such a dataset creates a Natural Language Response Formatting Process that can join together multiple FFs with 100% accuracy.

ISAR+BSD Natural Language Response Formatting

Such a process can easily be combined with ISAR to present the FFs returned by ISAR in more natural sounding language, with zero information loss.

Figure 16:
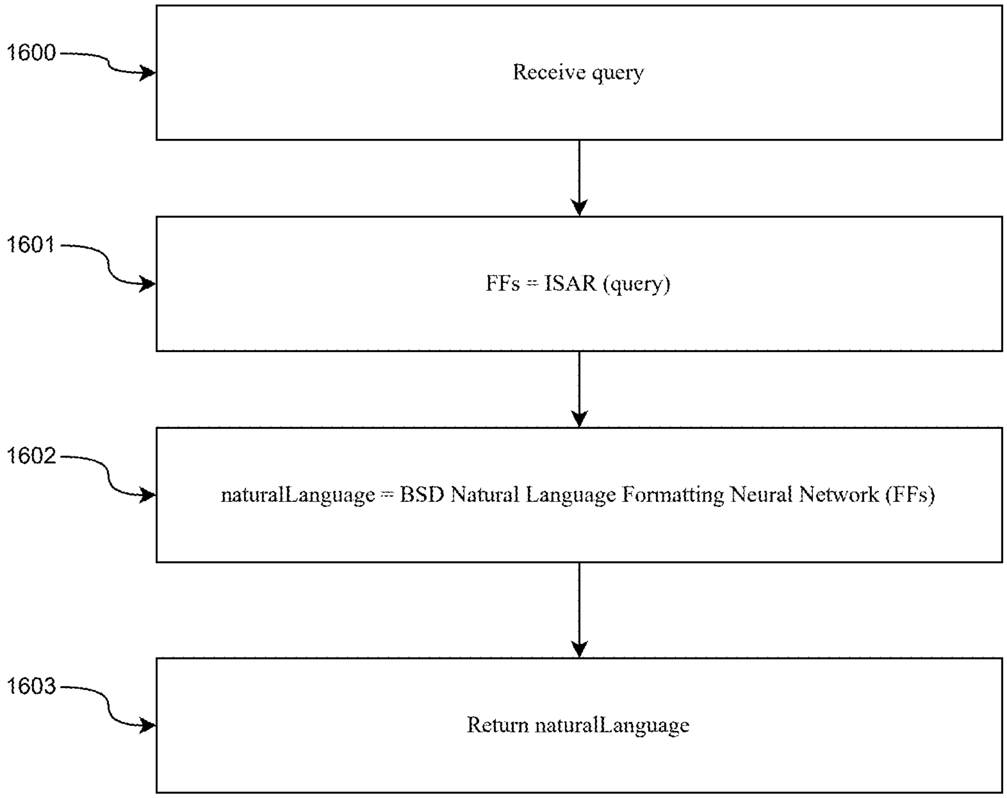
FIG. 16 is a flow diagram of one embodiment of an ISAR query response with BSD natural language formatting.

FIG. 16 Illustrates an Example ISAR Query Response with BSD Natural Language Formatting The process receives a query 1600. The query is then sent to an ISAR embodiment which returns a string of FFs 1601. The FFs string is passed to a BSD Natural Language Formatting Neural Network which returns the FFs string transformed to a naturalLanguage string 1602. The naturalLanguage string can then be returned 1603.

With FFs, ISAR, and the BSD Natural Language Formatting Process, obtaining natural sounding answers that are 100% accurate is finally this easy.

Correcting Noun-Phrase Collisions

As stated above, there are three ways to address the noun-phrase collision issue and thereby achieve 100% accuracy: Avoid noun-phrase collisions; Bypass the noun-phrase collision issue altogether; and/or Correct for errors caused by noun-phrase collisions.

The elements and steps for all three have been disclosed above, as the BSD FF-MCI is an example embodiment of a Correction Process.

Query Blinded Presentation Process

Another novel method of transforming FFs into natural language is herein referred to as a Query Blinded Presentation Process. Facts received from ISAR can be converted to natural language by sending them to a Query Blinded Presentation Process. This process prompts an LLM to present the facts in natural language, without informing the LLM of the user's query.

Notice that this novel method only works when the precise facts are provided. In other words, such a method would not be used with regular RAG (since regular RAG sends hundreds of chunks). In such a situation, the user would receive a response containing tens of thousands of characters—a response that may or may not even contain the answer somewhere inside.

Since ISAR sends FFs, an LLM can be prompted to present these facts in natural language. Internal testing from this author has confirmed that LLMs turn the presentation task into a generative AI task when the query is provided along with the instruction. However, a process that blinds the LLM to the query consistently results in accurate natural language output.

Where regular RAG is used, a two-step or three-step combination can be used. The Relevant Facts Extraction Process can extract relevant facts (along with Validation Subprocesses), and then, the Query Blinded Presentation Process can provide the result. A three-step implementation would be to first convert the retrieved chunks into FFs and then performing the prior two steps.

Putting it all Together

This filing began with disclosing the novel inventions of BSD neural networks, creating FFs from BSD Neural Networks, and the use of Model Correction Interfaces (MCIs)—including FF MCI. It then disclosed ISAR, an innovative system and method for rapidly retrieving FFs from an external knowledge base that are relevant to the user's query. It then disclosed the ABCs of hallucination elimination: Avoiding noun-phrase collisions; Bypassing the noun-phrase collision issues; and/or Correcting for errors caused by noun-phrase collisions. It concludes with methods to convert FFs back into natural language.

By combining the above, 100% accuracy can be achieved even on the most-complex, most-sophisticated NLP tasks, including: Question/Answering (QA), lengthy Exposition, and Summarization (see FIGS. 17-19).

ABCs of 100% Accurate Question and Answering (QA)

ABCs: [ABC]. The prior disclosure focused on the QA task and demonstrated how to Avoid noun-phrase collisions; Bypass noun-phrase collisions; and Correct for errors caused by noun phrase collisions.

ABCs of 100% Accurate Lengthy Exposition

ABCs: [BC]. 100% accurate exposition can be achieved through Bypassing noun-phrase collisions; and/or Correcting for errors made by noun phrase collisions.

Notice that Avoiding noun-phrase collisions is not on the list. Most modern LLMs are autoregressive. That means that they produce their output one token at a time. Most importantly, each output token is appended to the previous input-creating an ever-increasing amount of input (called the context window). It is not possible to ensure that the ever-evolving context window does not eventually include noun-phrases that refer to two different entities yet have a high vector similarity score. In fact, the likelihood of this occurring increases with every additional token.

This is why models perform worse on open-ended questions than they do on closed-domain. For example, o1-mini has a 60% on the closed-domain SimpleQA Benchmark and a 93% hallucination rate on Open-Ended Questions benchmark.

A novel solution would be to incorporate Noun Phrase Collision Detection (NPCD) in the LLM token generation process. If a token results in introducing a noun phrase collision, the LLM can return all sentences up to, but not including, the sentence that introduces the noun phrase collision. This can prevent the LLM from introducing a noun phrase collision into the context window, and then, producing hallucinations going forward due to the introduction of the noun phrase collision.

One way to minimize this issue for LLMs that do not include an NPCD is to break the writing into smaller iterative tasks. For example, first use an LLM to generate a lengthy outline such that each section of the outline solely requires one to three paragraphs. Then, generate each section independently of the others, which significantly reduces the likelihood of noun-phrase collisions, and thereby achieves high accuracy.

However, some embodiments may need to guarantee 100% accuracy when providing AI-assisted exposition.

One way to achieve this is to bypass the issue by transforming the task into an extractive one. An LLM can still generate the outline. However, an ISAR embodiment can be used to retrieve facts that are relevant to each section. The FFs in each section can be joined using a BSD Natural Language Response Formatting Process, thereby ensuring 100% accuracy on works as long as 500 pages or more.

Another way to guarantee accuracy is to have the LLM write the entire length of exposition. Then, convert the result to FFs. Replace each FF using vector searching and/or Ngram SS F1 Searching. Then, join the facts into natural language using a BSD Natural Language Response Formatting Process.

Selective FF MCI

When a task is split into multiple prompts (which therefore results in multiple calls to the LLM), and each prompt is devoid of noun phrase collisions, some embodiments may use FF MCI only the LLM outputs that contain noun phrase collisions. A Noun Phrase Collision Detection Process can be used to identify which outputs contain noun phrase collisions, and which ones do not.

ABCs of 100% Accurate Summarization

ABCs: [BC] 100% accurate exposition can be achieved through Bypassing noun-phrase collisions; and/or Correcting for errors made by noun phrase collisions.

The reason Avoidance is not on the list is due to the nature of summarization itself. Asking an LLM to perform summarization without any external processes or corrections is asking an LLM to perform a generative task without any outside assistance. This will eventually lead to hallucinations.

Bypassing hallucinations can be done by taking the text to be summarized and converting it to FFs. The LLM can be asked to choose the FFs that are most reflective of the overall meaning of the text.

Testing has shown that this is an effective way to eliminate hallucinations, however, the LLMs often do not pick the best FFs, leading to suboptimal relevance in the output.

The final method has been found to produce 100% accurate summaries with optimal relevance. That is to have the LLM generate the summary using its inherent creativity, and then, using an FF-MCI ensure that the summary is 100% accurate. FF S1 Search or Ngram FF S1 Search can be used as FF-MCI embodiments. An FF Corrective Groundedness Process can be used as well.

Notice that the solution to 100% accurate summaries can be described in a single sentence: have the LLM generate the summary using its inherent creativity, and then, using an FF-MCI ensure that the summary is 100% accurate. This is the power of BSD, FFs, FF-MCI, and ISAR. They are the inventive building blocks that can be combined to fully eliminate AI hallucinations.

This one-sentence implementation was tested on summarizing 500 BBC articles into a short headline. It did so with 100% accuracy across the board (see FIG. 19).

Apple News recently stopped producing automated summaries of BBC articles because its technology was producing hallucinations. The test method disclosed herein fully resolves the very task that Apple News stopped providing due to its inability to find a solution.

Interactive Query Clarification

For queries regarding narrative facts, ambiguous entity references render such a query impossible to accurately respond to. For example, "When does the store open?" There is an ambiguous entity reference: "the store." Such a question cannot be answered.

However, consider the following query: "I want to go to Walmart located at 123 Main Street, My City. When does the store open?" In this instance, there is no ambiguous entity, even though the phrase "the store" is included.

However, consider the following query: "I want to go to Walmart. When does the store open?" The entity is still ambiguous, because the query does not specify which Walmart.

Thus, some embodiments that want to ensure 100% accuracy may want to ensure that queries are devoid of ambiguous entity references before trying to act upon them.

An Entity Ambiguity Detection Process (EADP) can be used to detect such entities. Such an EADP comes from an epiphany when working on resolving annotator disagreements in the OntoNotes Corpus. The epiphany was that the existence of coreferences represents a programmatic way of detecting entity ambiguity (after coreference resolution has been applied).

Applying coreference resolution to text and then using linguistic structure to identify any remaining coreferences allows for the programmatic identification of entity ambiguity.

Once again, consider the following query: "I want to go to Walmart located at 123 Main Street, My City. When does the store open?" At present, there is a coreference: "the store."

Now consider the query after coreference resolution: "I want to go to Walmart located at 123 Main Street, My City. When does Walmart located at 123 Main Street, My City open?" Notice there are no remaining coreferences, and therefore, this query can be sent.

This led to another epiphany called Multi-Variate Coreference Resolution (MVCR). MVCR refers to the combination of a full entity name and a descriptor that uniquely identifies the particular entity from other entities that have the same name.

For example, descriptors of the entity type "store" can include: address, phone number, and/or store ID.

In regards to entity type "person," the full entity name can require both first and last name. The descriptor requirement can include: address, phone number, name of spouse, etc.

A database, memory map, or other storage can be created listing the entity types, criteria for full entity name and acceptable descriptors.

The query can be standardized using a Grammar Correction Process.

A coreference resolution method that preserves the entirety of noun phrases can be applied to the output of the Grammar Correction Process. (Such can preserve the descriptors.)

If any ambiguous references remain, the user can be prompted to supply additional information. For example, Query: "When does the store open?" After coreference resolution, an ambiguous reference remains: "the store." The user can be programmatically prompted "Which store?" or something similar.

If the entities are named, then the corresponding full entity name criteria can be obtained. If the entity name(s) do not meet the criteria, then the user can be prompted to provide the missing information.

For example: User: "When is his next movie?" Response: "Whose next movie?" User: "Tom's next movie?" Response: "What is Tom's last name?" User: "Cruise."

Such will occur for all entity types that have full entity name criteria. If an entity type is not in the database, or if there is no full entity name criteria for the entity type, then the process will simply continue to the next step.

Each entity type can be checked to see if it includes a descriptor requirement. If a descriptor requirement is listed, the query is checked to see if one of the descriptors is present.

Since descriptors are typically named entities (e.g., address, phone number, birthdate, spouse name, etc.), NER can be used to check if such exist. If non-named entity descriptors are used (e.g., profession), then an LLM can be used and/or a list of words describing professions can be checked to see if they are used in reference to the named entity.

If a descriptor is required and absent, the user can be prompted to provide the descriptor.

It bears noting that some embodiments may require descriptors for entities such as stores but not necessarily for entities involving people. Or they may tag person descriptors as optional.

Such embodiments may operate from the presumption that the most famous person with that name is being referred to. Other embodiments may operate from the presumption that the most famous person with that name is being referred to, unless a descriptor has been included in the prompt.

Given that the number of chosen entity types, full name criteria, and descriptor designations are finite, a BSD Query Disambiguation neural network can be trained. Such can be combined with an NER or other Scope Reduction Process. For example, a first process can be used to break the query into entity components.

For example: "When does Walmart open?" can first be converted into "When does [store] open?" In other words, a BSD Entity Type Substitution process can be applied. A second BSD Query Disambiguation can be trained on queries whose entity types have be token swapped. "When does [store] open?" can be a training input and "Which [store] are you referring to? Kindly provide an address, phone number or store location." can be a BSD Target Output.

The program can then swap [store] with the store's name.

BSD: The Building Blocks of 100% Accurate AI

Software engineers are trained to break larger problems into smaller units. Typically, in the form of functions.

However, this same skill possessed by those in the art will make breaking fact-based AI tasks into smaller BSD embodiments readily apparent, upon learning the content of this disclosure.

The future of 100% accurate AI can be achieved by breaking larger problems into a collection of BSD neural networks, in the same way that massive software undertakings are the result of breaking problems into functions and objects. In fact, BSD NLP makes this possible.

Language itself does not conform to mathematical determinism. While algebra can be deterministically applied to numbers, it cannot be applied to language. Moreover, neural networks are stochastic entities in themselves (i.e., they operate on probabilistic evaluations).

Thus, one of the crowning achievements of the BSD NLP invention is the development of innovative steps to bring determinism to non-deterministic language built on top of stochastic processing. It is this achievement that finally allows NLP neural networks to be used in a manner similar to programming functions, thereby providing the building blocks needed to construct 100% accurate AI for a multitude of complex, otherwise intractable, tasks.

Innovative Methods for Achieving 100% Accuracy on NLP and AI Tasks

Figure 18:
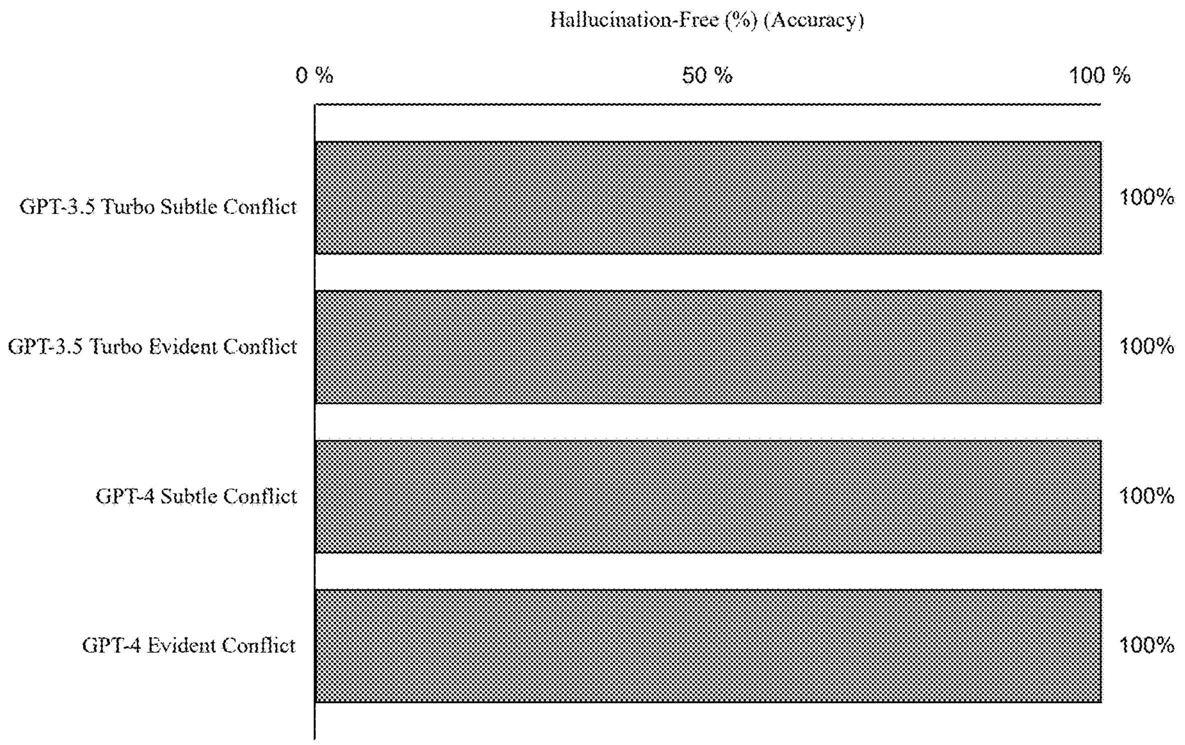
FIG. 18 is a chart that shows the real-world results of a system and method of the present invention built upon FFs, which eliminated 100% of the hallucinations in the RAGTruth Corpus for GPT-4 and GPT-3.5 Turbo for both Evident and Subtle Conflicts.

The innovations of BSD neural networks, FFs, FF-MCI, ISAR, Noun-Phrase Avoiding Processes (e.g., Noun-Phrase Collision Detection, Query Splitting, and Topical Splitting), DFUs, and other methods disclosed herein have been extensively tested-including using the methods disclosed herein to eliminate 100% of the hallucinations in the RAGTruth dataset for both GPT-4 and GPT-3.5 Turbo for both Evident and Subtle Conflicts (see FIG. 18).

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A system for correcting AI hallucinations, the system comprising:

at least one response from a large language model ("LLM");

at least one external knowledge source;

at least one self-containment process;

at least one retriever process that comprises two inputs; wherein one of the two inputs comprises a collection of standalone statements and wherein the other of the two inputs comprises a provided standalone statement; and wherein the at least one retriever process returns at least one standalone statement from the collection of standalone statements that most closely matches the provided standalone statement;

wherein the at least one external knowledge source is converted into at least one external knowledge collection of standalone statements using the at least one self-containment process; wherein the at least one response from the LLM is converted into at least one LLM-response standalone statement using the at least one self-containment process;

wherein a closest matching standalone statement for the at least one LLM-response standalone statement is found within the at least one external knowledge collection of standalone statements using the at least one retriever process; and wherein the at least one LLM-response standalone statement is replaced with the closest matching standalone statement.

2. The system of claim 1, wherein the at least one self-containment process is a FF ("formatted fact") pipeline.

3. The system of claim 2, wherein the FF pipeline comprises a BSD ("bounded scope deterministic") FF pipeline.

* * * * *